(12) United States Patent
Goto et al.

(10) Patent No.: US 6,659,601 B2
(45) Date of Patent: Dec. 9, 2003

(54) RECORDING METHOD, RECORDING APPARATUS, RECORDED ARTICLE AND METHOD FOR MANUFACTURING RECORDED ARTICLE

(75) Inventors: Fumitaka Goto, Kanagawa (JP); Katsuhiro Shirota, Kanagawa (JP); Koichiro Nakazawa, Kanagawa (JP); Masao Kato, Tochigi (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/138,339

(22) Filed: May 6, 2002

(65) Prior Publication Data

US 2003/0067525 A1 Apr. 10, 2003

(30) Foreign Application Priority Data

May 9, 2001 (JP) ........................................ 2001-138486
Apr. 17, 2002 (JP) ........................................ 2002-114889

(51) Int. Cl.$^7$ ................................................ B41J 2/01
(52) U.S. Cl. ........................ 347/100; 347/95; 106/31.13
(58) Field of Search ............................. 347/100, 95, 96, 347/84; 106/31.13, 31.6, 31.27

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,433,048 A | 2/1984 | Solberg et al. | 430/434 |
| 4,694,302 A | 9/1987 | Hackleman et al. | |
| 4,723,129 A | 2/1988 | Endo et al. | |
| 5,618,338 A | 4/1997 | Kurabayashi et al. | 106/26 R |
| 5,640,187 A | 6/1997 | Kashiwazaki et al. | 347/101 |
| 5,943,080 A * | 8/1999 | Kubota et al. | 347/100 |
| 6,460,989 B1 | 10/2002 | Yano et al. | 347/101 |

FOREIGN PATENT DOCUMENTS

| | | | |
|---|---|---|---|
| EP | 1099732 A1 * | 5/2001 | C09D/11/00 |
| JP | 55-65269 A | 5/1980 | |
| JP | 55-66976 A | 5/1980 | |

(List continued on next page.)

OTHER PUBLICATIONS

"Surface Science", Gakkai Shuppan Center (Japan Scientific Societies Press) pp. 326–327, (Kenji Tamaru, ed.) (1985).

Barrett, et al., The Journal of the American Chemical Society, "The Determination of Pore Volume and Area Distributions in Porous Substances. I. Computations from Nitrogen Isotherms", vol. LXXIII, Jan.–Mar. 1951, pp. 373–380.

Roček, et al., Institute of Chemical Process Funamentals, Czechoslovak Academy of Sciences, "Porous Structure of Aluminum Hydroxide and its Content of Pseudoboehmite", Applied Catalysis, 74, Elsevier Science Publishers B.V., (1991), pp. 29–36.

(List continued on next page.)

Primary Examiner—Judy Nguyen
Assistant Examiner—Manish Shah
(74) Attorney, Agent, or Firm—Fitzpatrick, Cella, Harper & Scinto

(57) ABSTRACT

The present invention provides a method and apparatus for allowing a high quality image to be recorded with good coloring, wherein M, D, Ka, tw and t satisfy the relation of $$t \leq (10/7 \times MD/Ka)^2 + tw$$

wherein M (pg/$\mu$m$^2$) is the amount of the water based ink supplied to the recording medium per unit area, D (%) is the concentration of the coloring material of the water based ink, Ka ($\mu$m/msec$^{1/2}$) is the absorption coefficient of the ink in the recording medium, tw (msec) is the time required for the water based ink to moisten in the recording medium, and t (msec) is the time required for the liquid composition to make contact with the supplied water based ink after the water-based ink is supplied to the recording medium.

24 Claims, 16 Drawing Sheets

FOREIGN PATENT DOCUMENTS

| JP | 55-150396 A | 11/1980 |
| --- | --- | --- |
| JP | 56-120508 A | 9/1981 |
| JP | 61-59911 B2 | 12/1986 |
| JP | 61-59912 B2 | 12/1986 |
| JP | 61-59914 B2 | 12/1986 |
| JP | 63-22681 A | 1/1988 |
| JP | 63-60783 A | 3/1988 |
| JP | 63-299971 A | 12/1988 |
| JP | 64-9279 A | 1/1989 |
| JP | 64-63185 A | 3/1989 |
| JP | 4-259590 A | 9/1992 |
| JP | 5-16015 B2 | 3/1993 |
| JP | 6-92010 A | 4/1994 |
| JP | 8-72393 A | 3/1996 |
| JP | 8-224955 A | 9/1996 |

OTHER PUBLICATIONS

U.S. patent application Ser. No. 08/635,335, Kurabayashi et al, filed Apr. 19, 1996, pending.

U.S. patent application Ser. No. 09/708,568, Tomioka et al., filed Nov. 9, 2000, allowed.

U.S. patent application Ser. No. 09/708,569, Endo et al., filed Nov. 9, 2000, pending.

U.S. patent application Ser. No. 09/884,094, Kashiwazaki et al., filed Jun. 20, 2001, pending.

U.S. patent application Ser. No. 09/968,435, Tomioka et al., filed Oct. 2, 2001, pending.

U.S. patent application Ser. No. 10/136,353, Tomioka et al., filed May 2, 2002, pending.

U.S. patent application Ser. No. 10/137,377, Takahashi et al., filed May 3, 2002, pending.

U.S. patent application Ser. No. 10/138,295, Tomioka et al., filed May 6, 2002, pending.

U.S. patent application Ser. No. 10/138,423, Goto et al., filed May 6, 2002, pending.

U.S. patent application Ser. No. 10/138,576, Tomioka et al., filed May 6, 2003, pending.

* cited by examiner (HOME POSITION)

(HOME POSITION)

(HOME POSITION)

(HOME POSITION)

(HOME POSITION)

(HOME POSITION)

(HOME POSITION)

(HOME POSITION)

FIG. 9
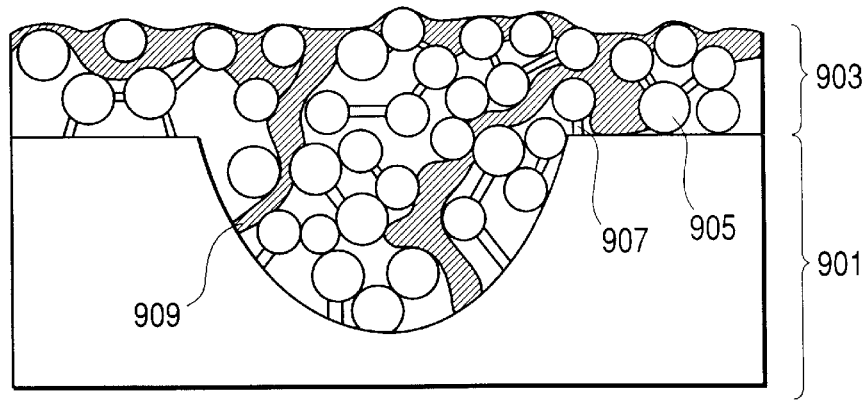
FIG. 10
FIG. 11
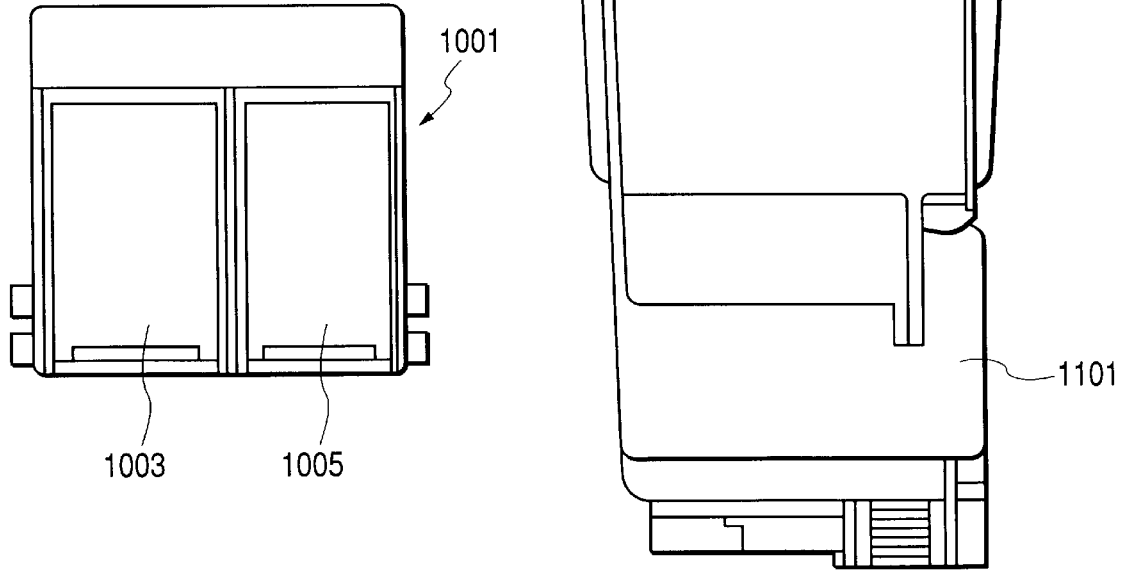

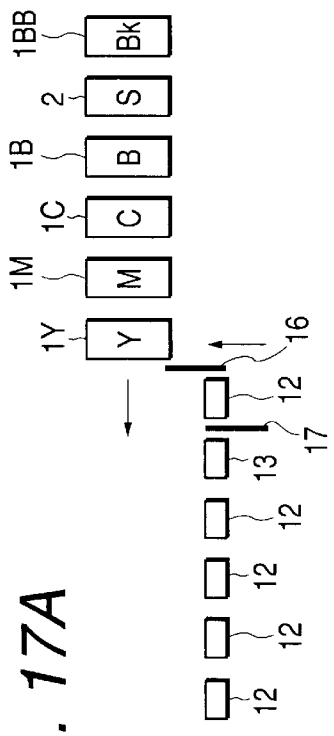
FIG. 17A
FIG. 17B
FIG. 17C
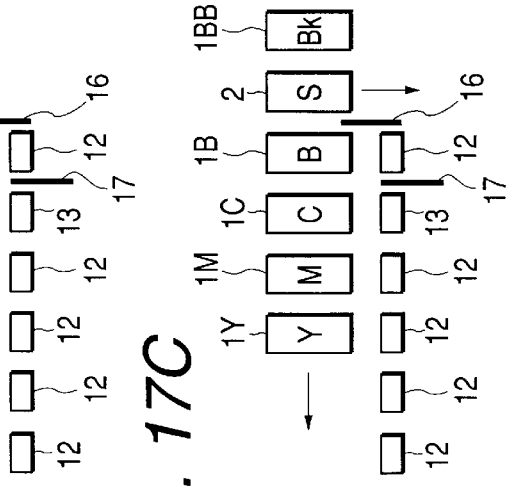
FIG. 17D
FIG. 17E
FIG. 17F

RECORDING METHOD, RECORDING APPARATUS, RECORDED ARTICLE AND METHOD FOR MANUFACTURING RECORDED ARTICLE

BACKGROUND OF THE INVENTION

1. Field of the Invention

The present invention relates to a technology for obtaining an image having outstanding coloring ability and uniformity of color by applying an ink containing a coloring material and a liquid composition containing fine particles to a recording medium using an ink-jet system etc.

2. Related Background Art

The ink-jet recording method conducts recording by ejecting ink to apply the ink onto a recording medium such as paper. It is easy to realize a head having high-density multi-orifice with ease, and formation of images of high-resolution and high-quality at high speed by using an ink jet recording method where an ink droplet is ejected by the action of a bubble formed in the ink by applying thermal energy to the ink by using an electrothermal converter as an ejection-energy supply means as disclosed in, for example, Japanese Patent Publication Nos. 61-59911, 61-59912 and 61-59914.

In general, conventional inks for ink-jet recording contain water as a principal component, and in addition, a water-soluble solvent of a high boiling point such as glycol to prevent drying and clogging at orifices. When such an ink is used for recording on a recording medium, sometimes there arises problems such as insufficient fixation, and uneven image presumably due to the uneven distribution of a filler and/or a size on the surface of the recording medium such as paper. Besides, image quality as high as the silver salt photograph has recently become required for ink-jet recording, leading to intense technical demands for high image density, wide color reproduction range and enhanced color evenness on ink-jet recording.

Under such circumstances, various proposals have heretofore been made to stabilize the ink-jet recording process and to enhance the quality of articles recorded by the ink-jet recording process. One of the proposals on the recording medium is to coat the surface of a base paper of the recording medium with a filler and/or a size. For example, there has been disclosed a technique to form an ink receiving layer on the base paper by applying porous fine particles that adsorb a coloring material on the base paper as a filler. Recording media produced by using these techniques are now on market as the ink-jet coating paper etc.

Under such circumstances, in order to aim at stabilizing an ink-jet recording method, and improving quality of a recorded article by ink-jet recording method, various proposals have been made until now. Some of the typical examples will be summarized below.

(1) A method in which a volatile solvent and a penetrating solvent are added into an ink;

a method is disclosed in which a compound increasing penetrating property of a surface active agent etc. is added into an ink as means accelerating fixing ability of the ink to a recording medium in Japanese Patent Application Laid-Open No. 55-65269. Moreover, use of an ink comprising a volatile solvent as a main component is disclosed in Japanese Patent Application Laid-Open No. 55-66976.

(2) a method in which an ink and a liquid composition reacting with the ink are mixed on a recording medium;

a method is disclosed in which a liquid composition increasing quality of an image is applied on a recording medium before or after ejection of the ink for forming a recording image for enhancing image density of an image, for improving water proof property, and further for controlling bleeding.

Japanese Patent Application Laid-Open No. 63-60783 discloses a method in which a liquid composition containing a basic polymer is applied to a recording medium, and an ink containing an anionic dye is then applied thereto, thereby conducting recording. Japanese Patent Application Laid-Open No. 63-22681 discloses a recording method in which a first liquid composition containing a reactive chemical species and a second liquid composition containing a compound reactive with the chemical species are mixed on the recording medium. Further, Japanese Patent Application Laid-Open No. 63-299971 discloses a method in which a liquid composition containing an organic compound having two or more cationic groups per molecule is applied to the recording medium, and recording is then conducted with an ink containing an anionic dye. Japanese Patent Application Laid-Open No. 64-9279 discloses a method in which an acidic liquid composition containing succinic acid or the like is applied to a recording medium, and recording is then conducted with an ink containing an anionic dye.

Further, Japanese Patent Application Laid-Open No. 64-63185 discloses a method in which a liquid composition that can insolubilize dyestuff is applied to paper prior to application of an ink. Further, Japanese Patent Application Laid-Open No. 8-224955 discloses a method in which a liquid composition containing cationic substances different in molecular weight distribution range from each other is used together with an ink containing anionic compound. Japanese Patent Application Laid-Open No. 8-72393 discloses a method in which a liquid composition containing a cationic substance and finely ground cellulose is used together with an ink. In both publications, it is shown that the obtained image is excellent in image density, character quality, water fastness, color reproducibility and bleeding problem. Further, Japanese Patent Application Laid-Open No. 55-150396 discloses a method in which recording is conducted with a dye ink on a recording medium, and a water-proofing agent that forms a color lake with the dye is then applied to make the resulting recorded image water proof.

(3) A method in which an ink and a liquid composition containing fine particles are mixed on a recording medium;

in Japanese Patent Application Laid-Open No. 4-259590, a method is disclosed in which a nonaqueous recording liquid is adhered after a colorless liquid containing colorless fine particles comprising an inorganic material is applied on a recording medium, and in Japanese Patent Application Laid-Open No. 6-92010, a method is disclosed in which an ink containing pigments, water soluble resins, and water soluble solvents and water is applied on a recording medium after a solution containing fine particles or a solution containing fine particles and binder polymer. Both of the examples indicate that an image that exhibits a good printing quality and a good coloring ability is obtained not depending on the type of paper.

The present inventors has conducted repeated examinations for various kinds of the above described ink-jet recording technology, and as a result, found that in some case an excellent effect for each technical subject was confirmed, but other ink-jet recording characteristics were deteriorated in exchange for it. For example, it is well known that the above-described recording medium obtained by coating the surface of the base paper of the recording medium with a filler and/or a size (hereinafter referred to as coated paper) enables formation of high-quality images.

In general, in order to obtain an image of high saturation, it is known that the coloring material should be maintained in a monomolecular film state without aggregation on the surface of the recording medium, for which the porous fine particles on the coated paper serves. However, in order to obtain images of both high density and high saturation with a given ink containing a coloring material, it is indispensable to form an ink-receiving layer as thick as the paper substrate is covered with a large amount of the porous fine particles for a coloring matter, thus leading to the loss of the texture of the base paper. The present inventors thought that reason why such a thick ink-receiving layer is required that the coloring matter is not effectively adsorbed on the porous fine particles.

Following explanation is made assuming coated paper having one ink-receiving layer. FIG. 9 schematically illustrates a section of a coated paper in the vicinity of the surface thereof. In FIG. 9, reference numerals 901 and 903 indicate a base paper and an ink-receiving layer, respectively. The ink-receiving layer 903 comprises porous fine particles 905 and an adhesive (binder) 907 for immobilize particles. When an ink is applied to the ink-receiving layer 903, the ink penetrates into the voids between the porous fine particles 905 by capillarity to form ink-penetrated portions 909. As illustrated in FIG. 9, since the density of the porous fine particles in the ink-receiving layer varies locally, the mode of ink penetration by capillary phenomenon varies locally. Therefore, the coloring material cannot evenly contact with the surfaces of the porous fine particles in the course of ink penetration, so that the coloring material is not efficiently adsorbed by the porous fine particles.

Further, penetration of the ink is partially inhibited by the adhesive 907, and thus the ink-receiving layer 903 has portions into which the ink could not penetrate and which cannot contribute to coloring. For this reasons, the adsorption of coloring material in a monomolecular state by the porous fine particles is not efficient compared with the particle amount in the conventional coated paper. As a result, a great amount of the porous fine particles are required to provide a high-quality image, impairing the texture of the base paper.

Furthermore, although fixing ability to a recording medium of an ink is improved by adopting the above described technology (1), occasionally, an image density is impaired or color reproduction range was also impaired, which is important for recording on regular papers or recording of color image. Moreover, according to the above described technology (2), since coloring material in an ink may be kept stayed on a surface of a recording medium, a recorded article exhibiting a high image density may be obtained. However, probably because the coloring material is aggregated on a surface of the recording medium, in some case a sufficient color reproduction range or sufficient saturation are not obtained. Moreover, in the above described conventional technology (3), although reforming of a surface state of a recording medium is realized by being applied a solution containing fine particles, a brilliant image that exhibits an equivalent level to an image on a coated paper is not obtained. Furthermore, there are limitations in selection of a coloring material, and in a method of applying a record, etc., and some problems are still left in a degree of freedom especially in an image by nonaqueous recording liquid.

Thus, since some problems are left behind in the above described conventional methods, the present inventors have become to recognize that a novel ink-jet recording technology needs to be developed for a recorded article by ink-jet recording that exhibits a higher quality required in recent years. The present inventors, based on the above described new knowledge, found out that a reaction in a liquid—liquid state between a coloring material and fine particles is made possible by way of using fine particles with a function adsorbing a coloring material, dispersing said fine particles and using with an ink in a liquid state so that the coloring material is efficiently adsorbed or combined to said fine particles, and as a result density of an image and saturation might be improved with a high reliability to attain the present invention.

Moreover, a further examination showed that when a liquid composition reacting with an ink is mixed on a recording medium, a quality (for example, coloring ability) of an image formed on a recording medium varies according to a recording condition of the ink and the liquid composition, and thus a specific recording condition is necessary to be satisfied in order to obtain a high coloring ability exhibiting a level equivalent to an image on a coated paper. Then, the present inventors have recognized a necessity of specifying a recording condition to provide an image with a high coloring ability. The present inventors found out that an image exhibiting a high coloring ability might be obtained using a certain specific recording condition especially in the case where an ink was first applied and subsequently a liquid composition was applied.

SUMMARY OF THE INVENTION

The present invention has been attained based on the above described new knowledge. And the present invention aims at obtaining a recorded article with high quality having a wider color reproduction range, excellent inhibition of bleeding, and outstanding uniformity and coloring ability, providing a recording condition required in order to obtain the recorded article having an image with the above described high coloring ability when recording is carried out by an ink-jet system etc., and further providing a recording process and recording apparatus with which recording is carried out in the above described recording condition. Especially the present invention aims at obtaining an image exhibiting a high coloring ability in the case where an ink is first applied and subsequently a liquid composition is applied.

Moreover, the present invention aims at providing a method for manufacturing a recorded article in which an image exhibiting a high coloring ability is recorded.

To achieve the above-described objects, the present invention provides a recording method wherein, when record is performed on a recording medium by use of an anionic or cationic ink and a liquid composition, the ink containing a coloring material, the liquid composition containing fine particles in a dispersed state, the surfaces of the fine particles being charged with a polarity opposite to that of the ink, M, D, Ka, tw and t satisfy the relation of $$t <= \left(\frac{10}{7} \times \frac{MD}{Ka}\right)^2 + tw$$

where M ($pg/\mu m^2$) is the amount of the ink supplied to the recording medium per unit area, D (%) is the concentration of the coloring material of the ink, Ka ($\mu m/msec^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium.

The present invention also provides a method of performing record on a recording medium by use of an ink containing a coloring material and a liquid composition to react with the coloring material in the ink, comprising:

a step of allowing the ink to contact the liquid composition on the recording medium in liquid form in such a way that M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein the coloring material is adsorbed on the surfaces of the fine particles in a monomolecular state by allowing the coloring material in the ink to contact fine particles in the liquid composition in the contact step, so that the fine particles having adsorbed the coloring material on the surfaces thereof aggregate to each other.

The present invention also provides a method of performing record on a recording medium by use of an ink containing a coloring material and a liquid composition containing fine particles to be adsorbed on the coloring material, comprising:

a step of causing the ink to contact the liquid composition on the recording medium in liquid form in such a way that M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein the coloring material keeping a monomolecular state is adsorbed on the surfaces of the fine particles by allowing the coloring material in the ink to contact fine particles in the liquid composition in the contact step, so that the fine particles having adsorbed the coloring material on the surfaces thereof aggregate to each other.

The present invention also provides a recording method wherein, when record is performed on a recording medium by use of an anionic or cationic ink and a liquid composition, the ink containing a coloring material and the liquid composition containing fine particles in a dispersed state, the surfaces of the fine particles being charged with a polarity opposite to that of the ink, record is performed in such a way that fine particles having adsorbed the coloring material in a monomolecular state are present at least within a depth of 10 $\mu$m from the surface of the recording medium.

The present invention also provides a recording method wherein, when record is performed on a recording medium by use of an ink containing a coloring material and a liquid composition containing fine particles to be adsorbed on the coloring material, record is performed in such a way that aggregates formed by aggregation of the fine particles to each other, the fine particles being adsorbed by a coloring material in a monomolecular state, are present at least within a depth of 10 $\mu$m from the surface of the recording medium.

The present invention also provides a recording apparatus wherein, when record is performed on a recording medium by use of an anionic or cationic ink and a liquid composition, the ink containing a coloring material and the liquid composition containing fine particles in a dispersed state, the surfaces of the fine particles being charged with a polarity opposite to that of the ink, M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium.

The present invention also provides an apparatus for making a record on a recording medium by use of an ink containing a coloring material and a liquid composition to react with the coloring material in the ink, comprising:

means for causing the ink to contact the liquid composition on the recording medium in liquid form in such a way that M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein the coloring material is adsorbed on the surfaces of the fine particles in a monomolecular state by allowing the coloring material in the ink to contact fine particles in the liquid composition, so that the fine particles having adsorbed the coloring material on the surfaces thereof aggregate to each other.

The present invention also provides an apparatus for making a record on a recording medium by use of an ink containing a coloring material and a liquid composition containing fine particles to be adsorbed on the coloring material, comprising:

means for causing the ink to contact the liquid composition on the recording medium in liquid form in such a way that M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein
the coloring material keeping a monomolecular state is adsorbed on the surfaces of the fine particles by allowing the coloring material in the ink to contact fine particles in the liquid composition in the contact step, so that the fine particles having adsorbed the coloring material on the surfaces thereof aggregate to each other.

The present invention also provides a recording apparatus wherein, when record is performed on a recording medium by use of an anionic or cationic ink and a liquid composition, the ink containing a coloring material and the liquid composition containing fine particles in a dispersed state, the surfaces of the fine particles being charged with a polarity opposite to that of the ink,
record is performed in such a way that fine particles having adsorbed a coloring material in a monomolecular state are present at least within a depth of 10 $\mu$m from the surface of the recording medium.

The present invention also provides a recording apparatus wherein, when record is performed on a recording medium by use of an ink containing a coloring material and a liquid composition containing fine particles to be adsorbed on the coloring material,
record is performed in such a way that aggregates formed by aggregation of the fine particles to each other, the fine particles being adsorbed by a coloring material in a monomolecular state, are present at least within a depth of 10 $\mu$m from the surface of the recording medium.

The present invention also provides a method of manufacturing a recorded article with an image being recorded on the recording medium thereof, wherein
when an image is recorded on a recording medium by use of an anionic or cationic ink and a liquid composition, the ink containing a coloring material and the liquid composition containing fine particles in a dispersed state, the surfaces of the fine particles being charged with a polarity opposite to that of the ink,
M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium.

The present invention also provides a method of manufacturing a recorded article with an image being recorded on the recording medium thereof, comprising:
when an image is recorded on a recording medium by use of an ink containing a coloring material and a liquid composition to react with the coloring material in the ink,
a step of causing the ink to contact the liquid composition on the recording medium in liquid form to thereby form an image in such a way that M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein
in the image forming step, the coloring material is adsorbed on the surfaces of the fine particles in a monomolecular state by allowing the coloring material in the ink to contact fine particles in the liquid composition, so that the fine particles having adsorbed the coloring material on the surfaces thereof aggregate to each other.

The present invention also provides a method of manufacturing a recorded article with an image being recorded on the recording medium thereof, comprising
when an image is recorded on the recording medium by use of an ink containing a coloring material and a liquid composition containing fine particles to be adsorbed on the coloring material,
a step of causing the ink to contact the liquid composition on the recording medium in liquid form to thereby form an image in such a way that M, D, Ka, tw and t satisfy the relation of $$t <= \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein
in the image forming step, the coloring material keeping a monomolecular state is adsorbed on the surfaces of the fine particles by allowing the coloring material in the ink to contact fine particles in the liquid composition, so that the fine particles having adsorbed the coloring material on the surfaces thereof aggregate to each other.

The present invention also provides a method of manufacturing a recorded article with an image being recorded on the recording medium thereof, wherein when an image is recorded on a recording medium by use of an anionic or cationic ink and a liquid composition, the ink containing a coloring material and the liquid composition containing fine particles in a dispersed state, the surfaces of the fine particles being charged with a polarity opposite to that of the ink, record is performed in such a way that fine particles having adsorbed a coloring material in a monomolecular state are present at least within a depth of 10 $\mu$m from the surface of the recording medium.

The present invention also provides a method of manufacturing a recorded article with an image being recorded on the recording medium thereof, comprising when an image is recorded on a recording medium by use of an ink containing a coloring material and a liquid composition containing fine particles to be adsorbed on the coloring material, record is performed in such a way that aggregates formed by aggregation of the fine particles to each other, the fine particles being adsorbed by a coloring material in a monomolecular state, are present at least within a depth of 10 $\mu$m from the surface of the recording medium.

The present invention also provides a recorded article having an image on the recording medium thereof, wherein the image includes fine particles having adsorbed a coloring material in a monomolecular state, at least within a depth of 10 $\mu$m from the surface of the recording medium.

The present invention also provides a recorded article having an image on the recording medium thereof, wherein the image includes aggregates formed by aggregation of the fine particles to each other, the fine particles having adsorbed a coloring material in a monomolecular state, at least within a depth of 10 $\mu$m from the surface of the recording medium.

In addition, in this specification, "a reaction between a coloring material and fine particles" shall mean covalent bonds, as well as ionic bonds, and physical or chemical adsorption, absorption, adhesion and other interaction between both of a coloring material and fine particles.

BRIEF DESCRIPTION OF THE DRAWINGS

FIG. 4A shows a movement of each cartridge from a print range side to a home position, and an lifting of a blade for ink;

FIG. 4B shows a wiping of a discharge port face of a cartridge for printing;

FIG. 4C shows a wiping of the discharge port face of a cartridge for a liquid composition;

FIG. 4C shows a lowering of each blade, respectively;

FIG. 5A shows an lifting of each blade;

FIG. 5B shows a movement from a home position of each cartridge to a print range side;

FIG. 5C is a lowering of a blade for a liquid composition;

FIG. 5D shows a wiping of a discharge port face of a cartridge for printing, and lowering of a blade for ink, respectively;

FIG. 6A shows an lifting of a blade for ink;

FIG. 6B shows a movement from a home position side of each cartridge to a print range side, and a wiping of a discharge port face of the cartridge for printing;

FIG. 6C shows a movement from a print range side of each cartridge to a home position side, a standby of the blade for ink, and lifting of the blade for a liquid composition;

FIG. 6D shows a movement to a side of a home position of each cartridge and a wiping of a discharge port face of the cartridge for a liquid composition, respectively;

FIG. 9 is a typical sectional view explaining a state of a colored part when ink-jet recording is carried out to a coated paper;

FIG. 10 is a schematic diagram showing an embodiment of an ink tank cartridge according to the present invention;

FIG. 11 is a drawing showing a state where a recording head is equipped with the ink tank cartridge in FIG. 10;

FIGS. 17A, 17B, 17C, 17D, 17E and 17F are schematic diagrams showing a wiping operation of the ink-jet print apparatus of FIG. 16;

FIG. 17A shows an lifting of a blade for ink;

FIG. 17B shows a wiping of a discharge port face of a cartridge for printing;

FIG. 17C shows lowering of the blade for ink;

FIG. 17D shows an lifting of both of the blades after a liquid composition is attached to a proper position;

FIG. 17E shows a wiping of the liquid composition and a second head for black ink;

FIG. 17F shows a lowering of both blades, respectively;

DESCRIPTION OF THE PREFERRED EMBODIMENTS

Figure 1:
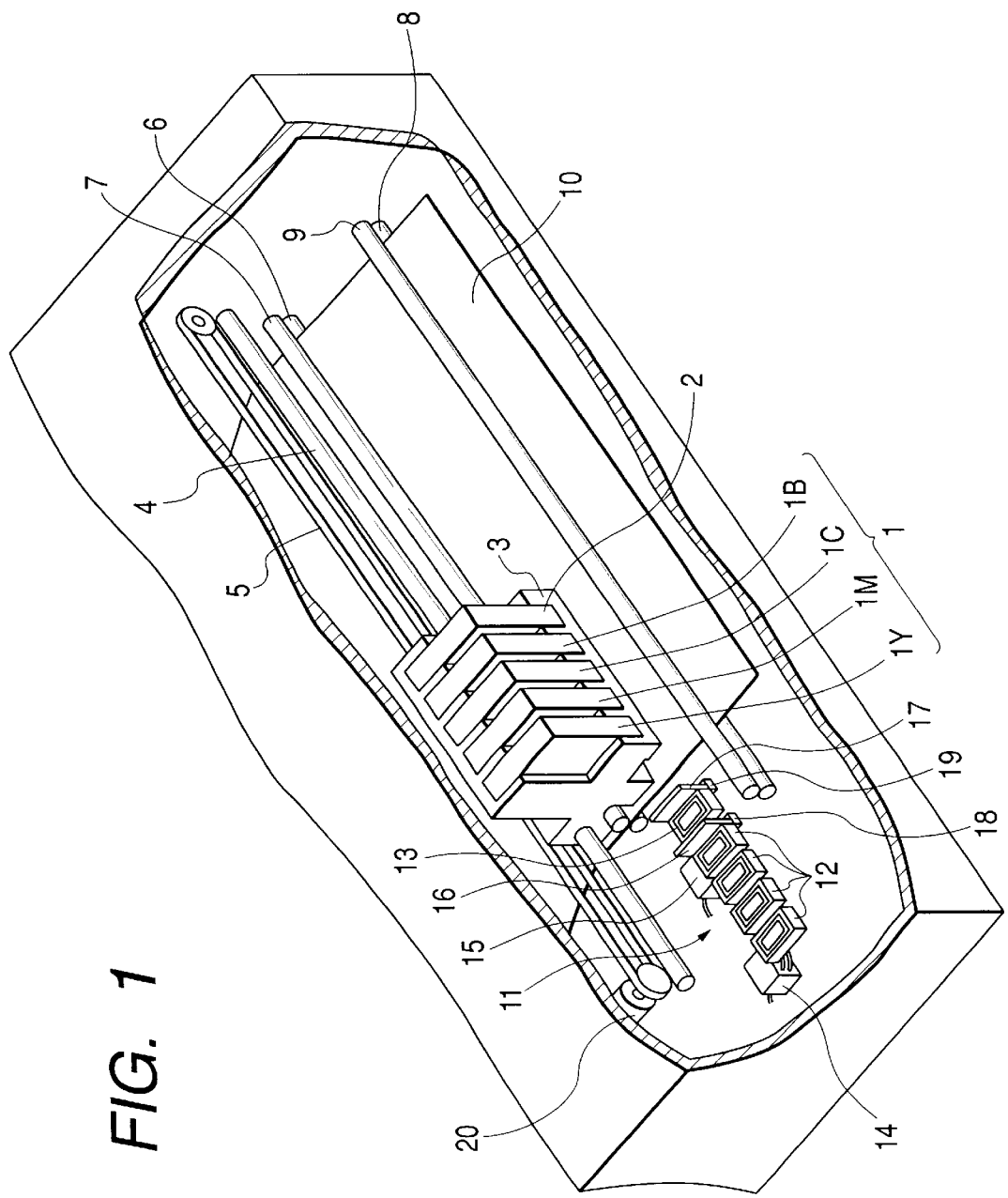
FIG. 1 is a perspective view showing an outline constitution of applicable ink-jet print apparatus in the present invention.

The present invention will be hereinafter described in more detail using preferable embodiments.

A preferable embodiment of a method for forming a colored part in a recording medium may comprise (i) a process in which an ink containing a coloring material is applied to a recording medium and (ii) a process in which the above described liquid composition of the present invention is applied to a recording medium, and is constituted in such a manner that the ink and the liquid composition is applied on a surface of the above described recording medium so that they may contact with each other in a liquid state. By adopting this embodiment an ink-jet recorded article having a wider color reproduction range, outstanding inhibition of bleeding, uniformity of a color, and coloring ability, etc., and furthermore having few crease line irregularities in a solid printed part and also good scratch-proof property may be stably obtained.

Furthermore, as an embodiment of an ink set of the present invention attaining the above described object, an example in which an ink containing a coloring material and the liquid composition of the above described present invention are combined may be mentioned. An ink-jet recorded article having a wider color reproduction range, outstanding inhibition of bleeding, uniformity of a color, and coloring ability, etc., and furthermore having few crease line irregularities in a solid printed part and also good rub-off resistance may be stably obtained adopting an ink set of this embodiment. Moreover, since the ink and the liquid composition itself used for recording have a very simple constitution as described above, an effect is obtained that an ink-jet recording with high quality and high reliability may be conducted.

Although the reason why the various aspects of the present invention have advantages as described above is not clearly known, the following mechanism is considered on the basis of the technical findings obtained heretofore.

First, a mechanism of recording in the present invention will be described with reference to FIGS. 13 and 14A to 14D. In addition here, a case will be described in which an ink containing a water soluble dye (anionic dye) with anion groups is used as an ink and, at the same time a liquid composition containing fine particles having cationic charge on the surface in dispersed state is used as a liquid composition.

Hereinafter, description will be made about a recorded image according to the present invention using FIG. 13.

First, a terminological definition is done in advance of description. In the present invention, a term "monomolecular state" represents a state where coloring materials, such as dyes and pigments, maintain almost a state dissolved or dispersed in an ink. If the coloring materials aggregate a little, the state is called "monomolecular state" so long as the saturation of the formed image is not lowered. Since the monomolecular state is preferable for dyes, such a state is called "monomolecular state" with coloring materials other than dyes, for convenience.

Figure 13:
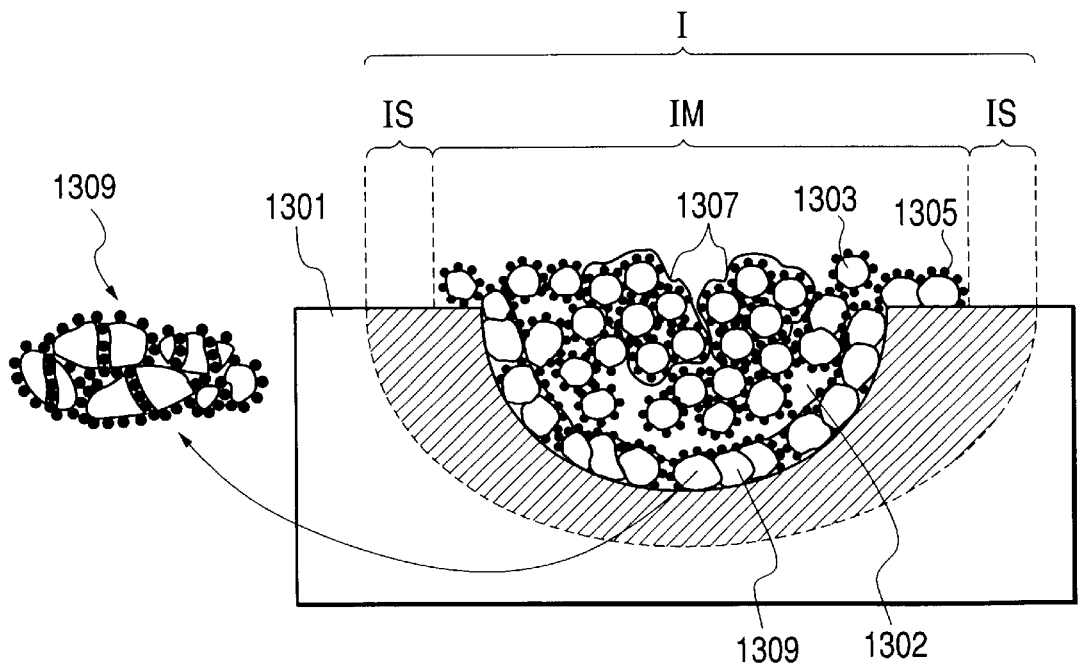
FIG. 13 is a typical sectional view explaining a state of the colored part of an ink-jet image according to the present invention.

FIG. 13 is a typical illustration of a colored part I of a recorded image according to the present invention, which is comprised of a main image portion IM and a peripheral portion IS thereof. In FIG. 13, reference numeral 1301 indicates a recording medium, and 1302 voids among fibers of the recording medium. Reference numeral 1303 designates fine particles typically illustrated, on which a coloring material 1305 is chemically adsorbed. As shown in FIG. 13, in the ink-jet recording image of the present invention, the main image portion IM is constituted by the fine particle 1303 in which a coloring material 1305 is adsorbed uniformly to a surface in a monomolecular state or in a state similar to a monomolecular state (abbreviated to a "monomolecular state" hereinafter), and aggregation 1307 of the fine particle keeping a monomolecular state of a coloring material. Reference numeral 1309 indicates aggregates of the fine particles present in the vicinity of the fibers of the recording medium within the main image portion IM. The main image portion IM is formed by the step of adsorption of the fine particles 1303 physically or chemically to the fibers of the recording medium, and the step of adsorption of the coloring material 1305 and the fine particles 1303 in a liquid—liquid state. Therefore, the coloring properties of the coloring material are scarcely impaired, and even on an easily ink-penetrable recording medium such as plain paper, it can be formed images of high image density and saturation with a color reproduction range as wide as on coated paper.

On the other hand, since the coloring materials 1305 that is not adsorbed to the surface of the fine particles 1303 and remained in the ink penetrates in a horizontal direction and in a depth direction in the recording medium 1301, the ink forms a minute feathering in the circumference part IS. As the coloring material remains in the vicinity of the surface of the recording medium 1301 and the delicate feathering of the ink occurs at the peripheral portion, it is possible to form of an image having little haze and color irregularity and excellent in color evenness even in an image region such as solid portions or shadow portions where a large amount of the ink is applied. According to the present aspect, when the recording medium 1301 has a permeability to the ink and liquid composition, the penetration of the ink or the liquid composition into the recording medium is not completely prevented but allowed to some extent, as shown in FIG. 13.

Furthermore, in using a liquid composition of the present invention, some pores of a certain size are formed in the inside of an aggregate when the fine particle aggregate 1309 existing in the vicinity of the surface of the recording medium is formed. When the coloring material 1305 that existed independently in the above described ink penetrates into the recording medium, it penetrates into the inside of the pores of the fine particle aggregate 1309, and adsorbs to the area around the entrance and the inner wall of the pores in an ideal monomolecular state, and thereby remains more coloring materials around the surface of the recording medium. Thus a recorded article having excellent coloring ability may be obtained.

FIGS. 14A to 14D are views showing one embodiment of a method of forming a colored part of FIG. 13, also an outline sectional view of a colored part 1400, and an outline flowchart explaining a formation process. In the above described FIGS. 14A to 14D, reference numeral 1401 indicates a portion mainly containing a reaction product of an ink and a liquid composition, for example, a reaction product between a coloring material and fine particles (hereinafter referred to as "reaction portion"), corresponding to the main image portion IM in FIG. 13. Reference numeral 1402 designates a portion formed by an ink portion not reacted with the liquid composition and oozed in the periphery of the reaction portion 1401 (hereinafter referred to as "ink ooze portion"), and corresponding to the peripheral portion IS in FIG. 13. Such a colored part 1400 is formed, for example, in the following manner. In addition, reference numeral 1405 shown in the above FIGS. 14A to 14D represents typically a void formed between fibers of a recording medium.

Figure 14A:
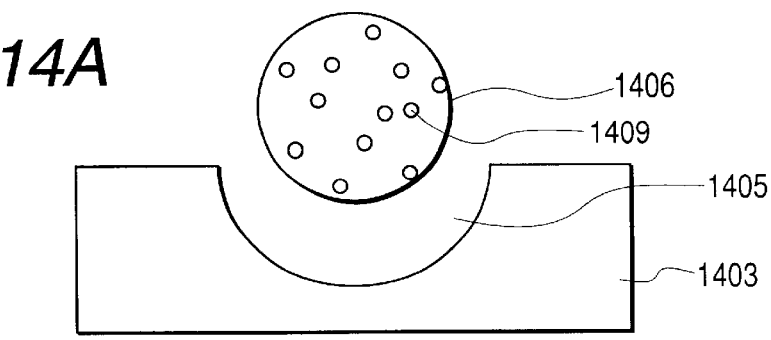
FIGS. 14A, 14B, 14C and 14D are views showing an example of a formation method of a colored part according to the present invention.
Figure 14B:
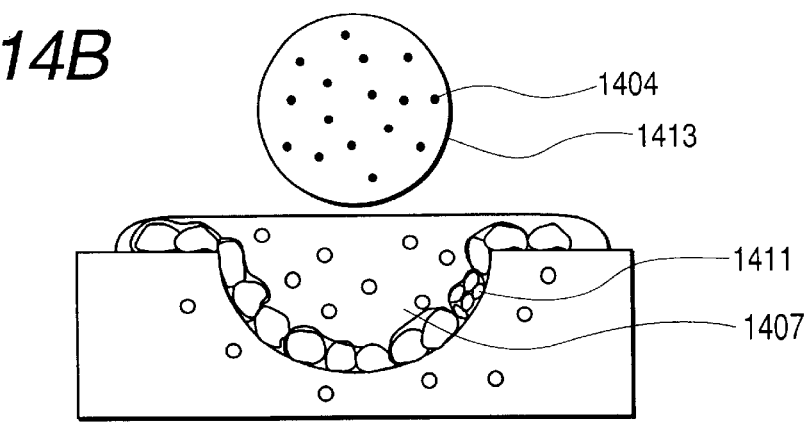

A liquid composition 1406 reactive with the coloring material 1404 is first applied as a droplet to the recording medium 1403. As a result, a pool 1407 of the liquid composition is formed (FIG. 14B). In the pool 1407, fine particles 1409 in the vicinity of the fiber surfaces of the recording medium are physically or chemically adsorbed on the surfaces of the fibers of the recording medium, and the dispersed state of the fine particles becomes unstable to form aggregates 1411 of the fine particles themselves, while the fine particles 1409 apart from the fibers in the pool 1407 are in the original dispersed state.

Figure 14C:
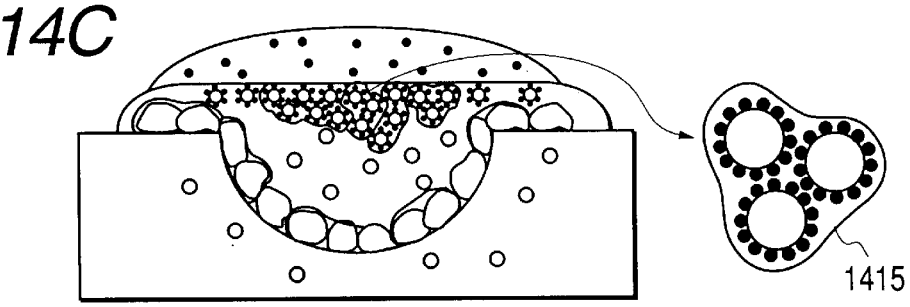

Then an ink 1413 is applied as a droplet to the recording medium 1403 (FIG. 14B). As a result, the coloring material 1404 is chemically adsorbed on the fine particles 1409 at an interface between the ink 1413 and the pool 1407. Since this reaction is a reaction between liquids (liquid—liquid reaction), the coloring material 1404 is considered to be uniformly adsorbed in a monomolecular state on the surfaces of the fine particles 1409 (FIG. 14C). That is, it is considered that the coloring material would not aggregate by themselves on the surfaces of the fine particles, or aggregation is very little, if any. As a result, a large number of fine particles adsorbing the coloring material 1404 in the monomolecular state are formed on the surface of the reaction portion 1401, and the coloring material remains in the monomolecular state on the surface area that affects the coloring most. Therefore, a recorded image high in image density and saturation can be formed.

Subsequently, it is considered that the fine particles that adsorbed the coloring material 1404 then aggregate by themselves as the dispersed state becomes unstable (FIG. 14C). That is, an aggregate 1415 formed here maintains the coloring material in a monomolecular state also inside thereof. A recorded image of high image density and saturation is formed by this aggregate 1415.

Further, a part of unreacted coloring material 1404 diffuses in the pool 1407 to be adsorbed on the surfaces of unreacted fine particles 1409. Thus, the reaction between the coloring material and fine particles further proceeds within the pool 1407, so that an image of still higher image density and saturation is formed. The above described aggregates 1411 of the fine particles formed on the surfaces of fibers of the recording medium are considered to inhibit the penetration of the liquid phase in the pool 1407 into the recording medium. As a result, there can be more of coloring material 1404 and fine particles 1409 in the pool 1407 mixed with each other to enhance the contact probability of the coloring material 1404 with the fine particles 1409, and the reaction proceeds uniformly and sufficiently to form an image of more uniformity with high image density and saturation.

Moreover, when the liquid composition 1406 is applied to the recording medium 1403 (FIG. 14A), or the ink 1413 is applied to the pool 1407 (FIG. 14B), changes in the dispersion medium in which the fine particles 1409 is dispersed may occur and make the dispersion state of the fine particles 1409 unstable so that some fine particles 1409 may aggregate before the coloring material 1404 is adsorbed thereon. The term "changes in dispersion medium" as used herein means changes generally observed when a liquid is mixed with other liquids or substances, changes in physical properties such as pH, solid concentration, solvent composition, and dissolved ion concentration in the liquid phase. It is considered that when the liquid composition contacts the recording medium or the ink, these changes take place rapidly and complexly to break the dispersion stability of the fine particles, and the aggregates are formed. It is considered that these aggregates serve to fill the voids and to keep more fine particles having adsorbed the coloring material near the surface of the recording medium. Among these aggregates formed in the pool 1407, there are those adsorbed on the recording medium and those suspended in the liquid phase (having mobility). Those having mobility can adsorb the coloring material in a monomolecular state on the surfaces thereof in the same manner as with the fine particles as described above, to form larger aggregates which contribute to the enhancement of coloring. The aggregates are considered to move together with the liquid phase upon the penetration of the liquid phase along the fibers so as to fill the voids to smooth the surface of the recording medium, thereby contributing to the formation of an image more uniform and high in image density.

The reason why high coloring of the image is obtained, as shown later, by the present invention is considered that the coloring material is adsorbed in a monomolecular state on the fine particles or on the aggregates thereof to remain in the vicinity of the surface of the recording medium. The fine particles on which the coloring material adsorbed in a monomolecular state, and remained in the vicinity of near the surface of a recording medium is fixed on the surface of a recording medium. Thereby, durability, such as rub-off resistance and water fastness of an image is improved.

Figure 14D:
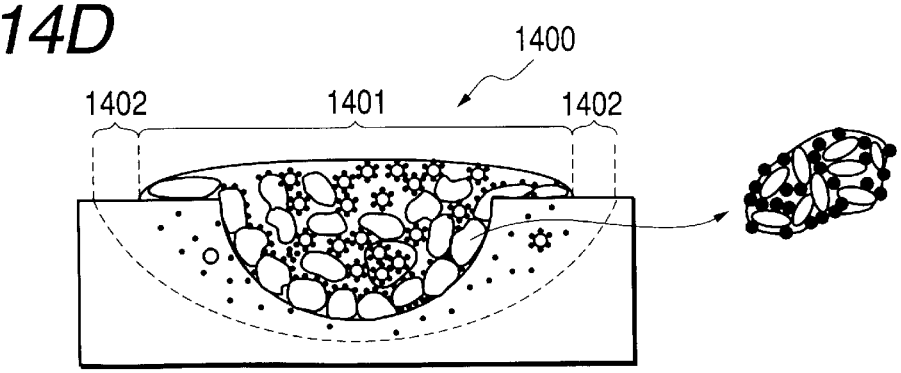

As illustrated in FIG. 14B, at least a part of the fine particles in the liquid composition applied to the recording medium are considered to penetrate into the interior of the recording medium as the liquid medium penetrates into the recording medium. On the other hand, as illustrated in FIG. 14D, the color material is also fully assumed to adsorb or bonded to the fine particles that have penetrated previously in a monomolecular state. Thus, the fine particles to which the fine particle is adsorbed or bonded in the recording medium in a monomolecular state is also considered to contribute to improvement of coloring ability. Further, it is considered that the fixing ability is also improved by such penetration of the liquid medium.

Moreover, another reason will be described why the present invention provides an image exhibiting a high coloring ability is obtained. When the above described fine particle aggregate 1411 existing in the vicinity of the surface of the above described recording medium is formed, some pores of a certain size are formed in the inside of the aggregate using the liquid composition of the present invention. When the color material 1404 left behind without adsorbing on the fine particles 1409 penetrates into the recording medium in the inside of the pool 1407, some part penetrate into the inside of the fine particle aggregate 1411 through a pore with the solvent component. In that case, the color material 1305 adsorbs on the area around the entrance and the inner wall of the pores in the fine particle aggregate, and only the solvent component penetrates into the inside of the recording medium, and thereby the color material may adsorb to the surface and the inside of the fine particle aggregate 1411 efficiently and remain in the vicinity of the surface of the recording medium. Furthermore, when the color material 1404 is a dye, a pore diameter of the fine particle aggregate 1411 is about 1 to several times of the molecule size existing in the ink of the color material 1404. Therefore, it is extremely difficult for the color material 1404 that adsorbed or the inside of the pore to cause aggregation of the color materials, and thus an ideal monomolecular state may be formed. This can greatly contribute to a further improvement in coloring ability, and a recorded article exhibiting still wider color reproduction range is obtained.

Moreover, it became clear that the pore physical properties of the fine particle aggregate 1411 are influenced not only with the fine particles contained in the liquid composition but with solvent composition etc. It is found out that the fine particle aggregate is formed from the liquid composition, and a pore volume in a certain specific pore radius range of this fine particle aggregate has a very high correlation with the image formation ability formed on the recording medium.

Furthermore, in the present invention, if a color material has anionic property, the color material adsorbs on a cationic fine particle surface extremely efficiently by way of making the fine particle and the color material reacted in a liquid phase on the surface of the recording medium. Here, on a coated paper for ink-jet, in order to attain color material adsorption of the same grade as the present invention, a large amount of cationic porous fine particles are needed, therefore formation of a thick ink-receiving layer that covers base paper becomes indispensable. Therefore, it leads to a result of spoiling a texture of the base paper in coated paper. Since the amount of the fine particles that constitutes the liquid composition of the present invention can be made less, image formation that does not demonstrate sense of incongruity in textures is attained in a printed portion and a non-printed portion, without spoiling the textures of the recording medium.

Moreover, the present invention may seem to be apparently similar to a method of adding a liquid composition containing fine particles from outside into ink, described in the above described (3) of conventional technology, in a point of applying a liquid composition containing fine particles, and ink on a surface of a recording medium to form an image. However, the present invention positively conducts a reaction between a liquid composition and a coloring material as mentioned above, and uses fine particles in the liquid composition as means to suppress aggregation (lake) of the coloring material, but on the contrary, the conventional technology described above (3) applying of a solution containing fine particles aims at reforming of a surface state of a recording medium, and moreover no idea of producing a chemical reaction between the fine particles with different polarity and the coloring material in the ink is disclosed. And the difference in quality, which is considered to be due to difference in the mechanism, is clear between the recorded article according to such recording technologies and the recorded article obtained by the present invention.

In the above description, an example in which an image exhibiting high coloring ability is recorded by firstly applying a liquid composition and subsequently applying an ink is shown. On the other hand, a method may be considered in which an ink is first applied and subsequently a liquid composition is applied. Then, the present inventors attempted formation of an image exhibiting high coloring ability in a case where an ink is applied first and subsequently a liquid composition is applied. As a result of wholeheartedly research, the present inventors found out that quality of an image is greatly influenced by a recording condition of an ink and a liquid composition, in detail, a period after ink contacts a recording medium until a liquid composition applied later to this ink contacts. The reason assumed by the present inventors why the quality of the image is influenced by the above described periods will be given in the following paragraph.

Figure 18A:
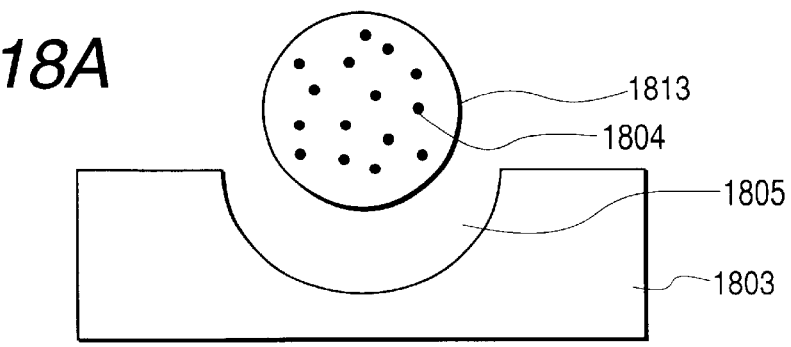
FIGS. 18A, 18B, 18C and 18D are typical sectional views explaining a state of a colored part that exhibits a high coloring ability of an ink-jet image according to the present invention.
Figure 18B:
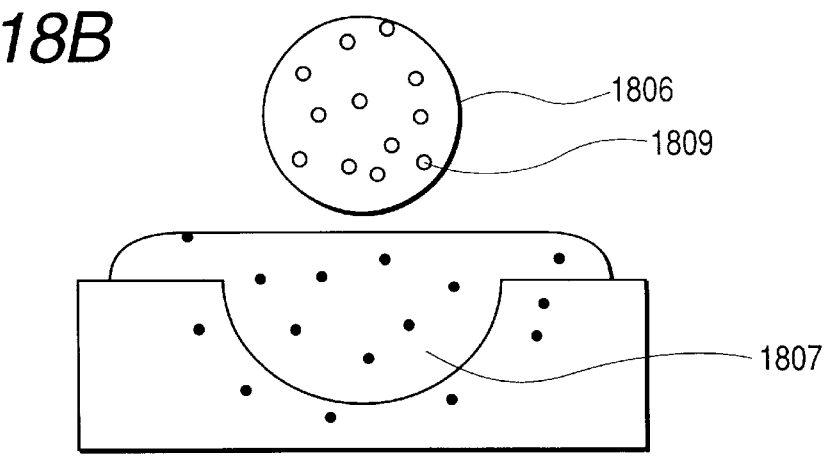
Figure 18C:
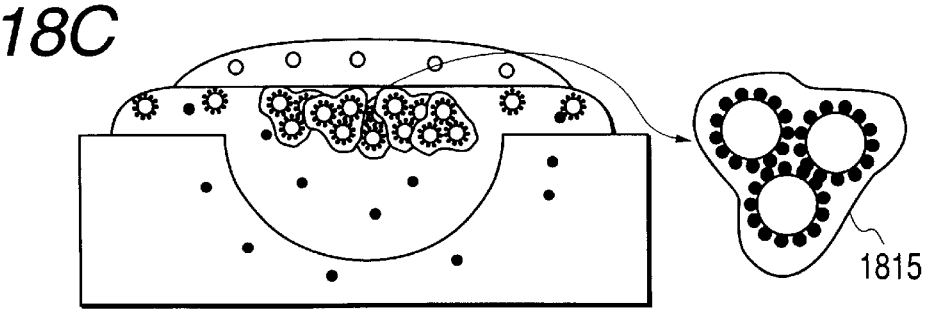
Figure 18D:
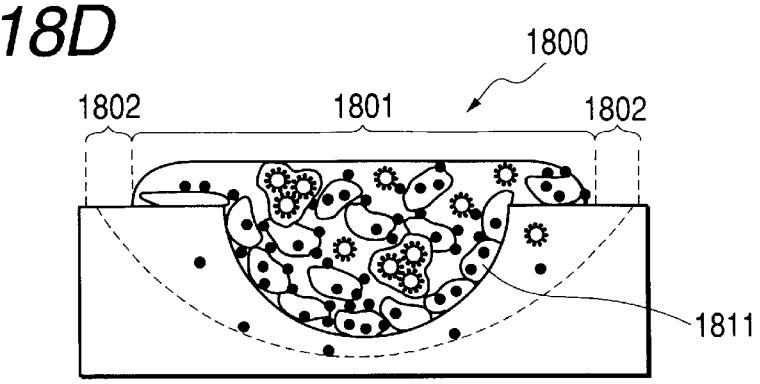

A process will be described using FIGS. 18A to 18D in which a colored part with high coloring ability is formed by applying first an ink to a recording medium and then subsequently applying a liquid composition on the applied ink. FIGS. 18A to 18D show outline sectional views of a colored part 1800 in the case where an ink is first and subsequently a liquid composition is applied in sequence, and also shows an outline flowchart explaining the formation process. In FIG. 18D, reference numeral 1801 is a portion that mainly contains a reactant of an ink and a liquid composition, for example, a reactant of a coloring material and fine particles (hereinafter abbreviated to a "reaction portion"), also a portion corresponding to the main image portion IM of FIG. 13. Reference numeral 1802 designates a portion formed by an ink not reacted with the liquid composition and oozed in the periphery of the reaction portion 1801 (hereinafter referred to as "ink ooze portion"), and corresponding to the peripheral portion IS in FIG. 13. Such a colored part 1800 is formed, for example, in the following manner. In FIG. 18A, reference numeral 1805 denotes a typical void between fibers of a recording medium.

An ink 1813 is first applied as a droplet to the recording medium 1803 (FIG. 18A). As a result, a pool 1807 of the ink is formed (FIG. 18B). In the pool 1807, a coloring material 1804 in the vicinity of the fiber surfaces of the recording medium are physically or chemically adsorbed on the surfaces of the fibers of the recording medium, and penetrated into the fiber in a liquid state, while the coloring material 1809 apart from the fibers in the pool 1807 are considered to be in the original solved state.

Subsequently, a liquid composition 1806 reactive with the coloring material 1804 is applied to a recording medium 1803 as a liquid droplet (FIG. 18B). As a result, the coloring material 1804 is first chemically adsorbed on the fine particles 1809 at an interface between the liquid composition 1806 and the pool 1807. Since this reaction is a reaction between liquids (liquid—liquid reaction), the coloring material 1804 is considered to be uniformly adsorbed in a monomolecular state on the surfaces of the fine particles 1809 (FIG. 18C). More specifically, it is considered that the coloring material would not aggregate by itself on the surfaces of the fine particles, or aggregation is very little, if any. As a result, a large number of fine particles adsorbing the coloring material 1804 in the monomolecular state are formed on the surface of the reaction portion 1801, and the coloring material remains in the monomolecular state on the surface area that affects the coloring most. Therefore, a recorded image high in image density and saturation can be formed.

It is considered that the fine particles that adsorbed the coloring material 1804 then aggregate by themselves as the dispersed state becomes unstable (FIG. 18C). Thus, the aggregates 1815 formed are holding the coloring material in the monomolecular state inside thereof. This aggregate 1815 forms a recorded image of high image density and saturation.

Further, a part of unreacted coloring material 1809 diffuses in the pool 1807 to be adsorbed on the surfaces of unreacted coloring material 1804. As described above, the reaction between the coloring material and fine particles further proceeds within the pool 1807, so that an image of still higher image density and saturation is formed. The diffused fine particles 1809 possibly become unstable in dispersed state, and are considered to form the aggregate 1811 of the fine particles between themselves and the above described aggregate 1815. Moreover, the fine particles 1809 that arrived at the fiber surface of the recording medium become unstable in a dispersed state, form the aggregate 1811, and some part of the aggregate 1811 formed during diffusion and the aggregate 1815 adsorb onto the above described fiber surface. The aggregates 1811 and 1815 that adsorbed to the fiber surface are considered to inhibit the penetration of the liquid phase in the pool 1807 into the recording medium. As a result, there are more of fine particles 1809 and coloring material 1804 in the pool 1807 to enhance the contact probability of the coloring material 1804 with the fine particles 1809, and thus the reaction proceeds uniformly and sufficiently to form an image of more uniformity with high image density and saturation.

And when the ink 1813 is applied to the recording medium 1803 (FIG. 18A), or the liquid composition 1806 is applied to the pool 1807 (FIG. 18B), changes in the dispersion medium may occur and make the dispersion state of the fine particles 1809 unstable so that some fine particles 1809 may aggregate by themselves before the coloring material 1804 is adsorbed thereon. The term change in dispersion medium as used herein means changes generally observed when a liquid is mixed with other two or more of liquids or substances, changes in physical properties such as pH, solid concentration, solvent composition, and dissolved ion concentration in the liquid phase. It is considered that when the liquid composition contacts the recording medium or the ink, these changes take place rapidly and complexly to break the dispersion stability of the fine particles, and the aggregates are formed. It is considered that these aggregates serve to fill the voids and to keep more fine particles having adsorbed the coloring material in the vicinity of the surface of the recording medium. Among these aggregates formed in the pool 1807, there are those adsorbed on the recording medium and those suspended in the liquid phase (having mobility). Those having mobility can adsorb the coloring material in a monomolecular state on the surfaces thereof in the same manner as with the fine particles as described above, to form larger aggregates that contribute to the enhancement of coloring. The aggregates are considered to move together with the liquid phase upon the penetration of the liquid phase along the fibers so as to fill the voids to smooth the surface of the recording medium, thereby contributing to the formation of an image more uniform and high in image density.

Figure 19A:
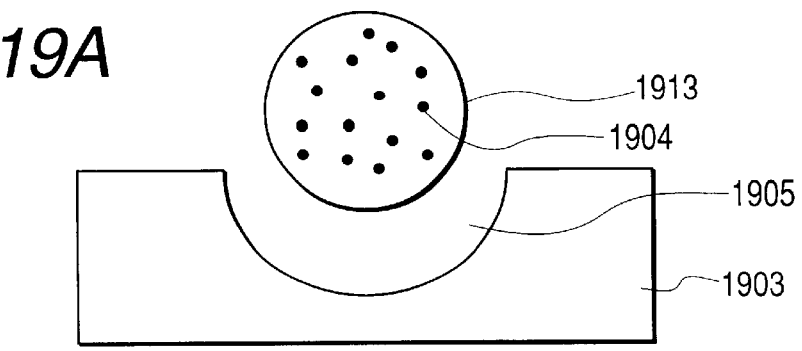
FIGS. 19A, 19B, 19C and 19D are typical sectional views explaining a state of a colored part of an ink-jet image which does not have a high coloring ability as comparison of FIG. 18.
Figure 19B:
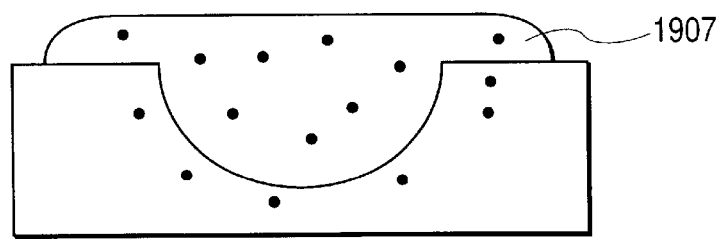

Next, a process will be described in which the colored part with coloring ability relatively inferior as compared with the case of the above described FIGS. 18A to 18D are formed when an ink at first and subsequently a liquid composition is applied in sequence according to FIGS. 19A to 19D. FIGS. 19A to 19D show outline sectional views of a colored part 1900 in the case where an ink at first and subsequently a liquid composition is applied in sequence, and also shows an outline flowchart explaining the formation process. In FIG. 19D, reference numeral 1901 indicates an aggregate of a liquid composition. Reference numeral 1902 designates a portion formed by an ink portion not reacted with the liquid composition and oozed in the periphery of the reaction portion 1901. Such a colored part 1900 is formed, for example, in the following manner. In FIG. 19A, reference numeral 1905 denotes a typical void between fibers of a recording medium.

An ink 1913 is first applied as a droplet to the recording medium 1903 (FIG. 19A). As a result, a pool 1907 of the ink is formed (FIG. 19B). In said pool 1907, a coloring material 1904 in the vicinity of the fiber surfaces of the recording medium are physically or chemically adsorbed on the surfaces of the fibers of the recording medium, and penetrated into the fiber in a liquid state, while the coloring material 1909 apart from the fibers in the pool 1907 are considered to be in the original solved state.

Figure 19C:
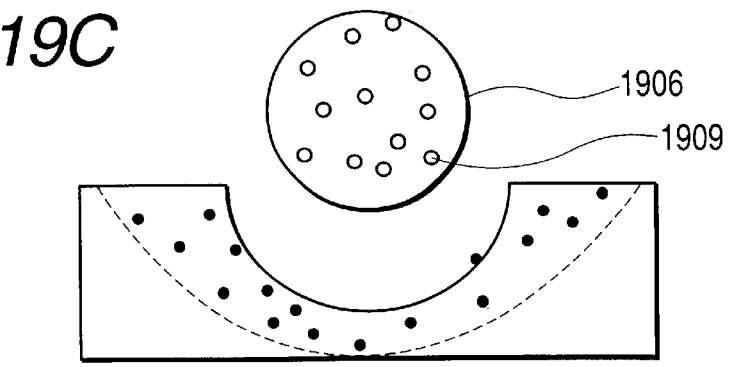
Figure 19D:
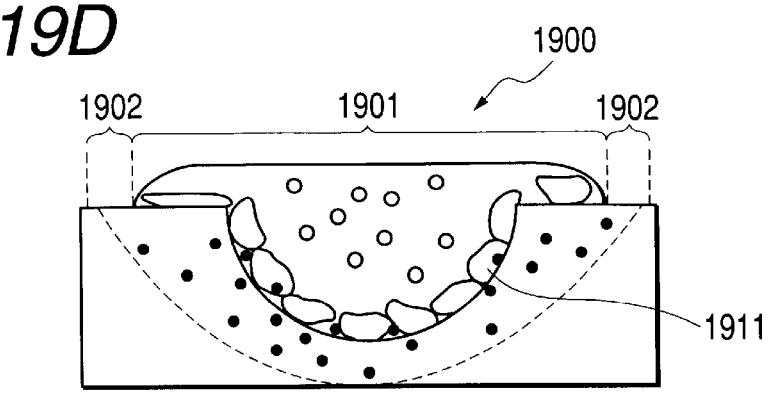

Subsequently, a liquid composition 1906 reactive with the coloring material 1904 is applied to a recording medium 1903 as a liquid droplet (FIG. 19C). At this time, the ink applied previously has permeated into the recording medium, and there are very little ink 1913 and coloring material 1904 remaining in the recording medium surface layer. Consequently, the contact probability of the fine particle 1909 and the coloring material 1904 becomes low, and the reaction of liquid between the liquid composition 1906 and ink 1913 (liquid—liquid reaction) does not occur, or very little if any. Therefore only the aggregate 1911 of the fine particle 1909 remains on the recording medium surface, or the aggregate 1911 to which few coloring material 1904 is adsorbed remains (FIG. 19D). Accordingly, the amount of the coloring material 1804 which affects the coloring most and which should remain in the surface layer is decreased compared with the case in FIGS. 18A to 18D, so that it is considered that the image relatively inferior in coloring ability as compared with the case in FIGS. 18A to 18D are formed.

The present inventors has become to have a recognition that in order to provide a image formation with enhanced coloring, it is necessary to contact a liquid composition while a specific amount of the coloring material remains in the recording medium surface layer that contributes to coloring. It is considered that a formation of a colored part in FIGS. 18A to 18D are preferable.

Hereinafter, description will be made in detail about a liquid composition and an ink by which the present invention is characterized.

First, a definition of a cationic ink or an anionic ink in this specification is described. When the ionic characteristics of an ink are mentioned, it is well known in the art that the ink itself is not charged, but neutral. The term anionic ink or cationic ink as used herein means that a component of the ink, for example, a coloring material, has an anionic or cationic group, which groups are adjusted so as to behave as an anionic or cationic group in the ink. The same is said with the anionic or cationic liquid composition.

Measuring Method of a Liquid Composition

In the present invention, a pore volume in a certain specific pore radius range of a fine particle aggregate obtained from a liquid composition that contains at least fine particles and a solvent is measured according to the following methods. First, in measuring these pore physical properties, the above described liquid composition is pretreated in the following procedures.

(1) The above described liquid composition is dried at 120° C. under air atmosphere for 10 hours to evaporate the solvent almost completely.

(2) The above described dried composition is heated over one hour from 120° C. to 700° C., and then is baked at 700° C. for three hours.

(3) The above described baked composition is gradually returned to ordinary temperature after baking, and the obtained baked composition is ground to powder.

The reason for performing the above described pretreatment here is that fine a particle aggregate is formed from a liquid composition by drying, a solvent component is removed completely so as to empty the pore in the inside of an aggregate and to form a vacant opening.

As a measuring method of a pore radius and a pore volume used by the present invention, the nitrogen adsorption desorption method may be used suitably. A size of the pore of the fine particle aggregate used as an object measured by the present invention is a pore volume in a range of pore radius of 3 nm to 30 nm. Although the reason why the pore volume in this range exhibits high correlation to image formation ability is not clear, it is considered that penetration into the fine particle aggregate of the coloring material or the solvent component falls markedly in a range smaller than this pore radius, and as a result, there occurs little adsorption of the coloring material resulting from the pore, and it does not substantially participate in improvement in coloring ability. On the other hand, it is considered that, in a bigger pore than the range of this pore radius, while penetration of the coloring material or a solvent component becomes easy to take place, the coloring material adsorbed in the vicinity of the entrance and inside of the pore becomes difficult to participate in absorption of light due to an influence of light scattering of the pore itself to induce a decrease in coloring.

Therefore, it is effective for evaluating coloring ability of a formed image to measure a pore volume of a pore radius in a range of 3 nm to 30 nm, and in a range more than 30 nm. As a measuring method of the pore physical properties in this range, the nitrogen adsorption desorption method is optimal. A pore radius and a pore volume can be obtained from a nitrogen adsorption desorption method by Barrett, et. al's method (J. am. Dhem. Soc., Vol. 173, 373, 1951), after a pretreated sample is degassed under a condition of 120° C. for 8 hours. Furthermore, it is preferable that a pore volume is measured in a range of 3 nm to 20 nm and a range of more than 20 nm. When the coloring material is a dye, this range is especially useful for evaluating much more improvement in coloring ability.

Liquid Composition

A liquid composition of the present invention will be described hereinafter.

A Pore Radius and a Pore Volume

As mentioned above, a pore radius of a fine particle aggregate is considered to be preferably in a range of 3 nm to 30 nm in the light of preventing rapid penetration of a coloring material, adsorption in the vicinity of a pore entrance and in an inner wall, and aggregation of the coloring material inside a pore. Moreover, in order to incorporate the coloring material inside for contributing to improvement in coloring ability, a certain amount of volume is simultaneously required. Moreover, it is considered that the number of the pores in a fine particle aggregate increases as the pore volume increases, and that not only the amount of adsorption of the coloring material inside a pore but also the amount of adsorption in the vicinity of the entrance of the pore increases.

Therefore, in the light of these viewpoints the liquid composition used suitably in the present invention has preferably a pore volume of no less than 0.4 ml/g in a range of 3 nm to 30 nm of pore radius, and a pore volume of no more than 0.1 ml/g in a range of more than 30 nm of pore radius. A coloring material and a solvent component penetrate in a pore by a pore radius within above described range, and therefore the pore of a fine particle aggregate will contribute effectively in improvement in coloring ability. Moreover, light scattering by the pore is suppressed and the phenomenon is also effectively suppressed that a coloring material adsorbed in the vicinity of the pore entrance and on the inner wall cannot contribute to coloring ability easily.

It is more preferable that the pore volume in the range whose pore radius is 3 nm to 20 nm is no less than 0.4 ml/g, and that the pore volume in the range whose pore radius of more than 20 nm is no more than 0.1 ml/g. In the case where especially dyes are used for a coloring material, when many pore radius exist in a range of 3 nm to 20 nm, coloring ability will improve further, and an image that exhibits a still wider color reproduction range will be formed.

A pore radius and a pore volume of a fine particle aggregate formed from a liquid composition are affected not only by chemical species, forms, and size of the fine particles contained but by kinds of solvents and other additives and composition ratios thereof, etc., and therefore it is considered that a formation state of a fine particle aggregate may be controlled by adjusting these conditions.

Accordingly, when preparing a liquid composition of the present invention, it is preferable to take these phenomena into consideration and to have the form of the pore formed in the fine particle aggregate to be within the above described range.

Fine Particle

The following functions are expected for fine particles contained in a liquid composition in the present invention:
1) to adsorb a coloring material without spoiling coloring ability that the coloring material originally has when mixed with an ink; and
2) to lose dispersion stability and remain on a surface of the recording medium when mixed with an ink, or when applied to a recording medium. These functions may be attained by one kind or two kinds or more of fine particles.

As a character for satisfying the function of 1), for example, fine particles present ionicity contrary to the coloring material. Thereby, the fine particle can electrostatically adsorb the coloring material. When a coloring material is anionic, cationic fine particles are used, and reversely, when a coloring material cationic is used, anionic fine particles are used. As a factor for adsorbing a coloring material in addition to ionicity, size, weight and form of a surface of the fine particles is mentioned. For example, porous fine particles having many pores on the surface show distinctive adsorption characteristics, and can adsorb a coloring material due to two or more factors, such as size, form, etc. of the pores.

The function of 2) is caused by interaction between an ink and a recording medium. Therefore the function should just be attained by each constitution, for example, for fine particles exhibiting a character that presents ionicity contrary to that of the composition component of ink or of a recording medium constitution component is mentioned. Moreover, also coexistence of an electrolyte in an ink or a liquid composition can affect the dispersion stability of fine particle. In the present invention, it is desirable that one function of the above described functions of 1) and 2) is obtained in an instant. Furthermore, it is preferable that both of the above described functions 1) and 2) are obtained in an instant.

Hereinafter, description will be given in detail about a liquid composition containing fine particles that exhibit each ionicity. Namely, description will be given about a cationic liquid composition and an anionic liquid composition applicable to the present invention.

Cationic Liquid Composition

First, a cationic liquid composition that is an example of a liquid composition applicable to the present invention is described. As a cationic liquid composition, for example, a liquid composition in which fine particles exhibiting cationic group on surface and acids are contained and the fine particles are stably dispersed therein may be mentioned. In the present invention, for example, a composition in which pH is adjusted to 2 to 7, including acids, and a composition whose zeta potential is +5 to +90 mV may be suitably used as a cationic liquid composition.

pH and Zeta Potential

A zeta potential of a liquid composition is described. The basic principle of a zeta potential is shown hereinafter. Generally, when a free electric charge exists on the surface of a solid phase in a system where the solid is dispersed in a liquid, a layer that exhibits an opposite electric charge appears so as to maintain electric neutrality in the liquid phase in the vicinity of a solid phase interface. This is called an electric double layer and the electric potential difference caused by this electric double layer is called a zeta potential. When a zeta potential is plus, the surface of fine particles show a cationic property, and when minus, it shows an anionic property. Generally, the higher the absolute value is, the stronger the electrostatic repulsive force that works between the fine particles becomes, and, as a result, dispersibility is considered to be good and at the same time the ionicity on the surface of the fine particle is considered to be strong. That is, the higher the zeta potential of the cationic fine particle becomes, the stronger the cationic property becomes, and a force drawing the anionic compound in ink is considered to be strong.

Furthermore, as a result of wholehearted researches by the present inventors, it is found out that a colored part formed on a recording medium presents especially excellent coloring characteristics when a liquid composition in a range whose zeta potential is +5 to +90 mV is used. Although the reason is not clear, probably, since fine particles exhibit a moderate cationic property and rapid aggregation of an anionic compound (anionic coloring material) does not take place, the anionic compound adsorbs to the fine particle surface uniformly and thinly, and the coloring material cannot form a huge lake easily. Therefore, the original coloring characteristics of the coloring material are considered to be developed better. Furthermore, in a cationic liquid composition of the present invention, even after the anionic compound is adsorbed on the fine particle surface, the fine particles show a state of unstable dispersion while presenting a weak cationic property. Thereby, the fine particles are considered to easily adsorb, while aggregating together, on the anionic surfaces of cellulose fiber existing in a recording medium to remain easily in the vicinity of the recording medium.

Accordingly, it is considered that outstanding effects shown below are acquired. That is, an image may be obtained that exhibits outstanding coloring characteristics equivalent to the image in the coated paper for ink-jet, and that has few haze and color irregularities and has excellent color uniformity in an image range with many amounts of ink applying, such as a shadow part and a solid printed part. Moreover, since an anionic compound adsorbs to fine particles extremely efficiently and color is developed, and the amount of application of the cationic fine particles is also reduced as compared with the case in a coated paper. When printed on regular paper, texture of the printed paper is not especially spoiled and as a result, the printed portion presents outstanding rub-off resistance. In more preferable range of zeta potential, for example, when using a liquid composition containing a cationic fine particle in a range whose zeta potential is +10 to +85 mV, a boundary zone between dots becomes hardly visible, and much more reduction in crease line irregularity with a head scan is attained on the occasion of a solid printing. Furthermore when using a liquid composition containing cationic fine particles in a range whose zeta potential is +15 to +65 mV, an image exhibiting extremely excellent coloring ability is obtained independently of the type of paper.

A pH value of a cationic liquid composition by the present invention is preferably in a range of 2 to 7 at around 25° C., in the light of preservation stability and of adsorption property of an anionic compound. When the cationic liquid composition is mixed with an anionic ink within this range of pH, stability of the anionic compound is not reduced markedly, and therefore severe aggregation between the anionic compounds is not caused to prevent effectively a decrease in saturation of a recorded image or muddiness of an image. Moreover, since the cationic fine particle exhibits a good dispersed state within the above described range, the preservation stability of the liquid composition and the ejecting stability from a recording head are maintained good. Furthermore, since an anionic material fully adsorbs on the cationic fine particle surface when mixed with an ink, excessive penetration of the coloring material into the recording medium is suppressed, and an ink-jet recorded article of outstanding coloring ability is obtained. A preferable range of pH is three to six, and within this range corrosion of the recording head by long-term preservation is prevented extremely effectively, and at the same time rub-off resistance in a printing part is raised more.

Cationic Fine Particles

Next, a component that constitutes a cationic liquid composition of the present invention is described. In a cationic fine particle mentioned as a first component, it is necessary that a surface of the particle itself presents a cationic property in a state dispersed in the liquid composition in order to attain the above described operational advantage. The presence of anionic property on the surface thereof enables fast adsorption of an anionic coloring material on the surface of the particle when mixed with an anionic ink, and suppresses excessive penetration of the coloring material inside of a recording medium, and therefore a ink-jet recorded article of sufficient image density is obtained. On the other hand, when the fine particle surface is not cationic and the fine particles exist in a liquid composition apart from water-soluble cationic compounds, the coloring materials cause aggregation centering around the cationic compounds and coloring characteristics of the coloring material itself are impaired, and then achievement of coloring ability equivalent to an image in coated paper for ink-jet becomes difficult. Therefore, although fine particles used for a liquid composition of the present invention is necessary to have a cationic property on the surface, not to mention fine particles essentially cationic, as long as fine particles whose surface is cationized by processing it may be used for a liquid composition of the present invention, even if it is originally electrostatically anionic or neutral.

If a cationic fine particle suitably used by the present invention is fine particles in which pores are formed in aggregates by these fine particles formed on a recording medium, it will be enough to attain the objects of the present invention, and there will be especially no limitation in the material kind of the fine particle. As an example; cationized silica, alumina, hydrated alumina, titania, zirconia, boria, silicaboria, ceria, magnesia, silica-magnesia, calcium carbonate, magnesium carbonate, zinc oxide, and hydrotalcite, etc.; composite fine particles of the above described fine particles, organic fine particles, inorganic and organic composite fine particles, etc. are mentioned. And in a liquid composition of the present invention, the above described fine particles may be used independently or one or more of them may be used in combination.

When especially a hydrated alumina is used as fine particles, the particle surface preferably has a positive charge, and above all, a hydrated alumina that shows a boehmite structure with an X-ray diffraction method is preferable in respect of outstanding coloring ability, color uniformity, and preservation stability, etc. A hydrated alumina is defined by a following general formula.

$$Al_2O_{3-n}(OH)_{2n} \cdot mH_2O$$

where; n represents one of integers 0 to 3; and m represents a value of 0 to 10, preferably 0 to 5. In many cases, expression of $mH_2O$ can represent aqueous phase that does not participate in formation of a crystal lattice and that is possible to disorb, and, for this reason, m can also take a value that is not an integer. However, m and n does not take a value of 0 simultaneously.

Generally, a crystal of a hydrated alumina that shows a boehmite structure is a compound in layers whose (020) plane forms a huge plane, and shows a diffraction peak peculiar in an X-ray diffraction pattern. A structure that is called a pseudo boehmite that contains excessive water between layers of (020) plane other than a perfect boehmite may also be possible. The X-ray diffraction pattern of this pseudo boehmite shows a diffraction peak broader than that of a boehmite.

Since a boehmite and a pseudo boehmite are not distinguished clearly, unless it is defined clearly, especially in the present invention, both of them are included and called a hydrated alumina that shows boehmite structure (hereinafter a hydrated alumina). A peak that appears at angle of diffraction of 2θ in 14 to 15 degrees is measured, and from angle of diffraction 2θ of a peak, and a half width B, an interplanar spacing of (020) may be obtained using Bragg's equation, and a thickness of crystal (020) using Scherrer's equation. The interplanar spacing of (020) may be used as a standard of hydrophilicity and hydrophobicity of the hydrated alumina. Although a method for manufacturing of the hydrated alumina used by the present invention is not especially limited, well-known methods with which a hydrated alumina with boehmite structure can be manufactured, such as, a method of a hydrolysis of aluminum alkoxide, and of a hydrolysis of sodium aluminate may be used.

As is disclosed by Japanese Patent Application Laid-Open No. 56-120508, a hydrated alumina amorphous in X-ray diffraction may be used by being heat-treated above 50° C. under existence of water to be changed to boehmite structure. Especially preferable method is that acid is added to aluminum alkoxide with long chain, and a hydrated alumina is obtained by conducting hydrolysis-peptisation. Here, aluminum alkoxide with a long chain is alkoxide with carbon numbers of no less than five, furthermore, an alkoxide with carbon numbers 12 to 22 preferably enables easy removal of an alcohol content and easy form control of a hydrated alumina, as is mentioned later.

As an acid to be added, one kind or two kinds or more may be freely selected and used from organic acids and inorganic acids, and nitric acid is the most preferable when reaction efficiency of a hydrolysis and form control of an obtained hydrated alumina or dispersibility are taken into consideration. It is also possible to carry out hydrothermal synthesis etc. to control a particle diameter after the process. When hydrothermal synthesis is carried out using a dispersion of a hydrated alumina containing nitric acid, the nitric acid in an aqueous solution is incorporated as a nitric acid group on the hydrated alumina surface, and dispersibility in water of the hydrate can be improved. Moreover, an acid is suitably added to the hydrated alumina slurry after hydrothermal synthesis as required, and adjust of pH and concentration is conducted, and thus a hydrated alumina slurry that exhibits extremely stable high solid content will be prepared with little acid concentration. When such slurry is used, acids mentioned later need not to be separately added from outside, and a liquid composition of hydrated alumina fine particles that exhibits excellent dispersion stability may be prepared.

The above described method by hydrolysis of aluminum alkoxide has an advantage that impurities, such as various ions, hardly mix, as compared with a method for manufacturing alumina hydrogels and cationic aluminas. Furthermore, the aluminum alkoxide with long chain also has an advantage that the alcohol with long chain after a hydrolysis enables perfect dealcoholization of the hydrated alumina as compared to a case where, for example, an alkoxide with short chains, such as an aluminum isopropoxide, is used. It is preferable that pH of the solution at the time of starting of a hydrolysis is set less than six. With pH exceeding 8, since the hydrated alumina finally obtained becomes a crystalline substance, it is not preferable.

Moreover, hydrated alumina containing metal oxides, such as titanium dioxide, may also be used as hydrated alumina used by the present invention as long as they are hydrated alumina showing boehmite structure by an X-ray diffraction method. Since an optical density becomes higher, a content ratio of metal oxides, such as titanium dioxide is preferably 0.01 to 1.00 weight % of hydrated alumina, and more preferably 0.13 to 1.00 weight %. Within the range, a rate of adsorption of the coloring material improves and bleeding and beading are no longer hardly observed. Furthermore, the above described titanium dioxide needs to have valence of the titanium of +4. A content of titanium dioxide may be examined by ICP method by being fused in a boric acid. Moreover, distribution of titanium dioxide in a hydrated alumina and the valence of titanium may be analyzed using ESCA.

A change of content of titanium can be examined by etching a surface of a hydrated alumina with argon ion for 100 seconds and 500 seconds. When a valence of titanium in titanium dioxide becomes smaller than +4, the titanium dioxide will become to work as catalyst, weatherability of a printed article may be impaired, and after-yellowing of a printed portion may be caused easily.

Titanium dioxide may be contained only near the surface of a hydrated alumina, and may also be contained inside. Moreover, the content may be varying ranging from the surface to the inside. If titanium dioxide is contained only very near the surface, electrical property of the hydrated alumina is still more preferably maintained.

As a method for manufacturing of a hydrated alumina containing titanium dioxide, for example, a method for manufacturing by hydrolysis of the mixed liquor of aluminum alkoxide and titanium alkoxide that is indicated in "Surface Science" p.327 by Scientific Societies Press, Kenji Tamaru, 1985, is preferable. As other methods, a method may be mentioned in which a hydrated alumina is added as a nucleus of a crystal growth when a mixed liquor of the above described aluminum alkoxide and titanium alkoxide is hydrolyzed.

Instead of titanium dioxide, oxides of, such as, silica, magnesium, calcium, strontium, barium, zinc, boron, germanium, tin, lead, zirconium, indium, phosphorus, vanadium, niobium, a tantalum, chromium, molybdenum, tungsten, manganese, iron, cobalt, nickel, and ruthenium maybe used in combination. For example, a hydrated alumina containing silica exerts an effect on improvement in rub-off resistance of a printing portion.

The interplanar spacing of the plane (020) of the hydrated alumina used suitably for the present invention, it is preferable to be in a range of 0.614 nm to 0.626 nm. Within the range, the hydrated alumina particles inside of a liquid composition have a good dispersion stability, and the liquid composition excellent in preservation stability or ejecting stability is obtained. Although this reason is not certain, it is considered that since the ratio of hydrophobicity and hydrophilicity of a hydrated alumina exists in a moderate range if the interplanar spacing of a plane (020) exists within the above described range, the ejecting stability of a liquid composition is improved by stable dispersibility based on moderate repulsion between particles in the liquid composition, and by wettability moderate balance inside of a discharge port.

Moreover, the crystal thickness of the plane (020) of a hydrated alumina is preferably in a range of 4.0 nm to 10.0 nm, and transparency and adsorption property of the coloring material are excellent within this range. Since correlation exists between interplanar spacing of a (020) plane and crystal thickness of the (020) plane according to the knowledge of the present inventors, the crystal thickness of the (020) plane may be adjusted to a range of 4.0 nm to 10.0 nm if the interplanar spacing of a (020) plane is within the above described range.

Furthermore, since alumina (aluminum oxides) prepared by heat-treating, such as calcination of the above described hydrated alumina, aluminum metal, aluminum salt, etc. similarly exhibit positive charge, they are suitably used. Alumina has some forms of crystallized states of α type, γ type, δ type, χ type, η type, ρ type, and β type, and any of them may be usable as long as they disperse stably in water in a state where the surfaces of them are maintained cationic. Especially, γ type has an active surface and a high adsorption for a coloring material, thereby easily forms stable dispersed fine particles that are comparatively atomized to demonstrate outstanding coloring ability, storage quality, ejecting stability, etc., and thus it is suitably used.

Moreover, as the above described cationic fine particle used in the present invention, in the light of coloring ability after printing, uniformity of color, and preservation stability, cationic fine particles whose mean particle diameter measured by dynamic light scattering system is in a range 0.005 to 1 micrometer are suitably used. Within this range, excessive penetration into a recording medium is effectively prevented, and a uniformity decrease in coloring ability or color is suppressed. Moreover, sedimentation of the cationic fine particles in the liquid composition is suppressed, and also a decrease in preservation stability of the liquid composition is effectively prevented. More preferably a mean particle diameter is within a range of 0.01 to 0.8 micrometers and when such fine particles are used, especially preferable rub-off resistance of an image after being printed on a recording medium and texture of a recorded article are obtained. Furthermore preferably, a mean particle diameter is within a range of 0.03 to 0.3 micrometers, and preferably pores of a fine particle aggregate formed on a recording medium may be effectively formed within a target pore radius range by such fine particles.

Pore Physical Properties and Form of Cationic Fine Particles

Moreover, in the above described cationic fine particle used in the present invention, a maximum pore radius of the fine particle in the above described nitrogen adsorption desorption method is preferably in a range of 2 nm to 12 nm, and total pore volume is preferably no less than 0.3 ml/g so that pores of the fine particle aggregate formed on a recording medium may be formed efficiently and at the same time so that a coloring material may be efficiently adsorbed on the surface of the fine particle itself. More preferably, if a maximum pore radius of fine particles is in a range of 3 nm to 10 nm and a total pore volume is no less than 0.3 ml/g, pores of fine particle aggregate formed on a recording medium is preferably easy to be formed effectively within a target pore radius range.

When a BET specific surface area of the above described fine particles used in the present invention is within a range of 70 to 300 $m^2/g$, enough number of adsorption sites for the coloring material exist on the surface of fine particles, and the coloring material tends to remain in the vicinity of the surface of the recording medium more effectively in a monomolecular state, and it leads to improvement in coloring ability.

A form of fine particles used in the present invention may be observed in a way that the particle is dispersed in ion exchanged water and then is dropped on a collodion film to prepare a test sample, and the sample is observed by a transmission electron microscope. In the present invention, when fine particle aggregates are formed and pores are formed in the aggregates on a recording medium, fine particles having shapes of non-globular forms are preferably used in which primary particles with shapes of needle, plane table, or globe are linked with a certain directivity to form aggregated particles of, such as, shapes of cylinder or necklace shape.

According to the knowledge of the present inventors, fine particles with plate shape form has better dispersibility in water than particles with shape of needle, than capillarity bundle (cilia shape), and alignment of the fine particles is carried out at random, as a result, a big pore volume is preferably realized when fine particle aggregates are formed. A capillarity bundle form here means a state where needle-like fine particles are gathered with sides thereof touched together as bunch of the hair. In a pseudo boehmite in hydrated alumina that may be especially preferably used in the present invention, it is known that pseudo boehmites have form of cilia shape and other forms as is described in the above described reference (Rocek J., et al. Applied Catalysis, volume 74, pages 29 to 36, 1991).

An aspect ratio of a particle with table form may be obtained by a method defined as Japanese Patent Publication No. 5-16015. An aspect ratio is shown by a ratio of a diameter to a thickness of a particle. A diameter, here, shall indicate a diameter of a circle that has an area equal to a projected area of a particle, when a hydrated alumina is observed with a microscope or an electron microscope. A ratio of height size to width size is expressed by a ratio of a diameter indicating the minimum value and a diameter indicating maximum value of a table plane in the same observation as an aspect ratio. Moreover, in a case of capillarity bundle form, an aspect ratio is obtained in a way that each needlelike hydrated alumina particle that forms capillarity bundle is assumed to be a pillar, and a diameter and length of upper and lower face circle is obtained respectively to calculate a ratio thereof. In a form of most preferable hydrated alumina, it is preferable in a shape of a plate that an average aspect ratio is in a range of 3 to 10, and in a capillarity bundle an average aspect ratio is in a range of 3 to 10. If an average aspect ratio is in the above described range, a crevice is easily formed between particles and porous structure may be easily formed, when fine particle aggregates are formed.

For a content of the above described cationic fine particles in a liquid composition of the present invention, an optimal range is suitably determined based on types of materials to be used. In order to attain an object of the present invention, it is preferably in a range of 0.1 to 40%, and more preferably of 1 to 30%, and further preferably of 3 to 15% on a mass basis. A image with outstanding coloring can be stably obtained, and moreover, outstanding preservation stability of a liquid composition and outstanding ejecting stability also are acquired independently of the type of paper within the range.

Acid

It is preferable as stated previously that a liquid composition of the present invention contains acid and pH value thereof is adjusted to 2 to 7. The acid that is a second component improves dispersion stability of the fine particle in the liquid by ionizing a surface of cationic fine particles and increasing surface potential, and at the same time plays a role for increasing adsorption of an anionic compound in an ink (anionic coloring material), and for adjusting viscosity of the liquid composition. As long as an acid used suitable for the present invention is an acid that gives desired physical properties, such as pH, and zeta potential or fine particle dispersibility in combination with the cationic fine particle to be used, there is not especially any limitation. The acid may be used freely selecting from a group of inorganic acids, organic acids, etc. shown below.

Specific examples of the inorganic acids include hydrochloric acid, sulfuric acid, sulfurous acid, nitric acid, nitrous acid, phosphoric acid, boric acid and carbonic acid. The organic acids may be carboxylic acids, sulfonic acids and amino acids as mentioned below.

Examples of the carboxylic acids are formic acid, acetic acid, chloroacetic acid, dichloroacetic acid, trichloroacetic acid, fluoroacetic acid, trimethylacetic acid, methoxy-acetic acid, mercaptoacetic acid, glycolic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, m-aminobenzoic acid and p-amino-benzoic acid, o-methoxy benzoic acid, m-methoxy benzoic acid, and p-methoxybenzoic acid.

Examples of the sulfonic acids include benzenesulfonic acid, methylbenzenesulfonic acid, ethylbenzenesulfonic acid, dodecylbenzenesulfonic acid, 2,4,6-trimethylbenzenesulfonic acid, 2,4-dimethyl-benzenesulfonic acid, 5-sulfosalicylic acid, 1-sulfo-naphthalene, 2-sulfonaphthalene, hexanesulfonic acid, octanesulfonic acid and dodecanesulfonic acid.

Examples of the amino acids are glycine, alanine, valine, α-aminobutyric acid, γ-aminobutyric acid, β-alanine, taurine, serine, ε-amino-n-caproic acid, leucine, norleucine and phenylalanine.

These may be used either singly or in any combination thereof in the liquid composition used in the present invention. Among these, in particular, acids having a primary dissociation constant pKa in water of 5 or less may be preferably used to enhance the dispersion stability of cationic fine particles and the ability to adsorb anionic compounds. Specific examples thereof are hydrochloric acid, nitric acid, sulfuric acid, phosphoric acid, acetic acid, formic acid, oxalic acid, lactic acid, citric acid, maleic acid and malonic acid.

With respect to the liquid composition of the invention, it is preferable to control the mixing ratio of cationic fine particle (A) and the acid (B) in the liquid composition in a range from A:B=(200:1) to (5:1) on the basis of weight, more preferably (150:1) to (8:1) from the aspect of improvement of the dispersion stability of the cationic fine particle and improvement of the adsorption property of the anionic compound to the fine particle surface.

Other Constituent Component

Next, other components composing the cationic liquid composition will be described more particularly. The cationic liquid composition of the invention, which contains the above-described cationic fine particle as an indispensable component and preferably the above-described acid and besides, as a liquid medium, generally, water, may further contain a water-soluble organic solvent and other additives.

Examples of the water-soluble organic solvent used herein include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, 1,2,6-hexanetriol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, glycerol, N-methyl-2-pyrrolidone, 1,3-dimethylimidazolidinone, triethanolamine, sulfolane and dimethyl sulfoxide. No particular limitation is imposed on the content of the water-soluble organic solvent. However, it is preferably within a range of from 5 to 60%, more preferably from 5 to 40% based on the total weight of the liquid composition.

Besides the above components, additives such as viscosity modifiers, pH adjustors, antiseptics, various surfactants, antioxidants, evaporation accelerators, water-soluble cationic compounds and binder resins may be suitably incorporated as needed. The selection of the surfactants is particularly important from the viewpoint of controlling the penetrability of the liquid composition into a recording medium. The water-soluble cationic compounds may be freely selected so far as the action and effect of the present invention is not impeded, for example, in order to impart additional cationic nature to the liquid composition.

The binder resins may be used in combination within a limit not impeding the texture of the recording medium used and the storage stability and ejection stability of the liquid composition, for example, to further improve the rub-off resistance of the cationic fine particles, and may be freely selected from water-soluble polymers, emulsions, latexes, etc.

Surface Tension of the Liquid Composition

The liquid composition used in the present invention is preferably colorless or white, but may be toned according to the color of the recording medium used. Preferable physical properties of the liquid composition as described above are, the surface tension in a range of from 10 to 60 mN/m (dyn/cm), preferably 10 to 40 mN/m (dyn/cm), and the viscosity in a range of from 1 to 30 mPa·s (cP).

Anionic Liquid Composition

The liquid composition usable for the invention is not limited to the above-described cationic liquid composition but an anionic liquid composition is also usable. The anionic liquid composition of the invention contains a fine particle bearing an anionic group in the surface as an indispensable constituent component and has a feature that the fine particle is stably dispersed and those further containing a base and controlled pH to be 7 to 12 and zeta potential to be −5 to −90 mV are preferable.

Regarding pH and Zeta Potential

As a result of the eager investigations performed by inventors of the invention, it is found out that the liquid composition having a zeta potential in a range from −5 to −90 mV, the cationic compound (cationic coloring material) in the ink is efficiently adsorbed on the surface of the anionic fine particle and an especially excellent coloring property is provided on an object recording medium. The reason for that is not clear but, similarly to that in the case of the previously described cationic liquid composition, it is probably attributed to that owing to the proper anionic property of the fine particle, the cationic compound in the ink does not rapidly cohere in the ink and therefore is evenly adsorbed in a thin state on the surface of the fine particle and accordingly the coloring material does no form a huge lake to result in well development of the intrinsic coloring property of the coloring material. Further, in the anionic liquid composition of the invention, it is supposed that the dispersion becomes unstable after the adsorption of the cationic compound on the surface of the fine particle and each fine particle cohere together because of the concentration change at the time of penetration of the solvent component in the object recording material to easily remain in the vicinity of the surface.

Consequently, the above described excellent effects are supposed to be obtained. That is, the coloring properties are as excellent as those in the case of using coat paper for ink jet and excellent color evenness with little white fog and color unevenness can be obtained in image forming areas such as the shadow areas and solid areas where the ink supply is high. Further, as compared with the coat paper, the cationic compound is adsorbed efficiently on the fine particle and colors, so that the supply amount of the anionic fine particle can be decreased, and particularly in the case of printing in ordinary paper, the paper feel is maintained and the rub-off resistance of the printing portions is improved. As the preferable range of the zeta potential, for example, in the case of using a liquid composition containing the anionic fine particle with a zeta potential of −10 to −85 mV, boundaries among dots are not so much recognized at the time of solid printing and stripe unevenness by head scanning can further be decreased and in the case of using a liquid composition containing the anionic fine particle with a zeta potential of −15 to −65 mV, irrespective of the kind of paper, an image with extremely excellent coloring property can be obtained.

In the invention, pH of the anionic liquid composition is preferably in a range of 7 to 12 at about 25° C. from an aspect of the storage stability and the adsorption property of the cationic compound. In this pH range, in the case of mixing with a cationic ink, the stability of the cationic compound is not so much decreased to cause the strong cohesion of the cationic compound and accordingly the chromaticness decrease of printings and dull image formation can efficiently be prevented. Further, within the above-described range, the dispersion property of the anionic fine particle is also excellent, so that the storage stability of the liquid composition and the ejection stability out of the recording head can be maintained well. Also, in the case of mixing with an ink, the cationic substance is sufficiently adsorbed in the anionic fine particle surface to prevent the excess penetration of the coloring material in the inside of the object recording medium, so that an ink jet printings with excellent coloring property can be obtained. The further preferable pH range of the liquid composition is from 8 to 11 and with pH in this range, the recording head corrosion owing to a long term storage can effectively prevented and at the same time, rub-off resistance of the printing portions is much improved.

Anionic Fine Particle

Next, components composing the anionic liquid composition of the invention will be described. The anionic fine particle to be exemplified as a first component is preferably those showing anionic in the surface of their particle in the state dispersed in the liquid composition. Having anionic surface, adsorption of the cationic coloring material on the surface is made possible in the case of mixing with a cationic ink and the excess penetration of the coloring material in the inside of the object recording medium can be suppressed and accordingly, an ink jet printing with a sufficient image density can be obtained. On the other hand, in case the fine particle does not have anionic surface and exists separately from the water soluble anionic compound, the coloring material causes cohesion around the anionic compound to make it difficult to give coloring property as excellent as coat paper for ink jet. Therefore, the fine particle to be used for the liquid composition of the invention is required to bear anionic charge in the surface. Not only naturally anionic fine particle but also fine particles being electrostatically cationic or neutral by nature but having anionic surface by a treatment can be used.

No particular limitation is imposed on the kind of material for the anionic fine particle preferably used in the invention since the purpose of the invention can sufficiently be satisfied if the material is capable of forming fine pores in the cohering substances of the fine particle formed in the object recording medium. Particular examples of the material include anionized silica, titania, zirconia, boria, silica boria, ceria, magnesia, silica magnesia, calcium carbonate, magnesium carbonate, zinc oxide, their composite fine particles, organic fine particles, inorganic-organic composite fine particles and the like. In the liquid composition of the invention, one or more of these compounds may be used in form of a mixture.

From an aspect of coloring and even coloring ability and storage stability of the ink after printing, similarly to the case of the previously described cationic fine particle, the anionic fine particle to be used in the invention is preferable to have an average particle diameter in a range from 0.005 to 1 $\mu$m measured by the dynamic light scattering method. More preferably, an average particle diameter is in a range from 0.01 to 0.8 $\mu$m and use of such a fine particle makes the rub-off resistance and the texture of printing on an object recording medium particularly preferable. Further preferably, an average particle diameter is in a range from 0.03 to 0.3 μm and such a fine particle is capable of effectively forming fine pores of fine particle cohering substances to be formed in the object recording medium in an aimed range of the fine pore region and therefore it is preferable.

Fine Pore Physical Property and Shape of Anionic Fine Particle

Further, the foregoing anionic fine particle to be used for the invention is preferable to have the maximum fine pore radius of 2 nm to 12 nm measured by foregoing nitrogen adsorption and desortion method and the total fine pore volume of 0.3 ml/g or higher in order to effectively form fine pores of fine particle cohering substances to be formed in the object recording medium and simultaneously to efficiently adsorb the coloring material on the surface of the fine particle itself. Those having the maximum fine pore radius of 3 nm to 10 nm and the total fine pore volume of 0.3 ml/g or higher are more preferable since fine pores of fine particle cohering substances to be formed in the object recording medium can be formed effectively in the aimed pore radius areas.

If the BET specific surface area of the fine particle to be used in the invention is in a range from 70 to 300 m$^2$/g, the adsorption points of the coloring material in the fine particle surface sufficiently exist to effectively leave the coloring material in a monomolecular state in the vicinity of the surface of the object recording medium, resulting in contribution to improvement of the coloration property.

The shape of the fine particle to be used for the invention can be controlled by producing a measurement specimen by dispersing the fine particle in ion exchange water and dropwise titrating the dispersion on a corrosion film and then observing the resulting film with a transmission electron microscope. At the time of forming the fine particle cohering substance on the object recording material in the invention, from an aspect of formation of fine pores in the cohering substance, the shape of the fine particle to be used is preferably whisker-like, scaly, or in a non-spherical shape such as rod-like or necklace type forming secondary particle where each spherical primary particle is linked with others in a certain direction. According to the findings by inventors of the invention, those with a scaly shape have better dispersibility in water than whisker-like ones and preferable since the fine pore volume is increased owing to the random orientation of the fine particle in the case the fine particle cohering substance is formed.

The content of the anionic fine particle described above in the liquid composition may be determined properly to be in the optimum range depending on the type of the substance used and preferably in a range of 0.1 to 40% by weight in order to achieve the purpose of the invention, more preferably 1 to 30% by weight, and furthermore preferably 3 to 15% by weight. Within such ranges, irrespective of the type of paper, images with excellent coloration can stably be obtained and the storage stability and the ejection stability of the liquid composition are excellent.

Base

As described before, the anionic liquid composition of the invention preferably contains a base and has a pH value adjusted at 7 to 12 and the second component, the base, ionizes the surface of the anionic fine particle and increases the surface potential in order to improve the dispersion stability in the liquid and also improves the adsorption of the cationic compound (a cationic coloring material) in the ink and adjusts the viscosity of the liquid composition. The base to be used preferably for the invention is not particularly limited if it gives desired physical properties such as pH, zeta potential, and fine particle dispersibility in the case of combination with the anionic fine particle to be used and optionally selected from the following inorganic compounds and organic compounds.

Substantially, these compounds include sodium hydroxide, lithium hydroxide, sodium carbonate, ammonium carbonate, ammonia, sodium acetate, ammonium acetate, morpholine, and an alkanolamine such as monoethanolamine, diethonolamine, triethanolamine, ethylmonoethanolamine, n-butylmonoethanolamine, dimethylethanolamine, diethylethanolamine, etheldiethanolamine, n-butyldiethanolamine, di-n-butylethanolamine, monoisopropanolamine, diisopropanolamine, triisopropanolamine, and the like. Among them, particularly a base having a primary dissociation constant pkb in water of 5 or lower is preferable to be used since it is excellent in the dispersion stability for the anionic fine particle and adsorption property of the cationic compound Cationic Coloring Material The mixing ratio of anionic fine particle (A) and base (B) in the liquid composition is preferably A:B=200:1 to 5:1, more preferably 150:1 to 8:1, since liquid composition of such a mixing ratio provides improved dispersion stability of ionic fine particle, and improved adhesion of cationic compound on the surface of the fine particle.

Other Constituent Components

Next, other constituent components composing the anionic liquid composition will be described particularly. The anionic liquid composition of the invention contains the above-described anionic fine particle as an essential component, preferably the above-described base, and besides, generally water as a liquid medium and further, a water-soluble organic solvent, and as other additives, for example, a viscosity adjusting agent, a pH adjusting agent, an anti-corrosion agent, various surfactants, an anti-oxidant, an evaporation accelerator, a water-soluble anionic compound, and binder resin may properly be added.

Surface Tension of Liquid Composition

The anionic liquid composition of the invention is preferably colorless or white, yet color adjustment may be carried out corresponding to the color of an object recording medium. The preferable ranges of the above-described various physical properties of the liquid composition are 10 to 60 mN/m (dyn/cm), preferably 10 to 40 mN/m (dyn/cm), for the surface tension and 1 to 30 mPa·s (cP) for the viscosity.

Production of Liquid Composition

The production method to be employed for producing the liquid composition of the invention containing the foregoing fine particles may be selected from methods generally employed for dispersion. Substantially, dispersion treatment methods using a dispersion apparatus such as a roll mill, a sand mill, a homogenizer, a ultrasonic homogenizer, a ultrahigh pressure emulsifier (e.g. Nanomizer, trade name) and the like and classification treatment methods by centrifugal separation, ultrafiltration and the like are preferable to be employed to make the average diameter of fine particles and particle size distribution in the liquid composition within the above described image. By using these treatment means, the dispersion particle diameter of the fine particles in the load cell can be made even.

Water-Soluble Ink

Anionic Ink

Next, the following is the description of a water-soluble anionic ink to compose an ink set of the invention in combination with the above-described cationic liquid composition. In this case, the ink set means a combination of the liquid composition of the invention and at least one kind anionic ink containing an anionic substance (anionic coloring material). Also, at least one kind of ink combinations obtained by removing the liquid composition of the invention from the ink set is called as an ink subset. The anionic ink to be used for the invention preferably contains an anionic compound in combination (in the invention, it is also called as the anionic coloring material), in the case of using a water-soluble dye containing an anionic group as the coloring material or a pigment as the coloring material. Such an anionic ink as described above to be used for the invention may further contain water, a water-soluble organic solvent, and other components, e.g., a viscosity adjusting agent, a pH adjusting agent, an anti-corrosion agent, a surfactant, an anti-oxidant, and the like based on the necessity. Hereinafter, the respective constituent components will be described.

Water-Soluble Dye

No particular limitation is imposed on the water-soluble dyes having an anionic group used in the present invention so far as they are listed in the Color Index, for example, water-soluble acid dyes, direct dyes or reactive dyes. Dyes not listed in the Color Index may also be used without any particular limitation so far as they have an anionic group, for example, a sulfonic group or a carboxylic group. The water-soluble dyes used herein include those having pH dependent solubility.

Pigment

Another aspect of the aqueous anionic ink is an ink containing a pigment and an anionic compound in place of a water-soluble dye having an anionic group as described. It further contains water, a water-soluble organic solvent and other optional components such as a viscosity modifier, a pH adjustor, an antiseptic, a surfactant, and an antioxidant. In such an ink, the anionic compound may be contained as a dispersing agent for the pigment. The dispersing agent for the pigment may not be anionic, so long as the ink contains an anionic compound. Of course, when the dispersing agent is anionic, another anionic compound may be added.

No particular limitation is imposed on pigments usable in the present invention. However, for example, pigments described below may be preferably used.

As carbon black used in black pigment inks, is preferably those produced by the furnace process or channel process having the primary particle diameter of from 15 to 40 m$\mu$m, the specific surface area of from 50 to 300 m$^2$/g as measured by the BET method, the oil absorption of from 40 to 150 ml/100 g as determined by using DBP, the volatile matter of from 0.5 to 10% by weight, and pH of from 2 to 9.

Examples of commercially-available carbon black having such properties include No. 2300, No. 900, MCF88, No. 40, No. 52, MA7, MA8 and No. 2200B (all, products of Mitsubishi Chemical Corp.) RAVEN 1255 (product of Columbian Carbon Japan Limited), REGAL 400R, REGAL 660R and MOGUL L (all, products of CABOT CO.), and Color Black FW1, Color Black FW18, Color Black S170, Color Black S150, Printex 35 and Printex U (all, products of Degussa AG). It may be newly prepared for the present invention.

Examples of pigments used in yellow inks include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83.

Examples of pigments used in magenta inks include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122.

Examples of pigments used in cyan inks include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6.

Also, they may be those newly prepared for the present invention.

Dispersing Agent for Pigment

As a dispersing agent for pigment in the present invention, any water soluble resin may be used so far as it can disperse a pigment stably in water or an aqueous medium by the action of an anionic group. However, those having a weight average molecular weight ranging from 1,000 to 30,000, more preferably from 3,000 to 15,000 are particularly preferred. Specific examples of such water-soluble resins include block copolymers, graft copolymers and random copolymers composed of at least two monomers selected from hydrophobic monomers such as styrene, styrene derivatives, vipylnaphthalene, vinylnaphthalene derivatives and aliphatic alcohol esters of $\alpha$, $\beta$-ethylenically unsaturated carboxylic acids, and hydrophilic monomers such as acrylic acid and derivatives thereof, maleic acid and derivatives thereof, itaconic acid and derivatives thereof, and fumaric acid and derivatives thereof, and salts of these copolymers. These resins are alkali-soluble resins which dissolve in an aqueous solution of a base.

Besides, homopolymers composed of a hydrophilic monomer, or salts thereof may also be used. Further, water-soluble resins such as polyvinyl alcohol, carboxymethyl cellulose and condensates of naphthalenesulfonic acid and formaldehyde may also be used. However, use of an alkali-soluble resin has a merit that the viscosity of the resulting dispersion becomes lower, and dispersing operation easier. These water-soluble resins are preferably used within a range of from 0.1 to 5% by weight based on the total weight of the ink.

The pigment inks used in the present invention are prepared by dispersing or dissolving such pigment and water-soluble resin as described above in an aqueous medium. The aqueous medium preferably used in the pigment inks is a mixed solvent of water and a water-soluble organic solvent. As the water, it is preferable to use ion-exchanged water (deionized water) instead of tap water containing various ions.

When the dispersing agent is not an anionic polymer, it is preferable to further add an anionic compound to the above-described pigment-containing inks. Examples of such anionic compounds include low-molecular weight anionic surfactants as well as the high-molecular substances such as the alkali-soluble resins as described above.

As specific examples of low molecular weight anionic surface active agent, for example; disodium lauryl sulfosuccinate, disodium polyoxyethylene lauroyl ethanolamide ester sulfosucciate, disodium polyoxyethylene alkyl sulfosuccinate, carboxylated polyoxyethylene laurylether sodium salt, carboxylated polyoxyethylene tridecylether sodium salt, sodium polyoxyethylene laurylether sulfate, polyoxyethylene laurylether sulfate triethanolamine, sodium polyoxyethylene alkylether sulfate, sodium alkyl sulfate, alkyl sulfuric acid triethanolamine, etc. may be mentioned, but it is not necessarily limited to them. The used amount of such an anionic substance as described above is preferably within a range of from 0.05 to 10% by weight, more preferably from 0.05 to 5% by weight based on the total weight of the ink.

Self-Dispersing Pigment

As a pigment usable in the anionic inks, it may be used a self-dispersing pigment which can be dispersed in water or an aqueous medium without using any dispersing agent. The self-dispersing pigment is a pigment having at least one kind of anionic hydrophilic group bonded directly or through another atomic group to the surface. As anionic hydrophilic groups, for example; at least one kind of groups selected from hydrophilic groups shown below; other atomic groups further are alkyl groups that have 1 to 12 of carbon atoms; phenyl group that may have substituents; or naphthyl group that may have substituents may be mentioned.

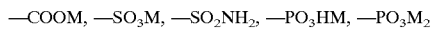

—COOM, —SO$_3$M, —SO$_2$NH$_2$, —PO$_3$HM, —PO$_3$M$_2$ (where, M represents hydrogen atom, alkali metal, ammonium, or organic ammonium.)

Since the pigment anionically charged by introducing the hydrophilic group into the surface of pigment exhibits excellent dispersibility in water by virtue of repulsion of the ion thereof, it retains a stably dispersed state without adding any dispersing agent or the like even when it is contained in an aqueous ink. Preferably, the pigment is a carbon black.

Additive Components in Ink

Besides the above components, a surfactant, an antifoaming agent, an antiseptic or the like may be added into the inks to have desired property, as needed, and a commercially available water soluble-dye or the like may also be added.

Examples of the surfactant include anionic surfactants such as fatty acid salts, salts of higher alcohol sulfuric esters, salts of liquid fatty oil sulfuric esters and alkylarylsulfonic acid salts; and nonionic surfactants such as polyoxyethylene alkyl ethers, polyoxyethylene alkyl esters, polyoxyethylene sorbitan alkyl esters, acetylene alcohol and acetylene glycol. One or more of these surfactants may be suitable chosen for use. The amount of the surfactant used varies according to the kind of the dispersing agent used, but is desirably within a range of from 0.01 to 5% by weight based on the total weight of the ink. It is preferred that the amount of the surfactant added be determined in such a manner that the surface tension of the resulting ink is at least 30 mN/m (dyne/cm), because the occurrence of deformed printing (inaccurate ink landing) due to wetting of an orifice can be effectively prevented in an ink-jet recording system used in the present invention.

Pigment inks as described above are prepared as follows. First, a pigment is added to an aqueous solution containing at least a pigment dispersing resin and water. The mixture is stirred and then subjected to a dispersion treatment by dispersing means described later, and if necessary, to a centrifugal treatment to obtain a desired dispersion. Other components as mentioned above are then added to the dispersion and stirred to prepare an ink.

When an alkali-soluble resin is used, a base or amine must be added to dissolve the resin in the dispersion. In this case, the amine or base must be added at least in an amount calculated from the acid value of the resin according to the following equation.

$$\text{Amount (g) of amine or base} = \frac{(\text{acid value of the resin}) \times (\text{molecular weight of the amine or base}) \times (\text{amount of the resin)(g)}}{5600} \quad [\text{Equation 1}]$$

It is effective for good dispersion of the pigments to conduct premixing of a pigment suspension for at least 30 minutes before the dispersion treatment. This premixing serves to improve the wettability of the surface of the pigment and facilitate adsorption of the dispersing agent on the pigment surface.

Preferable examples of the base to be added to the dispersion containing the alkali-soluble resin as a dispersant include organic amine such as monoethanolamine, diethanolamine, triethanolamine, aminomethylpropanol and ammonia, and inorganic bases such as potassium hydroxide and sodium hydroxide.

Any ordinary dispersing machine may be employed as a dispersing machine to prepare the pigment ink. Examples thereof include ball mills, sand mills, etc. Of these mills, a high-speed sand mill may preferably be used, such as Super Mill, Sand Grinder, Beads Mill, Agitator Mill, Grain Mill, Dyno Mill, Pearl Mill and Coball Mill (all are trade names).

In addition, if necessary, additives, such as water-soluble organic solvents, surface active agents, pH adjusting agents, rust preventives, fungicides, antioxidants, evaporation accelerators, chelating agents, and water-soluble polymers other than the above described components, may be added into inks used in the present invention.

A liquid medium that may be used in the present invention that dissolves or disperses the above described coloring materials is preferably a mixture of water and water-soluble organic solvents. As practical water-soluble organic solvents, following examples may be mentioned, for example; alkyl alcohols with 1 to 4 carbons, such as, methyl alcohol, ethyl alcohol, n-propyl alcohol, isopropyl alcohol, n-butyl alcohol, sec-butyl alcohol, and tert-butyl alcohol, etc.; amides, such as dimethylformamide, and dimethylacetamide; ketones, such as acetone; ethers, such as tetrahydrofuran and dioxane; polyalkyleneglycols, such as polyethylene glycol, and polypropylene glycol; alkylene glycols in which an alkylene group contains 2 to 6 carbon atoms, such as, ethylene glycol, propylene glycol, butylene glycol, triethylene glycol, 1,2,6-hexane triol, thiodiglycol, hexylene glycol, diethylene glycol, etc.; lower alkyl ethers of polyhydric alcohol, such as, glycerine, ethylene glycol monomethyl (or ethyl) ether, diethylene glycol monomethyl (or ethyl) ether, etc.; cyclic amide compounds, such as, N-methyl-2-pyrrolidone, 1,3-dimethyl-2-imidazoridinone, sulfolane, dimethyl sulfo oxide, 2-pyrolidone, epsilon caprolactam, etc.; and imido compounds, such as succinimide etc.

A content of the above described water-soluble organic solvent, in general, preferably is 1% to 40% to total weight of ink, and more preferably 3% to 30%. Moreover, when a range of 30 to 95 weight % is adopted as a content of water in ink, good solubility of a coloring material is acquired, increase in viscosity of ink is suppressed, and fixing characteristics can fully be satisfied.

The anionic inks used in the present invention may also be used for general water-soluble writing utensils, but are particularly suitable for use in an ink-jet recording system of a type that an ink is ejected by the bubbling phenomenon of the ink caused by thermal energy. This recording system has a feature that the ejection of the ink becomes extremely stable, and no satellite dots generate. In this case, the thermal properties (for example, the specific heat, the coefficient of thermal expansion, the heat conductivity, etc.) of the inks may however be controlled in some cases.

Cationic Ink

An aqueous cationic ink constituting an ink set of the present invention in combination with an anionic liquid composition described above will now be described. An ink set here indicates a combination of at least one or more kinds of inks containing a liquid composition and cationic material (cationic coloring material) of the present invention. Moreover a combination of at least one or more kinds of ink in which a liquid composition of the present invention is excluded from the ink set is called an ink subset. In cationic ink used in the present invention, it is preferable that a water soluble dye containing cationic groups is used as coloring material, or that a cationic compound is used together (this combined example is also called a cationic coloring material in the present invention) when pigment is used as coloring material. In addition to the coloring material, the cationic ink in the present invention further contains water, a water-soluble organic solvent and other components, for example, a viscosity modifier, a pH adjustor, an antiseptic, a surfactant, an antioxidant, and the like in addition to the above-described components, etc., as needed. These individual components for the ink will hereinafter be described.

Water-Soluble Dye

No particular limitation is imposed on the water-soluble dyes having a cationic group used in the present invention so far as they are listed in the Color Index. Dyes not listed in the Color Index may also be used without any particular limitation so far as they have an cationic group. The water-soluble dyes used herein include those having pH dependent solubility.

Pigment

Another aspect of the aqueous anionic ink is an ink containing a pigment and a cationic compound in place of a water-soluble dye having a cationic group as described. It further contains water, a water-soluble organic solvent and other optional components such as a viscosity modifier, a pH adjustor, an antiseptic, a surfactant, or an antioxidant as needed. In such an ink, the cationic compound may be contained as a dispersing agent for the pigment. The dispersing agent for the pigment may not be cationic, so long as the ink contains a cationic compound. Of course, when the dispersing agent is cationic, another cationic compound may be added. No particular limitation is imposed on pigments usable in the present invention. Pigments described in the item of Anionic ink may be suitably used.

Dispersing Agent for Pigment

As a dispersing agent for pigment in the ink of the present invention, any water soluble resin may be used so far as it can disperse a pigment stably in water or an aqueous medium by the action of a cationic group. Specific examples thereof may include those obtained by polymerization of a vinyl monomer and having a cationic nature in at least a part of the resulting polymer. Examples of a cationic monomer for forming the cationic moiety include salts of such tertiary amine monomers as described below, and quaternized product thereof.

Namely, there are mentioned N,N-dimethylaminoethyl methacrylate $[CH_2=C(CH_3)-COO-C_2H_4N(CH_3)_2]$,
N,N-dimethyl-aminoethyl acrylate $[CH_2=CH-COO-C_2H_4N(CH_3)_2]$,
N,N-dimethylaminopropyl methacrylate $[CH_2=C(CH_3)-COO-C_3H_6N(CH_3)_2]$,
N,N-dimethylaminopropyl acrylate $[CH_2=CH-COO-C_3H_6N(CH_3)_2]$,
N,N-dimethylacrylamide $[CH_2=CH-CON(CH_3)_2]$,
N,N-dimethylmethacrylamide $[CH_2=C(CH_3)-CON(CH_3)_2]$,
N,N-dimethylaminoethylacrylamide $[CH_2=CH-CONHC_2H_4N(CH_3)_2]$,
N,N-dimethylaminoethylmethacrylamide $[CH_2=C(CH_3)-CONHC_2H_4N(CH_3)_2]$,
N,N-dimethylaminopropylacrylamide $[CH_2=CH-CONH-C_3H_6N(CH_3)_2]$ and
N,N-dimethylaminopropyl-methacrylamide $[CH_2=C(CH_3)-CONH-C_3H_6N(CH_3)_2]$.

In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin. Among these, methyl chloride and dimethylsulfuric acid are preferred for preparing a dispersing agent used in the present invention. Such tertiary amine salts or quaternary ammonium compounds as described above behave as a cation in water, and under neutralized conditions, they are stably soluble in an acidic region. The content of these monomers in the copolymer is preferably within a range of from 20 to 60% by weight.

Examples of other monomers used in the formation of the above-described high-molecular dispersing agent include hydrophobic monomers, for example, acrylic esters having a hydroxyl group, such as 2-hydroxyethyl methacrylate; and acrylic esters having a side chain of long ethylene oxide chain; and styrene monomers, and water-soluble monomers soluble in water at a pH of about 7, such as acrylamides, vinyl ethers, vinylpyrrolidones, vinylpyridines and vinyloxazolidines. As the hydrophobic monomers, styrene, styrene derivatives, vinylnaphthalene, vinylnaphthalene derivatives, (meth)acrylic acid alkyl esters and acrylonitrile can be used. In the high-molecular dispersing agent obtained by the copolymerization, the water-soluble monomer be used in the range of from 15 to 35% by weight for the stability of the copolymer in an aqueous solution, and the hydrophobic monomer be used in the range of from 20 to 40% by weight for enhancing the dispersing effect of the copolymer to the pigment.

Self-Dispersing Pigment

As a cationically charged pigment, those having at least one hydrophilic group selected from following quaternary ammonium groups bonded directly or through another atomic group to the surface thereof can be used. However, in the present invention, the hydrophilic groups are not limited thereto.
—$SO_2N^+H_3$,
—$SO_2N^+H_2COR$,

—N⁺H₃,
—N⁺R₃,

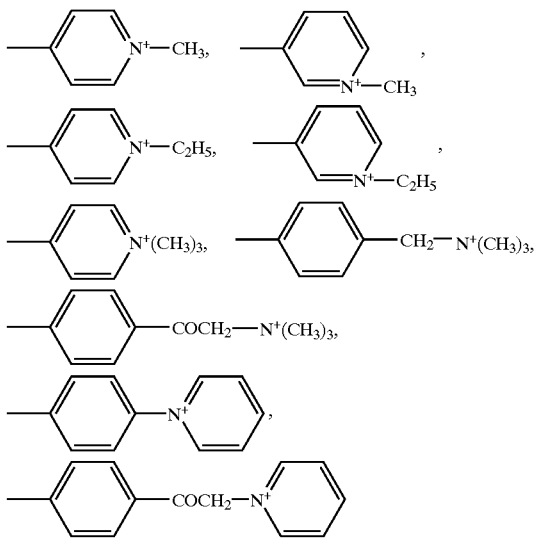

wherein R is a linear or branched alkyl group having 1 to 12 carbon atoms, a substituted or unsubstituted phenyl group, or a substituted or unsubstituted naphthyl group. Incidentally, the above-mentioned cationic groups may have, for example, $NO_3^-$ or $CH_3COO^-$ as a counter ion.

A preparation method of a cationically charged self-dispersing pigment due to its hydrophilic group is explained with a method to introduce to pigment an N-ethylpyridyl group:

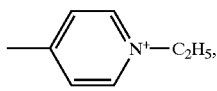

by treating carbon black with 3-amino-N-ethyl pyridinium bromide.

Since the pigment cationically charged by introducing the hydrophilic group into the surface of pigment in the above-described manner exhibits excellent dispersibility in water by virtue of repulsion of the ion thereof, it retains a stably dispersed state without adding any dispersing agent or the like even when it is contained in an aqueous ink. Preferably, the pigment is a carbon black.

Surface Tension of Ink

The cationic inks used in the present invention may desirably be controlled so as to have, as their own physical properties at 25° C., a surface tension of 30 to 68 mN/m (dyn/cm) and a viscosity of 15 mPa·s (cP) or lower, preferably 10 mPa·s (cP) or lower, more preferably 5 mPa·s (cP) or lower from the viewpoints of improving the penetrability of the inks in printed images when printed on plain paper or the like, and at the same time making the matching of the inks with an ink-jet head good.

Ink Concentration

The concentration by weight of each coloring material contained in the above-described anionic and cationic inks is suitably selected according to the kind of coloring material such as a water-soluble dye, pigment or self-dispersing pigment, but is preferably within the range of from 0.1 to 20% by weight, particularly from 0.1 to 12% by weight based on the weight of the ink.

Coloring of the formed image becomes especially excellent under the recording condition of normal two liquid system when the concentration ratio of the fine particles in the liquid composition to the coloring material in the ink are 1.2 or less. More preferably 1.0 or less, provided that the coloring material concentration in the ink is in the range of from 0.3 to 7% by weight.

Method for Forming Coloring Portion on Object Recording Medium

Next, a method for forming coloring portions on an object recording medium of the invention will be described. The method for forming coloring portions on the object recording medium of the invention comprises steps (i) supplying anionic or cationic ink containing a coloring material to the object recording medium and (ii) supplying a liquid composition containing a fine particle bearing electric charge with the opposed polarity to that of the ink and contained in dispersion state to the object recording medium and is characterized in that the ink and the liquid composition are supplied so as to be brought into contact with each other in liquid state in the surface of the object recording medium. Hereinafter, the method of supplying the above-described liquid composition and ink to the object recording medium will be described.

The method for forming coloring portions on the object recording medium of the invention comprises steps of (ii) supplying the above-described liquid composition to the object recording medium and (i) supplying the anionic or cationic ink containing a coloring material to the object recording medium and at that time, the liquid composition is supplied to the coloring portion formation regions of the object recording medium or the coloring portion formation regions and their vicinity formed by the coloring material-containing ink so as to be brought into contact with the ink in the liquid state. In this case, the coloring portion formation regions, means the regions where the dots of the ink adhere and the vicinity of the coloring portion formation regions means an area in 1 to 5 dots the outside of the regions where the dots of the ink adhere.

In the method for forming coloring portions on the object recording medium of the invention, it is sufficient for the above described liquid composition of the invention and ink to be brought into contact with each other in the liquid state on the object recording medium. For example, the above-described step (ii) may be performed after the step (i) is performed, or the step (ii) is performed after the step (i) is performed and then again the step (i) may be performed.

Object Recording Medium

An object recording medium to be employed for the method for forming coloring portions on the object recording medium of the invention is not particularly limited and commonly used so-called ordinary paper such as copy paper, bond paper is preferably used. Of course, coat paper and a transparent film for OHP produced specifically for the ink-jet recording may preferably be used. Further, general fine paper and luster paper may be used.

Supply Method of Liquid Composition

A method for supplying the liquid composition of the invention to an object recording medium is possibly a method for supplying it to the entire surface to the object recording medium by spraying or a roller and more preferably an ink-jet method capable of supplying selectively and evenly the liquid composition to the coloring portion formation regions where the ink is to be supplied or the coloring portion formation regions and their vicinity. Further, in this case, a variety of ink-jet recording methods may be employed and among them, especially preferable methods are methods ejecting droplets using bubbles generated by thermal energy.

Ink-Jet Recording Apparatus

Next, an ink-jet recording apparatus usable for the invention will be described. The ink-jet recording apparatus of the invention comprises a first recording unit (a cartridge for printing) having an ink storage portion (an ink tank unit) storing the anionic or cationic ink containing a coloring material and an ink ejection unit (a head for ink ejection) for ejecting the ink and a second recording unit (a cartridge for the liquid composition) having a liquid composition storage unit (a liquid composition tank unit) storing the liquid composition of the invention, preferably the liquid composition containing the fine particle charged, in a dispersed state, with the opposed polarity to that of the foregoing ink, and a liquid composition ejection unit (a head for liquid composition ejection) for ejecting the foregoing liquid composition to carry out recording.

Hereinafter, they are described below.

FIG. 1 is a schematic perspective view showing one example of a summarized constitution of an ink-jet jet printing apparatus usable for the present invention. In FIG. 1, the reference numeral 1 denotes a printing cartridge for printing by ejecting the ink and the reference numeral 2 denotes a liquid composition cartridge for ejecting the liquid composition. In the illustrated example, four printing cartridges 1 using ink with respectively different colors and one liquid composition cartridge 2 are used.

Each of the printing cartridges is composed of an ink tank portion (an ink storage portion) in an upper side and an ink ejection portion (a head for ink ejection) in a lower side. The liquid composition cartridge 2 is composed of a liquid composition tank portion (a liquid composition storage portion) in an upper side and a liquid composition ejection portion (a head for liquid composition ejection) in the lower side. Further, these cartridges 1, 2 are equipped with connectors to receive driving signals or the like. The reference numeral 3 denotes a carriage.

On the carriage 3, four printing cartridges 1 for ejecting the ink with respectively different colors and one liquid composition cartridge 2 are positioned and mounted. The carriage 3 is equipped with a connector holder for transmitting the signals for driving each ink ejection portion of each printing cartridge 1 and the load cell ejection portion of the liquid composition cartridge 2 and the carriage 3 is electrically connected with the respective cartridges 1 and 2 through the connector holder.

The respective ink ejection portions 1 eject the ink with respectively different colors, e.g., ink with yellow (Y), magenta (M), cyan (C) or black (B). In this figure, from the left the printing cartridges 1Y, 1M, 1C, and 1B for yellow ink, magenta ink, cyan ink, and black ink, respectively, are mounted and in their right end, the liquid composition cartridge 2 for ejecting the liquid composition is mounted.

In FIG. 1, the reference numeral 4 denotes a scanning rail extended in the main scanning direction of the carriage 3 and supporting the carriage in freely sliding manner and the reference numeral 5 denotes a driving belt for transmitting the driving force for reciprocating the carriage 3. The reference numerals 6, 7 and the reference numerals 8, 9 denote a pair of transportation (or conveying) rollers respectively positioned in front and rear of the printing position of the ink ejection portions of the printing cartridges to sandwich and transport an object recording medium 10. The object recording medium 10 such as paper is guided and supported in the pressurized state to a platen (not illustrated) for causing the printing face flat at the printing position. At that time, the ejection port forming faces of the respective cartridges 1, 2 mounted on the carriage 3 are projected downward from the carriage 3 and positioned between the object recording medium transportation rollers 7, 9 and adjusted to face parallel to the object recording medium 10 pressurized to the guiding face of the platen (not illustrated).

In the vicinity of the home position set in the left side out of the printing portion of the ink-jet printing apparatus in this figure, a restoration (or recovery) unit 11 is installed. In the restoration unit 11, four caps 12 corresponding to the four printing cartridges (the ink ejection portions) 1Y, 1M, 1C, 1B and one cap 13 corresponding to one liquid composition cartridge (the liquid composition ejection part) 2 are formed in up and down movable manner. When the carriage 3 is in the home position, the caps 12, 13 corresponding to the ejection port forming face of the respective cartridges 1, 2 are pressure-joined to close (carry out capping of) the ejection ports of the respective cartridges 1, 2. The capping prevents the viscosity increase and cohesion of the ink due to evaporation of the ink solvent in the ejection ports and prevents occurrence of the ejection failure.

The restoration unit 11 is equipped with suction pumps 14 communicated with the respective caps 12 and a suction pump 15 communicated with the cap 13. These pumps 14, 15 are used for carry out suction, and restoration treatment by capping the ejection port forming faces with the caps 12, 13 in the case ejection failure takes place in the ink ejection ports and the liquid composition ejection port. Further, in the restoration unit 11, two wiping members (blades) 16, 17 made of an elastic material such as rubber are installed. The blade 16 is held by a blade holder 18 and the blade 17 is held by the blade holder 19.

In the schematic figure of the invention, the foregoing blade holders 18, 19 are moved up and down by a blade elevation mechanism driven by utilizing the movement of the carriage 3 and accordingly, the foregoing blades 16, 17 are moved up and down between a projected (moving-up) position (wiping position) where they wipe the ink and foreign matters adhering to the ejection port forming faces of the respective cartridges 1, 2 and a recessed (moving-down) position (waiting position) where they do not contact the ejection port forming faces. In this case, the blade 16 which is for wiping the ejection port forming faces of printing cartridges 1 and the blade 17 which is wiping the ejection port forming face of the liquid composition cartridge 2 are made to be mutually independently moved up and down.

When the carriage 3 is moved to the home position side from the middle right side (the printing region side) in FIG. 1, or to the printing region side from the home position side, the blade 16 is brought into contact with the ejection port forming faces of the printing cartridge 1 and the blade 17 is brought into contact with the ejection port forming face of the liquid composition cartridge 2 and carries out wiping movement for the ejection port forming faces by relative movement.

Figure 2:
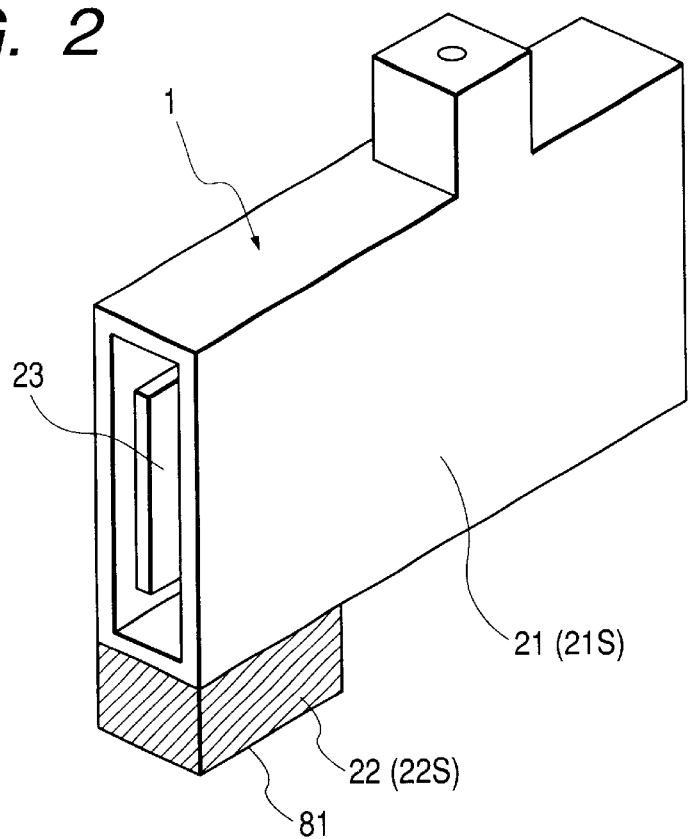
FIG. 2 is a perspective view typically showing a cartridge of FIG. 1.

FIG. 2 is a schematic perspective view showing the printing cartridge 1 with a structure where each ink ejection portion and each ink tank are united. The liquid composition cartridge 2 has a substantially similar structure as that of the printing cartridge 1 except that the material to be stored therein and used is not the ink but a liquid composition. In FIG. 2, the printing cartridge 1 comprises an ink tank portion 21 in the upper side and an ink ejection portion (ink ejection head part) 22 in the lower side and further a head side connector 23 for receiving the signals for driving the ink ejection portion 22 and outputting the ink remaining amount detection signals. The connector 23 is installed in a position where the ink tank portion 21 is disposed.

The ink ejection portion 22 shown in the bottom face side (the object recording medium 10 side) in FIG. 2 has an ejection port forming face 81 and the ejection port forming face 81 has a plurality of ejection ports. In the liquid channel parts connected to the respective ejection ports, ejection energy generation elements are installed for generating energy necessary for ejecting the ink.

The printing head cartridge 1 is ink-jet printing means for ejecting the ink to carry out printing and comprises the ink ejection portion 22 and the ink tank portion 21 united to each other and is made changeable. The ink ejection portion 22 is an ink-jet printing head using thermal energy for ejecting ink and equipped with electric heat converters for generating thermal energy. The ink ejection portion 22 causes film boiling by thermal energy generated by the electric heat converters and ejects the ink through the ejection ports using the pressure alteration caused by expansion and contraction of bubbles formed by film boiling to carry out printing.

Figure 3:
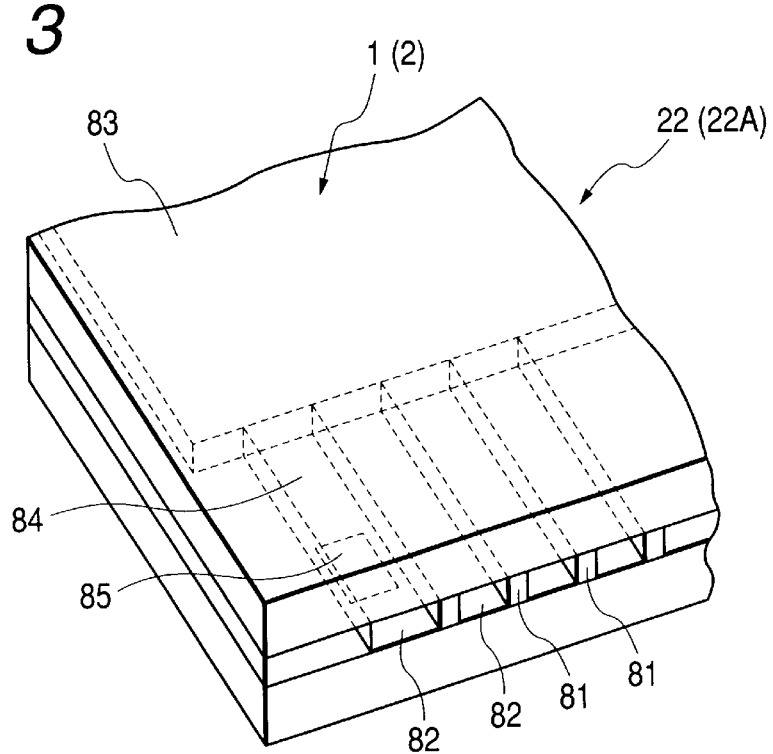
FIG. 3 is a perspective view showing typically a structure of an ink ejecting part of FIG. 2.

FIG. 3 is a fragmentary perspective view schematically showing the structure of the ink ejection portion 22 (liquid composition ejection portion 22A). In FIG. 3, in an ejection port forming face 81 on the opposite to an object recording medium (printing paper) 10 at a prescribed gap (for example, about 0.5 to 2.0 mm), a plurality of ejection ports 82 are formed at prescribed pitches and the electric heat converters (heat generating resistors and the like) 85 for generating energy for ink eject are installed along the wall face of the respective liquid flow channels 84 communicating a common liquid chamber 83 and the respective ejection ports 82. A plurality of the ejection ports 82 are so arranged as to cross the moving direction (the main scanning direction) of the printing cartridge 1. In the ink ejection portion 22 composed in such a manner, the electric heat converters 85 are driven (electrically energized) according to the image signals or ejection signals to carry out film boiling of the ink in the liquid channels 84 and eject the ink out of the ejection ports 82 owing to the pressure generated at that time.

FIGS. 4A to 6D are schematic figures showing the wiping operation in the above-described ink-jet printing apparatus. FIGS. 4A to 4D show the case where the carriage 3 moves from the printing region side to the home position side. As showing in FIG. 4A, the printing cartridges 1 and the liquid composition cartridge 2 on the carriage 4 are moved from the right side (the printing region side) to the home position. Consequently, as shown in FIG. 4B, at first the blade 16 for the ink existing between the caps 12 for ink and the cap 13 for the liquid composition is moved up and successively wipes the ejection port forming faces of the respective printing cartridges 1Y, 1M, 1C, and 1B following the movement of the carriage 3.

Figure 4A:
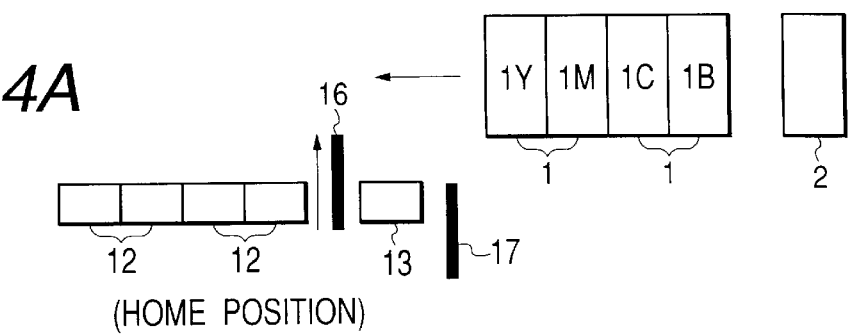
FIGS. 4A, 4B, 4C and 4D show a schematic diagrams showing wiping operation of the ink-jet print apparatus in FIG. 1.
Figure 4B:
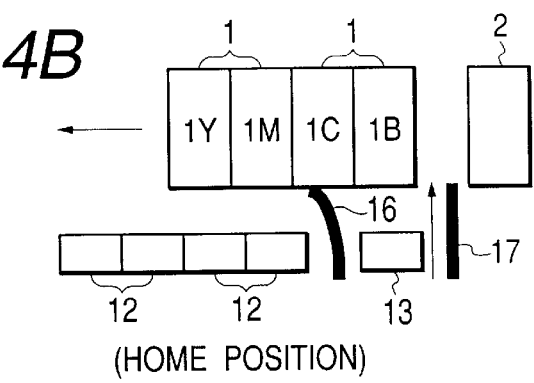
Figure 4C:
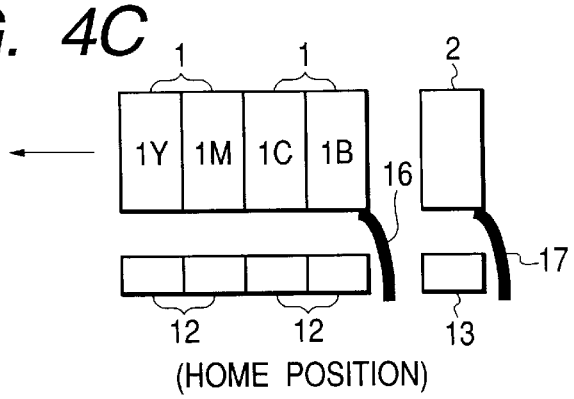
Figure 4D:
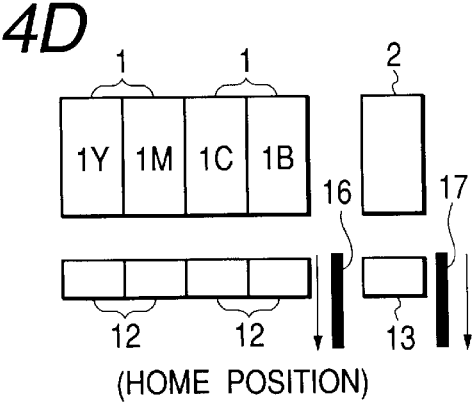

Further, as shown in FIG. 4C, after the respective printing cartridges 1 pass above the blade 17 for the liquid composition, the blade 17 for the liquid composition is moved up and simultaneously wipes the ejection port forming face of the liquid composition cartridge 2 as shown in FIG. 4D. After the blade 16 for the ink completes the wiping of the ejection port face of the fourth printing cartridge 1 and further after the blade 17 for the liquid composition completes the wiping of the ejection port face of the liquid composition cartridge 2, the respective blades 16, 17 are moved down and made ready at the waiting positions. In FIGS. 4A to 4D, although the blades 16, 17 are so moved as to carry out the wiping when the carriage 3 is moved from the right side (the printing region side) in FIG. 1 to the home position side where the restoration unit 11 exists, the wiping direction is not limited to this, but as shown in FIGS. 5A to 5D, wiping may be carried out when the carriage 3 is moved from the home position side to the right side (the printing region side).

Figure 5A:
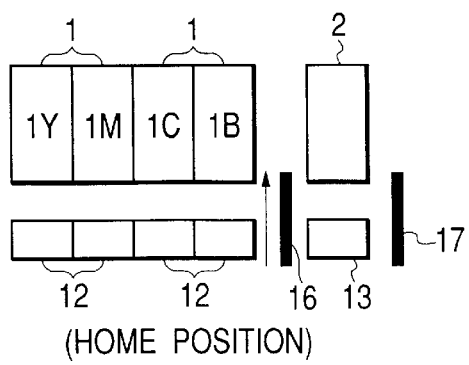
FIGS. 5A, 5B, 5C and 5D are schematic diagrams showing wiping operation of the ink-jet print apparatus of FIG. 1.
Figure 5B:
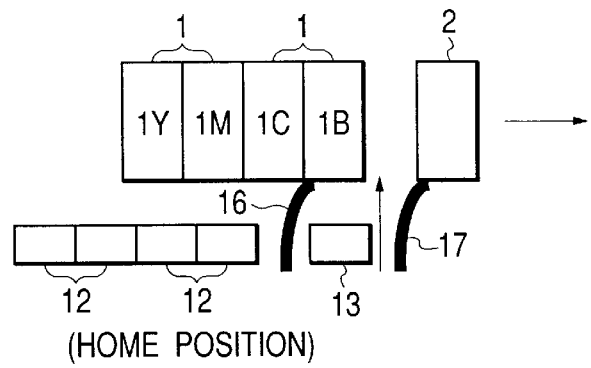
Figure 5C:
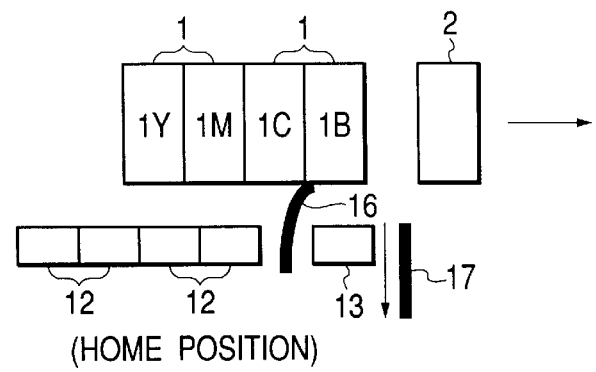
Figure 5D:
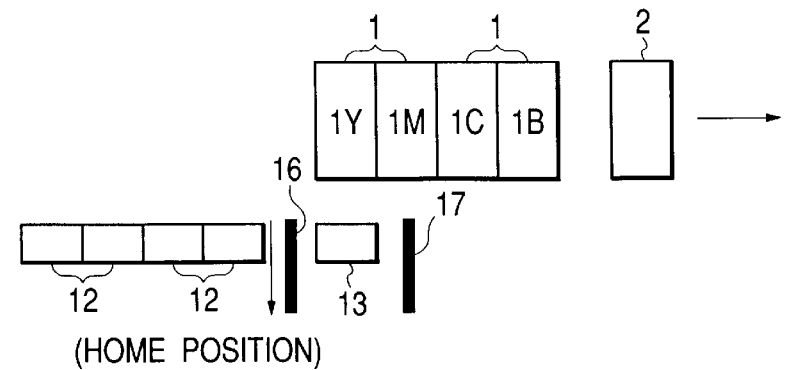

As shown in FIG. 5A, the blade 16 for the ink and the blade 17 for the liquid composition are simultaneously moved up by moving the carriage 3 right-ward (to the printing region side) so as to simultaneously wipe the ejection port forming faces of the printing cartridges 1 and the liquid composition cartridge 2, as shown in FIG. 5B, and on completion of the wiping of the ejection port face of the liquid composition cartridge 2, only the blade 17 for the liquid composition is moved down to be in waiting state and the blades 17 for the ink are made to continuously wiping the ejection port faces of the printing cartridges 1 as shown in FIG. 5C. Finally, as shown in FIG. 5D, on completion of the wiping of all of the printing cartridges 1, the blade 16 for the ink is moved down to finish a series of the wiping works.

By employing the wiping direction as described along with FIGS. 5A to 5D, the droplets moved by wiping and adhering to the blades 16, 17 are prevented from scattering to the transportation part of the object recording medium 10 due to the elasticity of the blades and the possibility of unintentional stain formation in the object recording medium 10 can be avoided.

Figure 6A:
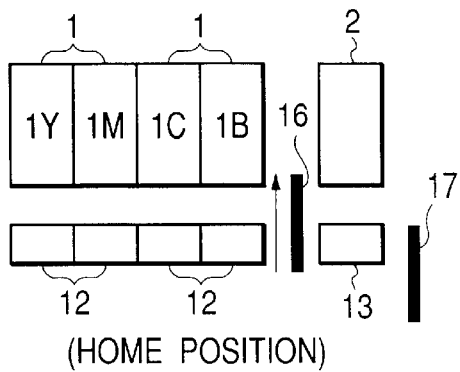
FIGS. 6A, 6B, 6C and 6D are schematic diagrams showing wiping operation of the ink-jet print apparatus of FIG. 1.
Figure 6B:
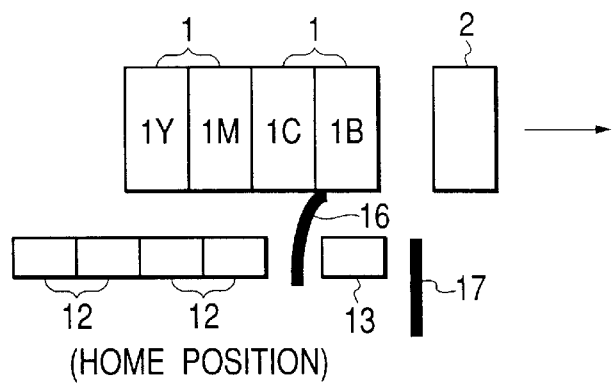
Figure 6C:
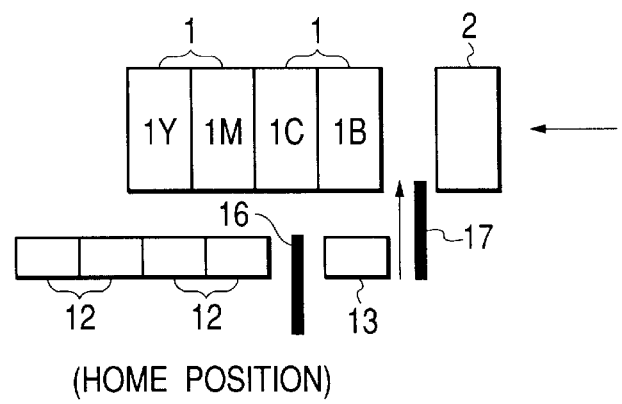
Figure 6D:
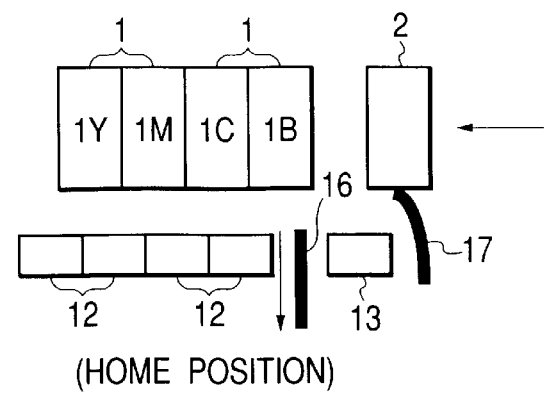

Further, as shown in FIGS. 6A to 6D, the wiping direction for the ejection port forming faces of the printing cartridges 1 and the wiping direction for the ejection port forming face of the liquid composition cartridge 2 may differ from each other. In FIGS. 6A to 6D, wiping may be carried out in a manner that when the carriage 3 is moved from the home position side to the right side (the printing region side), the blade 16 for the ink wipes the ejection port forming faces of the printing cartridges 1 as shown in FIGS. 6A and 6B and when the carriage 3 is moved from the printing region side to the home position side, the blade 17 for the liquid composition wipes the ejection port forming face of the liquid composition cartridge 2 as shown in FIGS. 6C and 6D. By employing such wiping direction, the following inconvenience (risk) can considerably be suppressed or eliminated in a manner that the ink scattered by the elasticity of the blades 16 is prevented from adhering to the liquid composition ejection port 22A of the liquid composition cartridge 2 or contrary, the liquid composition scattered by the elasticity of the blade 17 is prevented from adhering to the ink ejection ports 22 of the printing cartridges 1.

Further, in FIG. 1, the caps 12 for printing cartridges 1 and the cap 13 for the liquid composition cartridge 2 are separated and independent (for exclusive use) from each other and the suction pumps 14, 15 to be connected to these caps 12, 13 are also made separate and independent (for exclusive use) for the printing cartridges 1 and liquid composition cartridge 2. Accordingly, in the caps 12, 13 and the pumps 14, 15, the ink and the liquid composition reactive on the ink are kept from contact with each other and made possible to treat their waste liquids and maintain high credibility.

Figure 7:
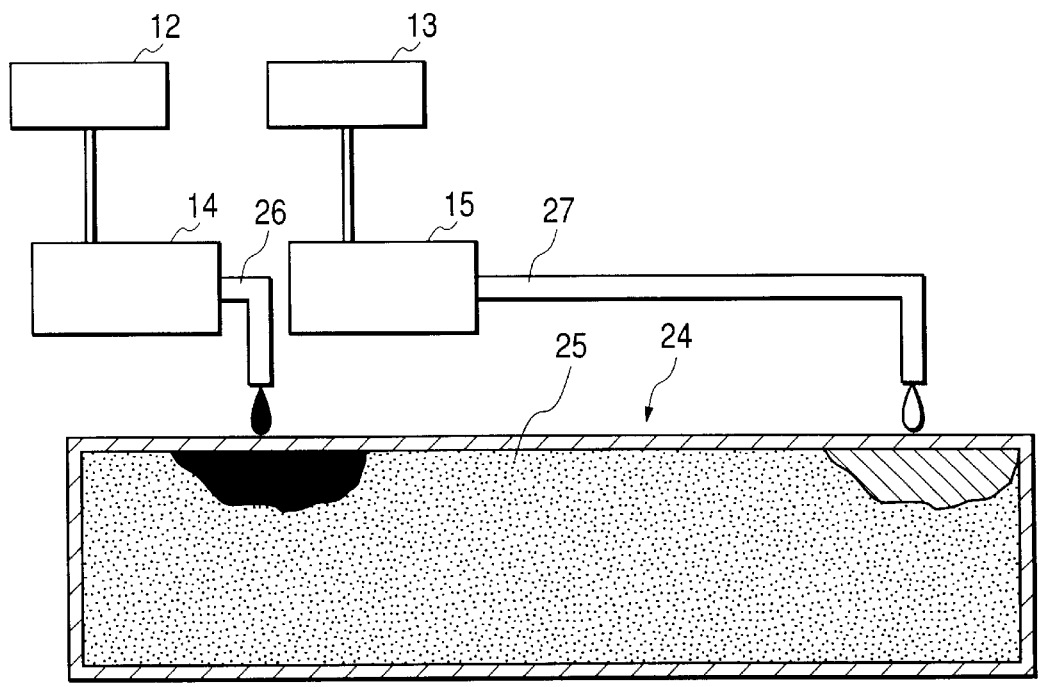
FIG. 7 is a schematic diagram showing a waste fluid recovery system of the ink-jet print apparatus of FIG. 1.

FIG. 7 is a schematic figure showing the recovery system for recovering the ink and the liquid composition discharged out of the pumps 14, 15 to a waste ink tank. In FIG. 7, the waste ink sucked out of the printing cartridges 1 by the suction pumps 14 communicated with the caps 12 and the waste liquid sucked form the liquid composition cartridge 2 by the suction pump 15 communicated with the cap 13 are recovered and stored in the waste ink tank 24 through the respectively independent passages so as not to cause leakage out of the printing apparatus.

The waste ink tank 24 is filled with a porous absorbent 25 in the inside and so made as to absorb and keep the waste liquid in the absorbent 25. The waste ink tank 24 is installed in the printing apparatus main body. In FIG. 7, a waste ink leading pipe 26 from the suction pumps 14 for the printing cartridges 1 and a waste liquid leading pipe 27 from the suction pump 15 for the liquid composition cartridge 2 are, as illustrated, connected to the positions mutually parted from each other in both ends of the waste ink tank 24. With such a structure, the liquid composition and the ink in the waste ink tank 24 are sufficiently adsorbed in the adsorbent 25 and then brought into contact with each other, so that the porous absorbent 25 can reliably have a high capacity of absorbing and retaining the liquid.

Figure 8:
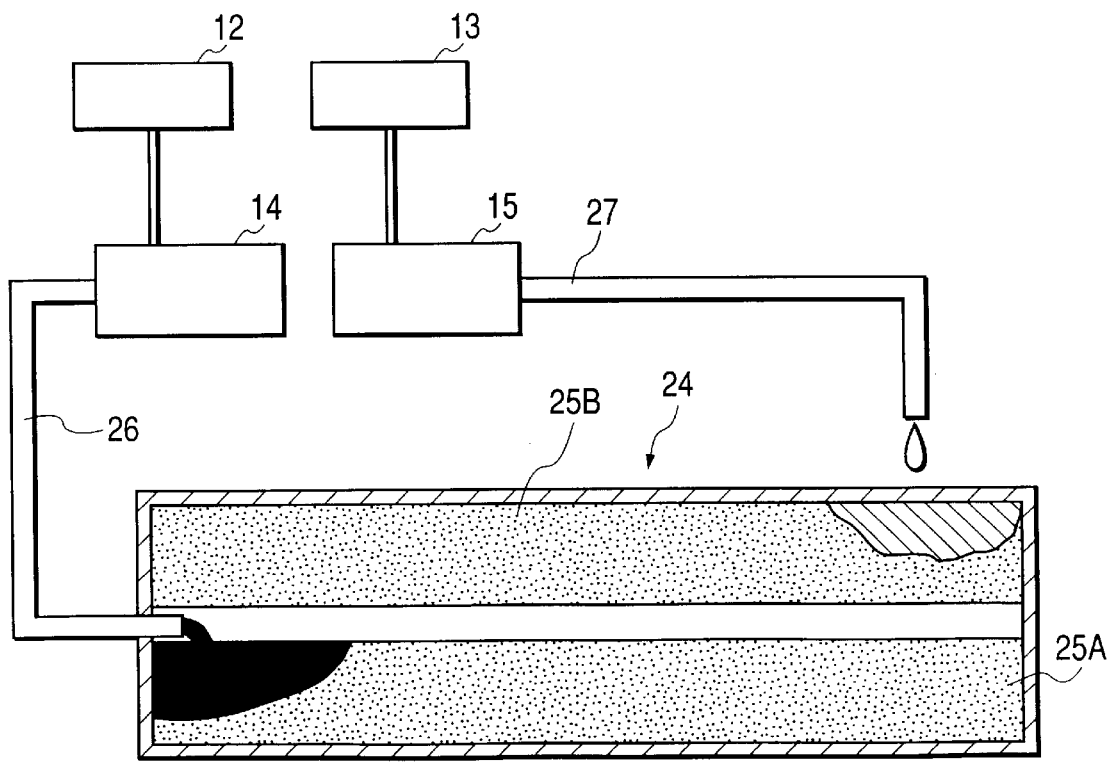
FIG. 8 is a schematic diagram of the waste fluid recovery system of FIG. 7 showing an example of modification in part.

FIG. 8 is a schematic figure showing the waste liquid recovery system composed by modifying the waste liquid recovery system of FIG. 7 by arranging the absorbent 25 in upper and lower two stages in the waste ink tank 24 so as to absorb the ink in an absorbent 25A in the lower stage and the liquid composition in an absorbent 25B in the upper stage. With the constitution shown in FIG. 8, even if the ink overflows the ink absorbent 25A in the lower stage, the dyes in the ink can be reacted and immobilized with the absorbent 25B in the upper stage and the liquid composition absorbed therein, so that the ink can be prevented from leaking and staining the inside and outside of the printing apparatus.

Cartridges to be used for the invention are not limited to the those with the above-described models and other models may be employed. Another cartridge model usable for the invention will be described below.

FIG. 10 shows one example of an ink tank cartridge 1001. In the figure, the reference numeral 1003 denotes an ink storage portion (an ink tank part) storing the ink and the reference numeral 1005 denotes a liquid composition storage portion (a liquid composition tank part) storing the liquid composition. The ink cartridge 1001, as shown in FIG. 11, is made attachable to a recording head 1101 for ejecting the respective ink and liquid composition in freely detachable manner and in the state that the ink tank cartridge 1001 is attached to the recording head 1101, the liquid composition and the ink can be supplied to the recording head 1101. Cartridges to be employed for the invention are not limited to those comprising the head and the ink tanks separately as described above, yet those in which the head and the ink tanks are united may also preferably be employed.

Figure 15:
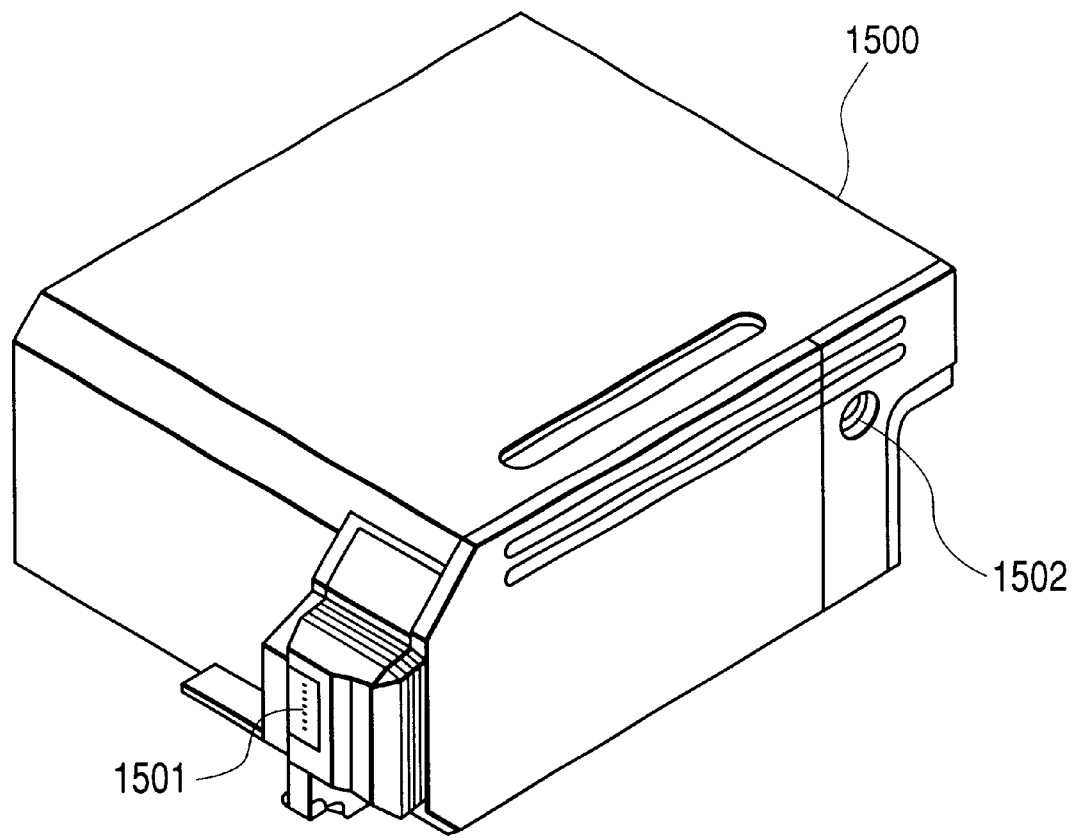
FIG. 15 is a schematic diagram showing an embodiment of the recording unit according to the present invention.

FIG. 15 is a figure showing one example of a recording unit (a cartridge). The reference numeral 1500 denotes a recording unit (a cartridge) and in the cartridge, an ink storage part stores the ink, for example, ink absorbents and the ink in such the ink absorbents is made possible to be ejected as ink droplets out of a head part 1501 having a plurality of orifices. As a material for the ink absorbents, for example, polypropylene and polyurethane may be employed. The reference numeral 1502 denote an air communication port for communicating the inside of the recording unit to the atmospheric air.

Figure 12:
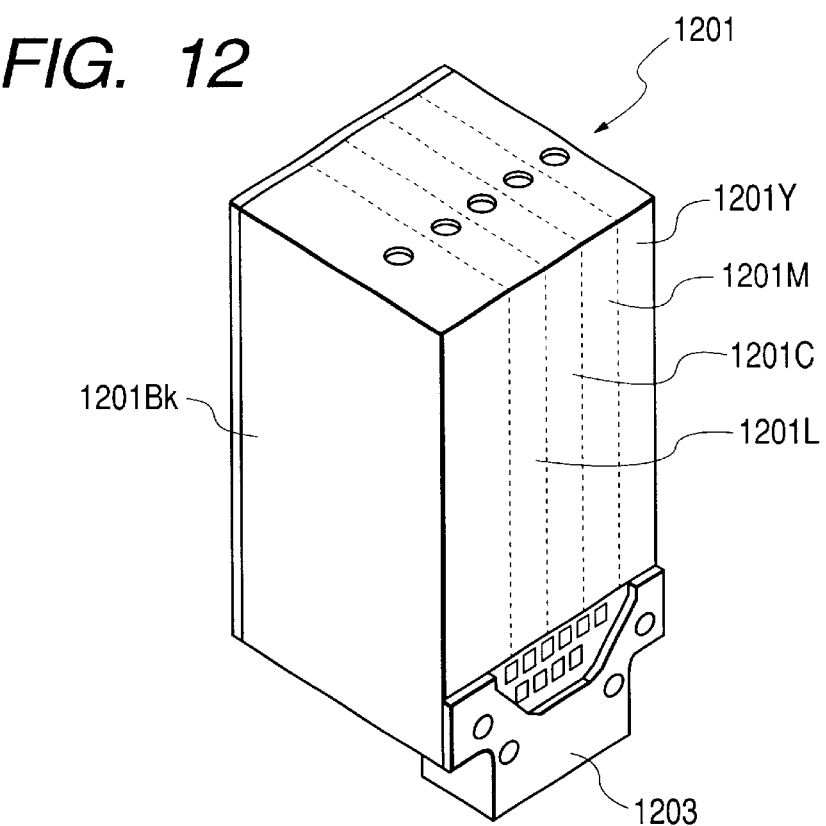
FIG. 12 is a schematic diagram showing an embodiment of a recording unit according to the present invention.

Further, as another embodiment of the recording unit (cartridge) in the present invention, there is a recording unit in which the liquid composition and inks are separately stored in the ink storing parts in an ink tank, and the ink tank and the recording head for discharging each ink are united. For example, as shown in FIG. 12, there is a recording unit 1201 united with a recording head 1203, in which the liquid composition is stored in the storing part 1201L, black ink is stored in the storing part 1201Bk, while color inks of yellow, cyan and magenta are stored in the color ink storing parts 1201Y, 1201M and 1201C, respectively, and the recording head 1203 is constituted to have divided ink flow paths so as to discharge the inks separately.

Figure 16:
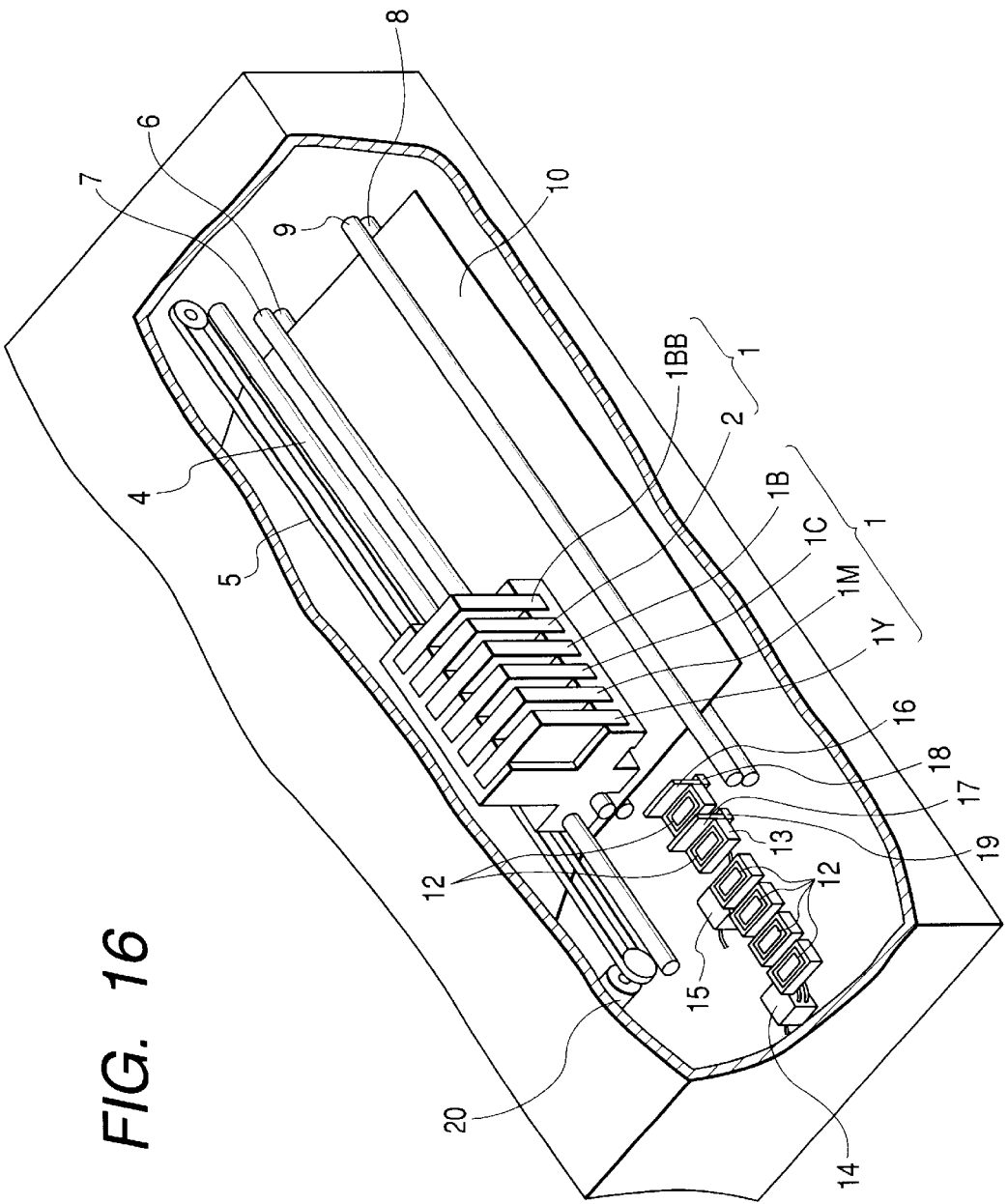
FIG. 16 is a perspective view showing typically an embodiment of an ink-jet print apparatus according to the present invention.

FIG. 16 is a perspective view for schematically showing another embodiment of a ink-jet printer according to the present invention. In FIG. 16, the reference numeral 4 indicates a scanning rail extending in a main scanning direction of a carriage 3 and slidably supporting the carriage 3, and reference numeral 5 designates a pulley for transmitting driving force to reciprocate the carriage 3. Reference numerals 6, and 7, and 8 and 9 indicate two pairs of conveying rollers which are arranged in front and behind the printing position of a printing cartridge and hold and convey a printing medium 10, respectively. The printing medium 10 such as paper is guided and supported by a platen (not illustrated) for regulating the printing surface of the printing medium flat at the printing position in a pressed state. The head cartridges 1 and 2 mounted on the carriage 3 are located on the carriage 3 so that the ejection openings come between the conveying rollers 7 and 9 to face the printing medium 10 which is held under pressure on the guide surface of the platen (not illustrated).

In FIG. 16, six head cartridges in total are located and installed on the carriage 3. In this example, the printing head 1Y for yellow ink, 1M for magenta ink, 1C for cyan ink, 1B for black ink, the ejection head 2 for liquid composition, and a printing head 1BB for a second black ink are arranged on the carriage 3 in this order from the left to the right in the drawing. The ejecting head 2 for liquid composition serves to eject a liquid composition reactive with the coloring material in each ink on the recording medium 10. The rightmost printing head 1BB for a second black ink is for ejecting a black ink used upon secondary scan printing in reciprocating printing. More specifically, the ejecting head 2 is arranged next to (on the right side of) the printing head 1B, and the printing head 1BB is arranged next to the head 2 (at the right end).

In FIG. 16, a recovery unit 11 is arranged on the left side of a printing region. In the recovery unit 11, caps 12 for capping the printing heads 1Y, 1M, 1C, 1B are successively arranged from left to right corresponding to the arrangement of the head cartridges 1, 2, next to them (on the right side), a cap 13 for capping the ejecting head 2 for liquid composition is arranged, and a cap 12 for capping the printing head 1BB for second black ink is further arranged next to the cap 12 on the right side thereof. These caps are vertically movably provided, and the ejection openings of the respective heads 1, 2 are tightly closed (capped) by bringing the caps 12, 13 corresponding to the ejection opening faces of the heads 1, 2 into contact under pressure with them when the carriage 3 is located at the home position thereof, whereby the thickening and crusting of each ink in the ejection opening due to evaporation of the solvent in the ink are prevented to prevent the occurrence of ejection failure.

The recovery unit 11 are equipped with a suction pump 14 communicating with the caps 1 and 2, and a suction pump 15 communicating with the cap 13. These pumps 14, 15 are used for carrying out a recovery operation by sucking by capping the ejection opening faces with the caps 12, 13 when ejection failure has occurred in the printing head 1 or ejecting head 2. A blade 17 for the ejecting head 2 for liquid composition is further arranged between the cap 13 for the liquid composition, the fifth cap from the left, and the cap 12 for the second black ink, the sixth cap from the left (located at the right end), and a blade 16 for the respective printing heads 1 is arranged on the right side (the side of the printing region) of the cap 12 located at the right end. The blade 17 is held by a blade holder 19, and the blade 16 is held by a blade holder. In this aspect, the blade holders 18, 19 are caused to go up and down by a blade elevating mechanism (not illustrated) driven utilizing the movement of the carriage 3, whereby the blades 16, 17 go up and down between a position (wiping position) projected for wiping the inks and foreign matter attached to the ejection opening faces of the heads 1, 2 and a receded position (stand-by position) coming into no contact with the ejection opening faces. In this case, the blade 16 for wiping the printing heads 1 and the blade 17 for wiping the ejecting head 2 for liquid composition are constructed in such a manner that they can be caused to separately go up and down independently of each other.

FIGS. 17A to 17F typically illustrate a wiping operation of the ink-jet printer shown in FIG. 16. In FIGS. 17A to 17F, the blade 16 for printing heads (ink ejecting sections) is projected (lifted) as illustrated in FIG. 17A, and each head mounted on the carriage 3 is moved from the right side (the side of the printing region) toward its home position. The blade 16 for printing heads successively wipes the printing heads 1 with the movement of the carriage 3 toward the left as illustrated in FIG. 17B. As illustrated in FIG. 17C, the blade 16 is receded (lowered) to the stand-by position at the time the ejecting head 2 for liquid composition (liquid composition ejecting section) has come before the blade 16 for printing heads (next to the blade 16 on the right side) to prevent the contact of the blade 16 with the ejecting head 2 for liquid composition.

At the time the carriage 3 has been further moved to the left to cause the ejecting head 2 for liquid composition to pass through the blade 16 for printing heads, both blade 16 for printing heads and blade 17 for ejecting head are projected (lifted) as illustrated in FIG. 17D, thereby conducting wiping of the ejecting head 2 for liquid composition by the blade 17 and wiping of the printing head 1BB located on the right end by the blade 16 at the same time with the movement of the carriage 3 toward the left as illustrated in FIG. 17E. After wiping of all the heads 1, 2 is completed, both blades 16, 17 are receded (lowered) as illustrated in FIG. 17F to cause them to stand by at the stand-by positions thereof.

In the aspect illustrated in FIG. 16 and FIGS. 17A to 17F, wiping by the blades 16, 17 is conducted when the carriage 3 is moved from the printing region side (right side) toward the home position side at which the recovery unit 11 is located. However, the wiping direction is not limited to this direction, and wiping may be conducted when the carriage 3 is moved from the home position side toward the right side (printing region side).

The ink-jet printer illustrated in FIG. 16 is so constructed that the liquid composition according to the present invention, which is reactive to a coloring material in an ink, is ejected on the printing medium 10 from the ejecting head 2 for liquid composition to bring it into contact with the ink ejected from each printing head 1 on the printing medium 10 to form a recorded article. The coloring material in the ink reacts with the liquid composition on the printing medium 10 to be adsorbed in a monomolecular state on the surfaces of the fine particles in the liquid composition, and the fine particles form an image. Therefore, an image excellent in coloring and color uniformity is provided.

Incidentally, with respect to the recording apparatus to be employed for the invention, the ink-jet recording apparatus for ejecting ink droplets by applying thermal energy to the ink and the liquid composition is exemplified, yet other piezoelectric type ink-jet recording apparatus using piezoelectric elements can also similarly be employed.

EXAMPLES

Next, the invention will more specifically be described with the reference of Examples and Comparative Examples. Incidentally, part(s), and % in the description are on the basis of weight unless specific remarks.

At first, the production of liquid compositions of the invention will be described.

Liquid compositions A to D of the invention were obtained by mixing and dissolving the following respective components and then pressure-filtering the resulting solutions by a membrane filter with a pore size of 1 $\mu$m (trade name: Phloropore Filter, manufactured by Sumitomo Electric Industries Ltd.).

Synthesis Example of Hydrated Alumina

Aluminum dodexide was produced by the method described in U.S. Pat. No. 4,242,271. Then, an alumina slurry was produced by hydrolyzing the foregoing aluminum dodexide by the method described in U.S. Pat. No. 4,202,870. Water was added to the alumina slurry to adjust the solid matter of hydrated alumina to be 8.2%. The pH of the alumina slurry was 9.7. The pH was adjusted by adding a 3.9% nitric acid solution and aging was carried out under the aging conditions shown in Table 1 to obtain colloidal sol materials. The colloidal sol materials were subjected to pH adjustment by an acid shown in Table 1 and the solid matter was concentrated to 20% to obtain the hydrated alumina slurries A to D. In these slurries, the hydrated alumina was charged with positive charge in the surface and showed cationic property. The hydrated alumina slurries were diluted with ion exchange water and dispersed, dropwise titrated on a corrosion film to produce specimens for measurement which were subjected to observation by a transmission electron microscope to be found out having tabular fine particles.

TABLE 1

| Hydrated alumina slurry | A | B | C | D |
| --- | --- | --- | --- | --- |
| pH before aging | 6.0 | 6.0 | 6.0 | 6.0 |
| Aging temperature (° C.) | 120 | 120 | 120 | 120 |
| Aging period | 3 hours | 5 hours | 8 hours | 30 hours |
| Aging apparatus | Autoclave | Autoclave | Autoclave | Autoclave |
| Acid | Hydrochloric acid | Nitric acid | Formic acid | Acetic acid |
| pH after aging | 3.9 | 4.5 | 5.0 | 5.4 |

Composition of Liquid Composition A

| | |
|---|---|
| Glycerin | 10.0 parts by weight |
| Diethylene glycol | 7.5 parts by weight |
| Hydrated alumina slurry A | 50.0 parts by weight |
| Water | 32.5 parts by weight |

The above-described components were mixed at 3,000 rpm for 30 minutes by an emulsifying and dispersing apparatus TK Robomix (manufactured by Tokushu Kika Kogyo Co., Ltd.) and then centrifugated (4,000 rpm, 15 minutes) to remove coarse particles and obtain a liquid composition A.

Composition of Liquid Composition B

| | |
|---|---|
| 1,5-pentanediol | 10.0 parts by weight |
| Ethylene glycol | 7.5 parts by weight |
| Hydrated alumina slurry B | 50.0 parts by weight |
| Water | 32.5 parts by weight |

The above-described components were mixed at 3,000 rpm for 30 minutes by an emulsifying and dispersing apparatus TK Robomix (manufactured by Tokushu Kika Kogyo Co., Ltd.) and then centrifugated (4,000 rpm, 15 minutes) to remove coarse particles and obtain a liquid composition B.

Composition of Liquid Composition C

| | |
|---|---|
| Glycerin | 7.5 parts by weight |
| Propylene glycol | 7.5 parts by weight |
| Hydrated alumina slurry C | 50.0 parts by weight |
| Water | 35.0 parts by weight |

The above-described components were mixed at 3,000 rpm for 30 minutes by an emulsifying and dispersing apparatus TK Robomix (manufactured by Tokushu Kika Kogyo Co., Ltd.) and then centrifugated (4,000 rpm, 15 minutes) to remove coarse particles and obtain a liquid composition C.

Composition of Liquid Composition D

| | |
|---|---|
| 2-pyrrolidone | 7.5 parts by weight |
| Ethyleneurea | 7.5 parts by weight |
| Hydrated alumina slurry D | 50.0 parts by weight |
| Water | 35.0 parts by weight |

The above-described components were mixed at 3,000 rpm for 30 minutes by an emulsifying and dispersing apparatus TK Robomix (manufactured by Tokushu Kika Kogyo Co., Ltd.) and then centrifugated (4,000 rpm, 15 minutes) to remove coarse particles and obtain a liquid composition D.

The above-described liquid compositions A to D were subjected to the measurement by the following evaluation methods and the respective evaluation results were shown in Table 2.

1) Average Particle Diameter of Fine Particle

After each liquid composition was diluted with ion exchanged water so as to adjust the solid matter concentration of each particle to be 0.1% and dispersed for 5 minutes by an ultrasonic washing apparatus and the scattering intensity was measured using electrophoretic light scattering photometer (ELS-8000, manufactured by Otsuka Electronic Co., Ltd., liquid temperature of 25° C., using a quartz cell). The average particle diameter was computed by cumulant analysis from the scattering intensity using an appended software.

2) pH

For each liquid composition, measurement was carried out at a liquid temperature of 25° C. using a pH meter (Castanee pH Meter D-14, manufactured by Horiba Seisakusho Co., Ltd.).

3) Zeta Potential

After each liquid composition was dispersed in ion exchanged water so as to adjust the solid matter concentration of each particle to be 0.1%, the measurement was carried out using a zeta potential measurement apparatus (BI-ZETA plus, manufactured by Brookheaven Co., a liquid temperature of 20° C., using an acrylic cell).

4) Tank Storability

After each liquid composition was stored in an ink tank and kept still at 60° C. in a thermostat for 1 month, the liquid physical properties of the liquid composition in the tank and the ejection property out of a recording head were evaluated.

B: Precipitation scarcely observed in the tank and the ejection stability is good.

C: Precipitation noticeably observed in the tank and the ejection property was unstable.

5) Fine Pore Radius and Fine Pore Volume

After pretreatment was carried out according to the following procedure, each specimen was loaded in a cell, vacuum-degassed at 120° C. for 8 hours, and then subjected the measurement by a nitrogen adsorption and desorption method using OmniSorb 1 manufactured by quantachrome. The fine pore radius and fine pore volume were calculated according to the method of Barrett, et al (J. am. Dhem. Soc. Vol 73, 373, 1951).

(1) The above-described each liquid composition was dried at 120° C. for 10 hours in atmospheric air to almost completely evaporate the solvent.

(2) The above-described dried product was heated from 120° C. to 700° C. for 1 hour and fired at 700° C. for 3 hours.

(3) After the firing, the above-described fired product was gradually cooled to a normal temperature 10 and ground by an agate crucible to be powdered.

TABLE 2

| Liquid composition | A | B | C | D |
|---|---|---|---|---|
| Average particle diameter (nm) | 65 | 80 | 95 | 150 |
| pH | 3.5 | 3.9 | 4.7 | 5.2 |
| Zeta potential (mV) | 36 | 41 | 39 | 35 |
| Tank storage property | B | B | B | B |
| Fine pore volume (ml/g) in fine pore radius range of 3 to 30 nm | 0.34 | 0.65 | 0.81 | 0.96 |

TABLE 2-continued

| Liquid composition | A | B | C | D |
|---|---|---|---|---|
| Fine pore volume (ml/g) in fine pore radius range of 3 to 20 nm | 0.34 | 0.64 | 0.8 | 0.82 |
| Fine pore volume (ml/g) in fine pore radius exceeding 30 nm | 0.001 | 0.003 | 0.003 | 0.01 |
| Fine pore volume (ml/g) in fine pore radius exceeding 20 nm | 0.003 | 0.012 | 0.011 | 0.15 |

Next, the production of the ink to be used for Examples of the invention and Comparative Examples will be described.

Production of Ink Sub-Set 1

The respective dye ink Bk1, Y1, M1, and C1 of black, yellow, magenta, and cyan were obtained by mixing and sufficiently stirring the following respective components to dissolve them and then pressure-filtering the resulting solutions by a membrane filter with a pore size of 0.45 μm (trade name: Phloropore Filter, manufactured by Sumitomo Electric Industries Ltd.) and the combination of these dye ink materials was made to be the ink sub-set 1.

[Black ink Bk1]

| | |
|---|---|
| C.I. Direct Black 195 | 2.5 parts by weight |
| 2-pyrrolidone | 10 parts by weight |
| Glycerin | 5 parts by weight |
| Isopropyl alcohol | 4 parts by weight |
| Sodium hydroxide | 0.4 parts by weight |
| Water | 78.1 parts by weight |

[Yellow ink Y1]

| | |
|---|---|
| Project Fast Yellow 2 (produced by Zeneca Co.) | 2.0 parts by weight |
| C.I. Direct Yellow 86 | 1.0 part by weight |
| Thiodiglycol | 8 parts by weight |
| Ethylene glycol | 8 parts by weight |
| Acetylenol EH (Kawaken Fine Chemicals Co., Ltd.) | 0.2 parts by weight |
| Isopropyl alcohol | 4 parts by weight |
| Water | 76.8 parts by weight |

[Magenta ink M1]

| | |
|---|---|
| Project Fast Magenta 2 (produced by Zeneca Co.) | 3 parts by weight |
| Glycerin | 7 parts by weight |
| Urea | 7 parts by weight |
| Acetylenol EH (Kawaken Fine Chemicals Co., Ltd.) | 0.2 parts by weight |
| Isopropyl alcohol | 4 parts by weight |
| Water | 78.8 parts by weight |

[Cyan ink C1]

| | |
|---|---|
| C.I. Direct Blue 199 | 3.0 part by weight |
| Ethylene glycol | 7 parts by weight |
| Diethylene glycol | 10 parts by weight |
| Acetylenol EH (Kawaken Fine Chemicals Co., Ltd.) | 0.3 parts by weight |
| Water | 79.7 parts by weight |

Production of Ink Sub-Set 2

The black ink Bk2 was produced by producing a pigment dispersion from the following respective components. Using the same pigment dispersion, respective pigment ink yellow Y2, magenta M2, and cyan C2 were obtained and the combination of these dye ink materials was made to be the ink sub-set 2.

Black Ink Bk2

Production of Pigment Dispersion

| | |
|---|---|
| Styrene-acrylic acid-ethyl acrylate copolymer (acid value 140, weight average molecular weight 5,000) | 1.5 parts by weight |
| Monoethanolamine | 1.0 parts by weight |
| Diethylene glycol | 5.0 parts by weight |
| Ion exchanged water | 81.5 parts by weight |

The above-described components were heated to 70° C. in a water bath to completely dissolve the resin component. To the obtained solution, 10 parts by weight of a newly produced carbon black (MCF 88, produced by Mitsubishi Kasei Corporation) and 1 part by weight of isopropyl alcohol were added and pre-mixed for 30 minutes and then the dispersion treatment was carried out under the following conditions.

Dispersing apparatus: Sand grinder (manufactured by Igarashi Machinary)

Pulverization medium: zirconium beads, 1 mm diameter

Filling ratio of pulverization medium: 50% (by volume)

Pulverization duration: 3 hours

Further, centrifugal separation treatment (12,000 rpm, 20 minutes) was carried out for removing coarse particles to obtain a dispersion.

Production of Black Ink Bk2

Using the above-described pigment dispersion, the following components in the composition ratios were mixed to produce the pigment-containing ink which was named as Black ink Bk2.

| | |
|---|---|
| The above-described pigment dispersion | 30.0 parts by weight |
| Glycerin | 10.0 parts by weight |
| Ethylene glycol | 5.0 parts by weight |
| N-methylpyrrolidone | 5.0 parts by weight |
| Ethyl alcohol | 2.0 parts by weight |
| Ion exchanged water | 48.0 parts by weight |

Yellow Ink Y2

The pigment-containing yellow ink Y2 was produced in the similar manner to that for the black ink Bk2 production, except that Pigment Yellow 74 was used in place of 10 parts by weight of the carbon black (MCF 88, produced by Mitsubishi Kasei Corporation) used for the black ink Bk2 production.

Magenta Ink M2

The pigment-containing magenta ink M2 was produced in the similar manner to that for the black ink Bk2 production, except that Pigment Red 7 was used in place of 10 parts by weight of the carbon black (MCF 88, produced by Mitsubishi Kasei Corporation) used for the black ink Bk2 production.

Cyan Ink C2

The pigment-containing cyan ink C2 was produced in the similar manner to that for the black ink Bk2 production, except that Pigment Blue 15 was used in place of 10 parts by weight of the carbon black (MCF 88, produced by Mitsubishi Kasei Corporation) used for the black ink Bk2 production.

Inventors of the invention recognized that it was necessary to bring at least specified amounts of a liquid composition and ink into contact with each other in the surface layer of an object recording medium in order to obtain ink jet printings with a high density and high chromaticness as described above, and therefore, the following investigation was performed.

EXAMPLES

Recording was carried out using an ink-jet recording apparatus in 384 kind combinations in which any one kind of the ink among 16 kinds, (C1-1-1) to (C1-1-4); (C1-2-1) to (C1-2-4); (C1-3-1) to (C1-3-4); and (C1-4-1) to (C1-4-4) shown in the following Table 3 was brought into contact with any one of the above-described liquid compositions A, B, C and D at 6 different time intervals; 10, 25, 50, 100, 150, and 200 msec.

When the ink of 16 kinds as (C1-1-1) to (C1-1-4); (C1-2-1) to (C1-2-4); (C1-3-1) to (C1-3-4); and (C1-4-1) to (C1-4-4) whose coloring material concentration and the penetration property were combined as shown below and the above-described liquid compositions were combined to form respective coloring portions, 7 kind ordinary paper materials widely commercialized under the following trade names of 1) to 7) were employed.
1) Produced by Canon Co. Ltd.: PB paper (object recording medium 1),
2) Produced by Canon Co. Ltd.: Brilliant Whitepaper (object recording medium 2),
3) Produced by Union Camp Co.: Great White Inkjet (object recording medium 3),
4) Produced by Hammermill Co.: Jet Print (object recording medium 4),
5) Produced by Xerox Co. Ltd.: Xerox 4024 (object recording medium 5),
6) Produced by Hewlett Packard Co.: Bright White Ink Jet Paper (object recording medium 6), and
7) Produced by Aussdat Ray Co.: Ray Jet (object recording medium 7), The ink-jet recording apparatus employed in this case was the recording apparatus similar to that shown in the FIG. 1 and a recording head shown in FIG. 3 was employed to form solid images with a resolution degree of 1,200 dpi and a size of 2 inch×2 inch. In this case, the ink was at first ejected to deposit the ink the object recording media and then each liquid composition was deposited. Further, the intervals from the ink deposition to the liquid composition deposition on the ink were changed to be 6 different time differences as described above. Hereinafter, description will be given with respect to the coloring material concentration and the penetration property of the ink used, the supply amount of the ink to the object recording media, and the time differences from the time the ink was brought into contact with the object recording media to the time each liquid composition was brought into contact with the ink.

Coloring Material Density and Penetration Property of Ink

Using the above-described cyan ink C1 as a base, the amount of C.I. Direct Blue 199 was changed to change the coloring material concentration and the amount of Acetylenol EH was changed to change the penetration property. The respective component ratios of the produced ink materials (C1-1-1) to (C1-1-4); (C1-2-1) to (C1-2-4); (C1-3-1) to (C1-3-4); and (C1-4-1) to (C1-4-4) were shown below in Table 3. In Table 3, C.I. Direct Blue 199 was abbreviated as DB199, ethylene glycol as EG, diethylene glycol as DEG, and Acetylenol EH as AEH. Incidentally, the coloring material density at the moment the ink was brought into contact with each object recording medium was regarded as equivalent to the coloring material density at the time of the ink production shown in Table 3. To say strictly, the coloring material density at the moment the ink was brought into contact with each object recording medium was important and inventors of the invention recognized that the coloring material density at that moment was probably different from the coloring material density at the time of the ink production, however within the range of the above-described difference, the image quality was confirmed not to be affected and therefore, inventors of the invention recognized that there was no significant effect for the invention even if the coloring material density at the time of the production was regarded as the coloring material density at the moment the ink was brought into contact with each object recording medium.

TABLE 3

| Name of ink | DB199 (parts) | EG (parts) | DEG (parts) | AEH (parts) | Water (parts) |
|---|---|---|---|---|---|
| C1-1-1 | 1.5 | 7 | 10 | 0 | 81.5 |
| C1-1-2 | 2.5 | 7 | 10 | 0 | 80.5 |
| C1-1-3 | 3.5 | 7 | 10 | 0 | 79.5 |
| C1-1-4 | 4.5 | 7 | 10 | 0 | 78.5 |
| C1-2-1 | 1.5 | 7 | 10 | 0.5 | 81 |
| C1-2-2 | 2.5 | 7 | 10 | 0.5 | 80 |
| C1-2-3 | 3.5 | 7 | 10 | 0.5 | 79 |
| C1-2-4 | 4.5 | 7 | 10 | 0.5 | 78 |
| C1-3-1 | 1.5 | 7 | 10 | 1 | 80.5 |
| C1-3-2 | 2.5 | 7 | 10 | 1 | 79.5 |
| C1-3-3 | 3.5 | 7 | 10 | 1 | 78.5 |
| C1-3-4 | 4.5 | 7 | 10 | 1 | 77.5 |
| C1-4-1 | 1.5 | 7 | 10 | 1.5 | 80 |
| C1-4-2 | 2.5 | 7 | 10 | 1.5 | 79 |
| C1-4-3 | 3.5 | 7 | 10 | 1.5 | 78 |
| C1-4-4 | 4.5 | 7 | 10 | 1.5 | 77 |

Supply Amount of Ink and Liquid Composition

The recording head of FIG. 3 employed in this case had a recording density of 1,200 dpi and the supply amounts of the ink and each liquid composition per one dot in each object recording medium were about 4 ng each in the case of using the recording head.

Interval to Contact Ink with Liquid Composition on Object Recording Medium

One-pass printing to carry out printing in a printing region with a resolution degree of 1,200 dpi by one time scanning was carried out. At that time, the printing data for the liquid composition was made same as the printing data for the ink so as to deposit the liquid composition and the ink same position. The important parameter in the invention, which was the time interval [time difference t (msec)] from the moment the ink was supplied to the object recording medium to the time the liquid composition was brought into contact with the ink, was regarded as the time difference between the moments the ink and the liquid composition to be deposited to the same position were ejected out respective recording heads. To say strictly, the time difference up to the contact and the ejection time difference might differ from each other depending on the recording conditions such the ejected speeds of the ink and the liquid composition, the distance between the ejection ports and the object recording medium, and the height of the previously supplied ink mounting on the surface of the object recording medium, and the like, however even if the ejection time difference was regarded as the time difference, no substantial difference existed and therefore, in the Example, they were assumed to be equivalent. Incidentally, in the case the above-described ejection time difference and the time difference up to the contact had substantial difference, the ejection time difference was not regarded as the time difference up to the contact and the above-described time difference t (msec) was defined as the above-described time difference up to the contact.

The ejection time difference between the ink and the liquid composition respectively supplied to same pixel was determined based on the difference of the liquid ejection ports of the ink ejection head (ink ejection portion) and the liquid composition ejection head (liquid composition ejection portion) and the driving frequency of the heads. In these Examples, the ejection time difference determined in such a manner was regarded to be equivalent to the time difference up to the contact for the investigation. In this case, a printing head having the ink ejection head and the liquid composition ejection head with a distance of 0.25 inch between the ink ejection port and the liquid ejection port was employed. Further, the above-described time difference t (msec) was controlled to be 10, 25, 50, 100, 150, and 200 msec by controlling the driving frequency f (kHz) as shown the following Table 4 and recording was carried out with these time differences.

Further, the recording ink and the liquid composition were ejected in one same pass in the invention, however the invention includes the case without any problem where they (the ink and the liquid composition) were ejected by mutually different passes as long as the time difference t was substantially equivalent to the ejection time difference between the recording ink and the liquid composition.

TABLE 4

| f (kHz) | 30 | 12 | 6 | 3 | 2 | 1.5 |
|---|---|---|---|---|---|---|
| t (msec) | 10 | 25 | 50 | 100 | 150 | 200 |

As described above, the penetration property of the ink in each object recording medium was changed by changing the amount of Acethylenol EH and the penetration property in the above-described 7 kind object recording media from 1) to 7) employed for this investigation was measured as the absorption coefficient Ka ($\mu$m/msec$^{1/2}$) by Bristow method. Hereinafter, the measurement manner by Bristow method and the measurement results will be described. Only the results of object recording media with the highest absorption coefficient, that is, the highest penetration property, in combination with the above-described ink will be described below.

Measurement Manner by Bristow Method

The Bristow (dynamic penetration property test apparatus (manufactured by Toyo Seiki Seisaku-sho, Ltd.,; a liquid absorption test method according to (Bristow method) for paper and sheet paper described in pulp test method No. 51 using JAPAN TAPPI paper) was employed. The absorption coefficient Ka ($\mu$m/msec$^{1/2}$) of the ink of 16 kinds; (C1-1-1) to (C1-1-4); (C1-2-1) to (C1-2-4); (C1-3-1) to (C1-3-4); and (C1-4-1) to (C1-4-4); in the object recording media 1) to 7) were measured. Simultaneously, the wetting time tw (mse) of the above-described respective ink materials was also measured. The measurement condition was at a normal temperature. The calculation methods of the absorption coefficient and the wetting time by Bristow method are described in the JAPAN TAPPI No. 51 paper pulp testing method and also in many published books and therefore, details description will be omitted here. The absorption coefficient in other Examples described below was also measured by the above-described Bristow test apparatus.

Measurement Result of Bristow Method

The absorption coefficient and the wetting time of 16 kind ink materials were calculated by the above-described Bristow test apparatus and the results were shown in Table 5.

TABLE 5

| Name of ink | Ka ($\mu$m/msec$^{1/2}$) | tw (msec) |
|---|---|---|
| C1-1-1 to 4 | 0.1 | 100 |
| C1-2-1 to 4 | 1 | 50 |
| C1-3-1 to 4 | 2 | 10 |
| C1-4-1 to 4 | 2.5 | 5 |

Comparative Example

Recording was carried out on common paper 1) to 7) as described above using the 16 kind ink materials (C1-1-1) to (C1-1-4); (C1-2-1) to (C1-2-4); (C1-3-1) to (C1-3-4); and (C1-4-1) to (C1-4-4). The image recorded was the solid image with the same resolution degree and size as those of the above-described Examples. The recording head of FIG. 3 employed in this case had a recording density of 1,200 dpi and the supply amounts of the ink and each liquid composition per one dot in each object recording medium were about 4 ng each in the case of using the recording head.

Hereinafter, the evaluation method and the evaluation results of the images obtained in Examples will be described.

Evaluation Method

Evaluation was carried out for 384 kinds of images of the above-described Examples and 16 kinds of images of the Comparative Example recorded in the same object recording media by eye observation by inventors. The images of Examples and the images of Comparative Examples obtained using the same ink as the ink used for the Examples were compared and if the images of Example were judged to be much excellent in the coloring property as those of the Comparative Examples, the mark A was assigned, if judged to be excellent, the mark B was assigned, and if judged to be same or inferior, the mark C was assigned.

Evaluation Results

The evaluation results in the case of the combination of ink (C1-1-1) to (C1-1-4) with an absorption coefficient Ka=0.1 ($\mu$m/msec$^{1/2}$) with the time difference t=10 to 200 msec were shown in Table 6, the evaluation results in the case of the combination of ink (C1-2-1) to (C1-2-4) with an absorption coefficient Ka=1.0 ($\mu$m/msec$^{1/2}$) with the time difference t=10 to 200 msec were shown in Table 7, the evaluation results in the case of the combination of ink (C1-3-1) to (C1-3-4) with an absorption coefficient Ka=2.0 ($\mu$m/msec$^{1/2}$) with the time difference t=10 to 200 msec were shown in Table 8, and the evaluation results in the case of the combination of ink (C1-4-1) to (C1-4-4) with an absorption coefficient Ka=2.5 ($\mu$m/msec$^{1/2}$) with the time difference t=10 to 200 msec were shown in Table 9.

TABLE 6

Ka = 0.1 (μm/msec$^{1/2}$)

| Name of ink | t (msec) | | | | | |
|---|---|---|---|---|---|---|
| | 10 | 25 | 50 | 100 | 150 | 200 |
| C1-1-1 | A | A | A | A | A | A |
| C1-1-2 | A | A | A | A | A | A |
| C1-1-3 | A | A | A | A | A | A |
| C1-1-4 | A | A | A | A | A | A |

TABLE 7

Ka = 1.0 (μm/msec$^{1/2}$)

| Name of ink | t (msec) | | | | | |
|---|---|---|---|---|---|---|
| | 10 | 25 | 50 | 100 | 150 | 200 |
| C1-2-1 | B | B | B | B | B | B |
| C1-2-2 | A | A | A | B | B | B |
| C1-2-3 | A | A | A | A | B | B |
| C1-2-4 | A | A | A | A | A | B |

TABLE 8

Ka = 2.0 (μm/msec$^{1/2}$)

| Name of ink | t (msec) | | | | | |
|---|---|---|---|---|---|---|
| | 10 | 25 | 50 | 100 | 150 | 200 |
| C1-3-1 | B | B | B | B | C | C |
| C1-3-2 | A | B | B | B | B | B |
| C1-3-3 | A | A | B | B | B | B |
| C1-3-4 | A | A | B | B | B | B |

TABLE 9

Ka = 2.5 (μm/msec$^{1/2}$)

| Name of ink | t (msec) | | | | | |
|---|---|---|---|---|---|---|
| | 10 | 25 | 50 | 100 | 150 | 200 |
| C1-4-1 | B | B | B | C | C | C |
| C1-4-2 | B | B | B | B | B | C |
| C1-4-3 | A | B | B | B | B | B |
| C1-4-4 | A | A | B | B | B | B |

Examples Using Other Ink

As other Examples, recording of a solid image with the same resolution degree and the same size as those of the above-described Examples was carried out using the above-described Bk1, Y1, M1, Bk2, Y2, M2, and C2 as a base by changing the coloring material density and the penetration property and also changing the interval up to the contact of the liquid compositions A, B, C, and D in each object recording medium. As the object recording media, the above-described object recording media 1) to 7) were employed. Further, the supply amounts of the ink and each liquid composition per one dot in each object recording medium were about 4 ng each, and for the recording, the same ink-jet recording apparatus, recording head, and recording method as those for the above-described Example and recording time shown in Table 4 were employed. The absorption coefficient Ka (μm/msec$^{1/2}$) was measured using the above-described Bristow test apparatus (manufactured by Toyo Seiki Co. Ltd.) by the same measurement method as described above. The respective component ratios and the absorption coefficients of the produced Bk1-, Y1-, M1-, Bk2-, Y2-, M2-, and C2-based ink materials were respectively shown in Table 10, Table 11, Table 12, Table 13, Table 14, Table 15, and Table 16. In Tables, only the components whose ratios were charged were described and those which were not shown in Tables had same ratios as those in the base ink. In Tables below, C.I. Direct black 195 was abbreviated as DBk 195, Projected Fast Yellow 2 as PFY 2, C.I. Direct Yellow 86 as DY 86, Project Fast Magenta 2 as PFM2, carbon black as CBk, Pigment Yellow 74 as PGY 74, Pigment Red 7 as PGR 7, Pigment Blue 15 as PGB 15, and Acetylenol EH as AEH. Only the results of object recording media with the highest absorption coefficient in combination with the above-described ink will be described below.

TABLE 10

Base ink: Bk1

| Name of ink | DBk195 (parts) | AEH (parts) | Water (parts) | Ka (μm/msec$^{1/2}$) | tw (msec) |
|---|---|---|---|---|---|
| Bk1-4-1 | 1.5 | 1.5 | 77.6 | 2.5 | 5 |
| Bk1-4-2 | 2.5 | 1.5 | 76.6 | 2.5 | 5 |
| Bk1-4-3 | 3.5 | 1.5 | 75.6 | 2.5 | 5 |
| Bk1-4-4 | 4.5 | 1.5 | 74.6 | 2.5 | 5 |

TABLE 11

Base ink: Y1

| Name of ink | PFY2 (parts) | DY66 (parts) | AEH (parts) | Water (parts) | Ka (μm/msec$^{1/2}$) | tw (msec) |
|---|---|---|---|---|---|---|
| Y1-4-1 | 1 | 0.5 | 1.5 | 77 | 2.5 | 5 |
| Y1-4-2 | 1.6 | 0.9 | 1.5 | 76 | 2.5 | 5 |
| Y1-4-3 | 3.3 | 1.2 | 1.5 | 75 | 2.5 | 5 |
| Y1-4-4 | 3 | 1.5 | 1.5 | 74 | 2.5 | 5 |

TABLE 12

Base ink: M1

| Name of ink | PFM2 (parts) | AEH (parts) | Water (parts) | Ka (μm/msec$^{1/2}$) | tw (msec) |
|---|---|---|---|---|---|
| M1-4-1 | 1.5 | 1.5 | 79 | 2.5 | 5 |
| M1-4-2 | 2.5 | 1.5 | 78 | 2.5 | 5 |
| M1-4-3 | 3.5 | 1.5 | 77 | 2.5 | 5 |
| M1-4-4 | 4.5 | 1.5 | 76 | 2.5 | 5 |

TABLE 13

Base ink: Bk2

| Name of ink | CBk (parts) | AEH (parts) | Water (parts) | Ka (μm/msec$^{1/2}$) | tw (msec) |
|---|---|---|---|---|---|
| Bk2-4-1 | 1.5 | 1.5 | 72.75 | 2.5 | 5 |
| Bk2-4-2 | 2.5 | 1.5 | 71.75 | 2.5 | 5 |
| Bk2-4-3 | 3.5 | 1.5 | 70.75 | 2.5 | 5 |
| Bk2-4-4 | 4.5 | 1.5 | 69.75 | 2.6 | 5 |

TABLE 14

Base ink: Y2

| Name of ink | PGY74 (parts) | AEH (parts) | Water (parts) | Ka ($\mu$m/msec$^{1/2}$) | tw (msec) |
|---|---|---|---|---|---|
| Y2-4-1 | 1.5 | 1.5 | 72.75 | 2.5 | 5 |
| Y2-4-2 | 2.5 | 1.5 | 71.75 | 2.5 | 5 |
| Y2-4-3 | 3.5 | 1.5 | 70.75 | 2.5 | 5 |
| Y2-4-4 | 4.5 | 1.5 | 69.75 | 2.5 | 5 |

TABLE 15

Base ink: M2

| Name of ink | PGR7 (parts) | AEH (parts) | Water (parts) | Ka ($\mu$m/msec$^{1/2}$) | tw (msec) |
|---|---|---|---|---|---|
| M2-4-1 | 1.5 | 1.5 | 72.75 | 2.5 | 5 |
| M2-4-2 | 2.5 | 1.5 | 71.75 | 2.5 | 5 |
| M2-4-3 | 3.5 | 1.5 | 70.75 | 2.5 | 5 |
| M2-4-4 | 4.5 | 1.5 | 69.75 | 2.5 | 5 |

TABLE 16

Base ink: C2

| Name of ink | PGB15 (parts) | AEH (parts) | Water (parts) | Ka ($\mu$m/msec$^{1/2}$) | tw (msec) |
|---|---|---|---|---|---|
| C2-4-1 | 1.5 | 1.5 | 72.75 | 2.5 | 5 |
| C2-4-2 | 2.5 | 1.5 | 71.75 | 2.5 | 5 |
| C2-4-3 | 3.5 | 1.5 | 70.75 | 2.5 | 5 |
| C2-4-4 | 4.5 | 1.5 | 69.75 | 2.5 | 5 |

Together with the images obtained in the above-described other Examples, as Comparative Examples, recording of a solid image with the same resolution degree and size as those of the above-described Examples was carried out on the same object recording media as those of the Examples using the (Bk1-4-1) to (Bk1-4-4); (Y1-4-1) to (Y1-4-4); (M1-4-1) to (M1-4-4); (Bk2-4-1) to (Bk2-4-4); (Y2-4-1) to (Y2-4-4); (M2-4-1) to (M2-4-4); and (C2-4-1) to (C2-4-4). The supply amount per one dot in each object recording medium was about 4 ng each. The images of Examples and the images of Comparative Examples obtained using the same ink as the ink used for the Examples were compared and if the images of Example were judged to be much excellent in the coloring property as those of the Comparative Examples, the mark A was assigned, if judged to be excellent, the mark B was assigned, and if judged to be same or inferior, the mark C was assigned.

The evaluation results in the case of the combination of ink (Bk1-4-1) to (Bk1-4-4) with the time difference t=10 to 200 msec were shown in Table 17, the evaluation results in the case of the combination of ink (Y1-4-1) to (Y1-4-4) with the time difference t=10 to 200 msec were shown in Table 18, the evaluation results in the case of the combination of ink (M1-4-1) to (M1-4-4) with the time difference t=10 to 200 msec were shown in Table 19, the evaluation results in the case of the combination of ink (Bk2-4-1) to (Bk2-4-4) with the time difference t=10 to 200 msec were shown in Table 20, the evaluation results in the case of the combination of ink (Y2-4-1) to (Y2-4-4) with the time difference t=10 to 200 msec were shown in Table 21, the evaluation results in the case of the combination of ink (M2-4-1) to (M2-4-4) with the time difference t=10 to 200 msec were shown in Table 22, and the evaluation results in the case of the combination of ink (C2-4-1) to (C2-4-4) with the time difference t=10 to 200 msec were shown in Table 23.

TABLE 17

Ka = 2.5 ($\mu$m/msec$^{1/2}$)

| Name of ink | t (msec) | | | | | |
|---|---|---|---|---|---|---|
| | 10 | 25 | 50 | 100 | 150 | 200 |
| Bk1-4-1 | B | B | B | C | C | C |
| Bk1-4-2 | B | B | B | B | B | C |
| Bk1-4-3 | A | B | B | B | B | B |
| Bk1-4-4 | A | A | B | B | B | B |

TABLE 18

Ka = 2.5 ($\mu$m/msec$^{1/2}$)

| Name of ink | t (msec) | | | | | |
|---|---|---|---|---|---|---|
| | 10 | 25 | 50 | 100 | 150 | 200 |
| Y1-4-1 | B | B | B | C | C | C |
| Y1-4-2 | B | B | B | B | B | C |
| Y1-4-3 | A | B | B | B | B | B |
| Y1-4-4 | A | A | B | B | B | B |

TABLE 19

Ka = 2.5 ($\mu$m/msec$^{1/2}$)

| Name of ink | t (msec) | | | | | |
|---|---|---|---|---|---|---|
| | 10 | 25 | 50 | 100 | 150 | 200 |
| M1-4-1 | B | B | B | C | C | C |
| M1-4-2 | B | B | B | B | B | C |
| M1-4-3 | A | B | B | B | B | B |
| M1-4-4 | A | A | B | B | B | B |

TABLE 20

Ka = 2.5 ($\mu$m/msec$^{1/2}$)

| Name of ink | t (msec) | | | | | |
|---|---|---|---|---|---|---|
| | 10 | 25 | 50 | 100 | 150 | 200 |
| Bk2-4-1 | B | B | B | C | C | C |
| Bk2-4-2 | B | B | B | B | B | C |
| Bk2-4-3 | A | B | B | B | B | B |
| Bk2-4-4 | A | A | B | B | B | B |

TABLE 21

Ka = 2.5 ($\mu$m/msec$^{1/2}$)

| Name of ink | t (msec) | | | | | |
|---|---|---|---|---|---|---|
| | 10 | 25 | 50 | 100 | 150 | 200 |
| Y2-4-1 | B | B | B | C | C | C |
| Y2-4-2 | B | B | B | B | B | C |
| Y2-4-3 | A | B | B | B | B | B |
| Y2-4-4 | A | A | B | B | B | B |

TABLE 22

| Name | $Ka = 2.5\ (\mu m/msec^{1/2})$ | | | | | |
|---|---|---|---|---|---|---|
| | t (msec) | | | | | |
| of ink | 10 | 25 | 50 | 100 | 150 | 200 |
| M2-4-1 | B | B | B | C | C | C |
| M2-4-2 | B | B | B | B | B | C |
| M2-4-3 | A | B | B | B | B | B |
| M2-4-4 | A | A | B | B | B | B |

TABLE 23

| Name | $Ka = 2.5\ (\mu m/msec^{1/2})$ | | | | | |
|---|---|---|---|---|---|---|
| | t (msec) | | | | | |
| of ink | 10 | 25 | 50 | 100 | 150 | 200 |
| C2-4-1 | B | B | B | C | C | C |
| C2-4-2 | B | B | B | B | B | C |
| C2-4-3 | A | B | B | B | B | B |
| C2-4-4 | A | A | B | B | B | B |

Figure 20A:
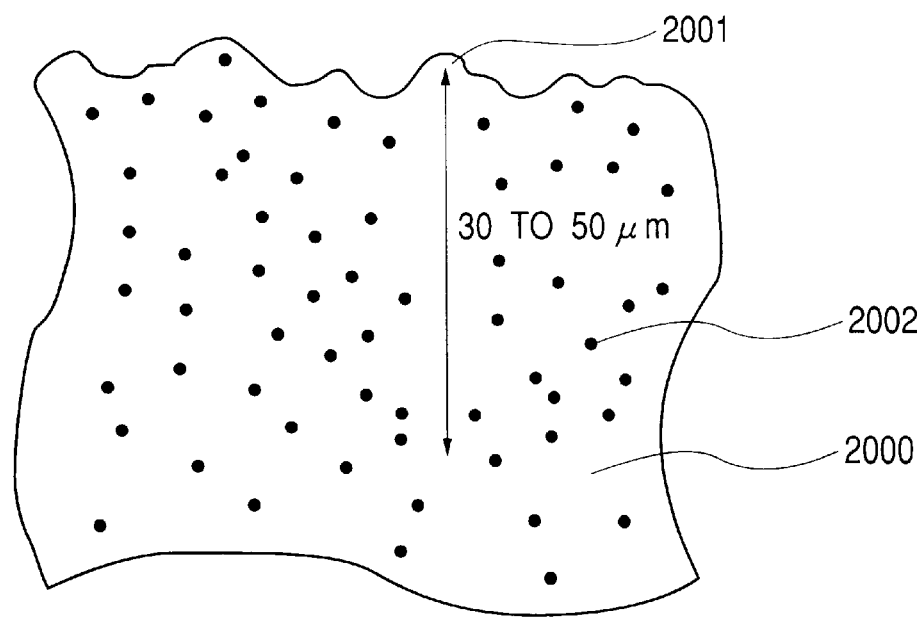
FIGS. 20A and 20B are views for describing a relationship between depth of a recording medium, and a remaining coloring material and fine particles.
Figure 20B:
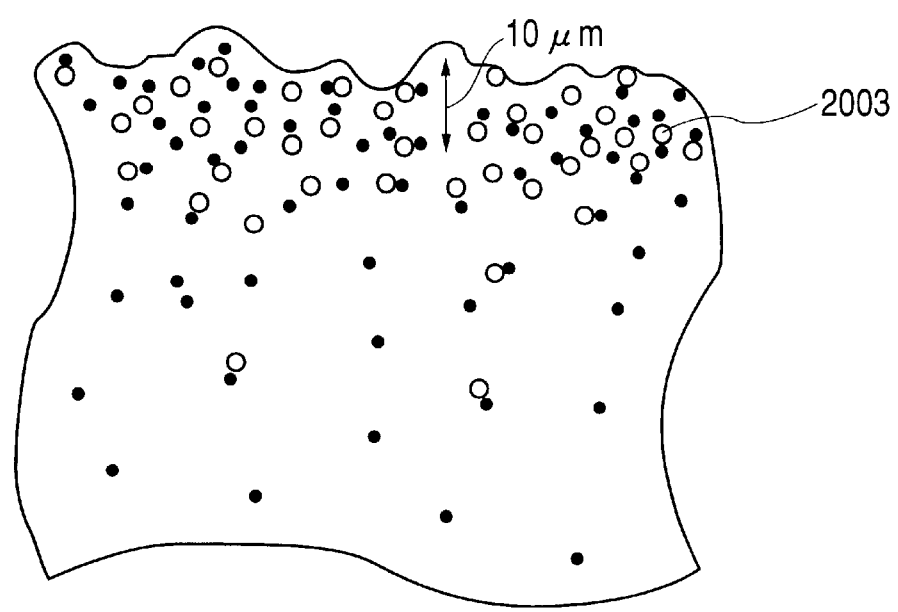

Depth of Coloring Material Contributing High Coloration from Object Recording Medium Surface Conventionally, as shown in FIG. 20A, it is well known that the optical density can be improved in case a large amount of a coloring material 2002 is left in the depth of 30 to 50 μm from the object recording medium surface 2000 as compared with the case a large amount of the coloring material is left in the region deeper than the above-described depth. However, further investigations made it clear that in case images were formed using the ink and the liquid compositions of the invention, the coloring materials remaining in a region different from the region with the foregoing depth range contributed to the coloration. Inventors of the invention found out it was necessary to leave the coloring materials in a region different from the region, which was conventionally believed to contribute to the coloration, in order to obtain high coloration. The following investigations were performed and at first here, the depth will be defined. That the object recording medium surface means the face to which the ink is supplied and FIGS. 20A and 20B show the surface and the inside of the object recording medium 2000. As shown in FIGS. 20A and 20B, the object recording medium surface is not smooth but uneven and the depth is the distance from the apex of the convex part 2001 of the object recording medium in the depth direction.

Inventors of the invention measured the depth regions where fine particles of the coloring materials remained by x-ray microanalysis (XMA) for the images with high coloration and images with inferior coloration obtained in above-described Examples and other Examples using the ink and the liquid compositions. XMA is explained below. (XMA)

The element analysis was carried out by employing XMA (trade name: EDAX; EDAX Co.). The XMA is an apparatus capable of carrying out element analysis in several micrometer order in the depth direction and suitable for surface element analysis. The elements derived from the coloring materials and elements derived from the coloring material remaining in the object recording media in the depth direction where the images were formed using the ink and liquid compositions were determined by the element analysis by XMA and the depth regions where the coloring materials and the fine particles remained were measured. The acceleration voltage was necessary to be changed depending on the elements to be analyzed and set to be suitable values for the respective elements.

Depth of Coloring Material and Fine Particle and Coloration

As a result of the analysis of the images formed using the ink and liquid compositions of Examples and other Examples by XMA, as shown in FIG. 20B, there were images of which most of the coloring material 2002 of the supplied ink and fine particles 2003 of the supplied liquid compositions remained in the regions in a depth within 10 μm and also there were images of which a large amount of the coloring material 2002 and fine particles 2003 remained in the regions in a depth of 10 μm or deeper. Further, it was found out that there was a correlation between the depth where a larger amount of the coloring material and fine particles remained and the coloration of the images as shown in Table 24. The images evaluated to be good in the coloration by eye observation by inventors of the invention were marked with B and those evaluated to be inferior in the coloration with the former were marked with C. The images of which most of the coloring material and fine particles remained in the regions in a depth within 10 μm were found having high coloration and the images of which a large amount of the coloring material and fine particles remained in the regions in a depth of 10 μm or deeper were found inferior in the coloration.

TABLE 24

| Region with a large amount of coloring material and fine particles | Region with depth within 10 μm | Region with depth deeper than 10 μm |
|---|---|---|
| Image coloration | B | C |

As described, images with high coloration can be obtained by leaving the coloring material and fine particles in the region in a depth within 10 μm from the surface of the object recording media. As described in FIG. 13 and FIGS. 14A to 14D, in the invention, the coloration is increased by adsorbing the coloring material in the monomolecular state on the surface of the fine particles. Taking that into consideration, it is consequential that images with high coloration are formed by leaving the fine particles on which the coloring material in the monomolecular state is adsorbed in the regions with a depth within 10 μm from the surface of the object recording media. Also, as described above, the fine particles on which the coloring material in the monomolecular state is adsorbed cohere to one another to be cohering substances. Accordingly, taking that into consideration, it is consequential that images with high coloration are formed by leaving the cohering substances of fine particles cohering to one another on which the coloring material in the monomolecular state is adsorbed in the regions with a depth within 10 μm or more from the surface of the object recording media.

Conditions for High Coloration

Inventors of the invention deduced the following recording condition (the following expression) for obtaining high coloration images based on the result of Table 24.

As described above, as a recording condition for recording images with high coloration, it is required to bring the liquid composition supplied later into contact with the ink supplied prior during the time a specified amount of the coloring material of the ink supplied prior exists in a region within a specified depth (in the surface layer of the object recording medium) from the object recording medium surface. The specified depth means, as described in Table 24, the depth of 10 μm from the object recording medium surface and the term, the specified amount means 0.07 pg/μm² in the depth within 10 μm. The amount 0.07 pg/μm² can be deduced as the following.

Consequently, the amount W (pg/μm²) of the coloring material remaining in the depth within 10 μm from the object recording medium surface $$W = M \times \left(\frac{D}{100}\right) \times \left[\frac{10}{\{ka \times (t-tw)^{\frac{1}{2}}\}}\right] \quad \text{[Formula 2]}$$

(wherein, M (pg/m²) denotes the supply amount of the ink to the object recording medium per unit surface area; D (%) denotes the coloring material density of the ink; Ka (μm/msec$^{1/2}$) denotes the absorption coefficient of the object recording medium to the ink; tw (msec) denotes the wetting time in the object recording medium; and t (msec) denotes the interval from the time the ink is supplied to the object recording medium to the time the liquid composition is brought into contact with the ink.).

Figure 21:
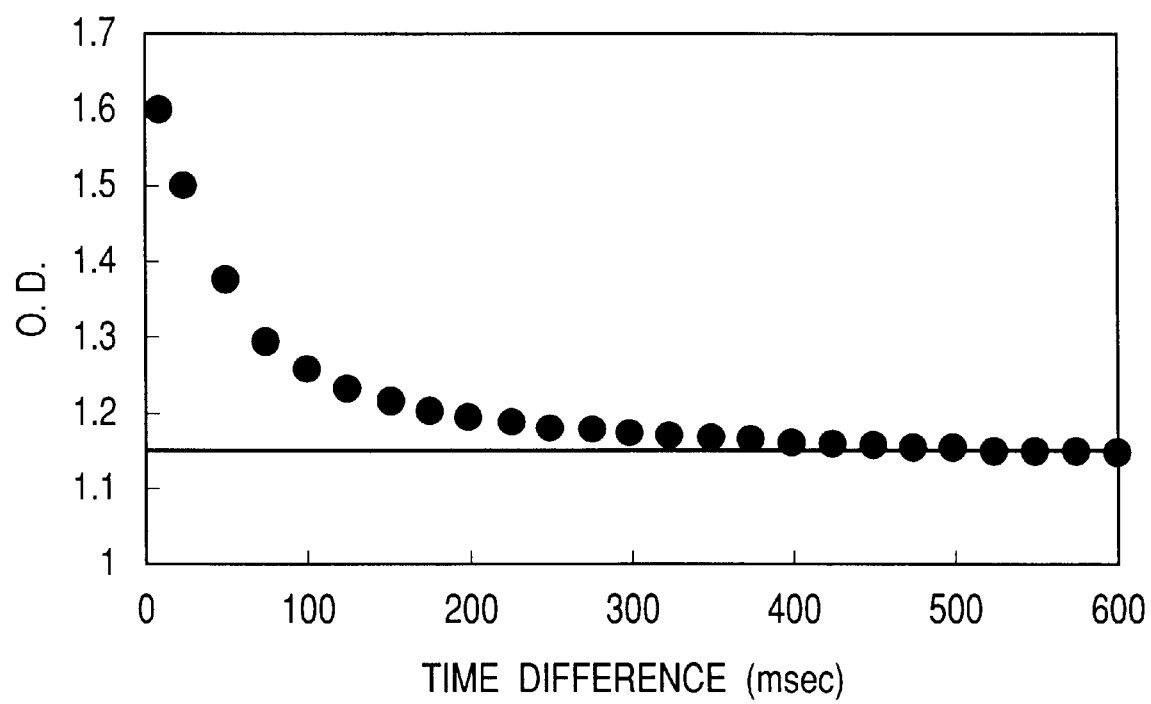
FIG. 21 is a graph explaining a relationship between a period until a liquid composition contacts ink after ink is applied to a recording medium, and optical density O.D.

FIG. 21 shows the graph showing the correlation between the interval from the time the ink C1-3-3 is supplied to the object recording medium to the time the liquid composition C is brought into contact with the ink C1-3-3 and the optical density O. D. Using the same recording apparatus shown in FIG. 1 and the recording head shown in FIG. 3, solid images with a resolution degree of 1,200 dpi and a size of 2 inch×2 inch were formed and the optical density of the solid images was measured 24 hours after the recording by GRETAG Spectrolino. The supply amounts of the ink C1-3-3 and the liquid composition C to the object recording medium per one dot were about 4 ng each. The O. D. was 1.15 in the case of recording only by the ink C1-3-3. Accordingly, in order to obtain a high coloration effect, the time difference with which the O. D. became higher than 1.15 in FIG. 21, that is, the time difference was required to be shorter than 525 msec.

The coloring material amount W (pg/μm²) with 525 msec was calculated from $$W = \left(\frac{4}{(25.4/1200)^2}\right) \times \left(\frac{3.5}{100}\right) \times \left[\frac{10}{\{2 \times (525-10)^{\frac{1}{2}}\}}\right] \quad \text{[Formula 3]}$$

and equals to 0.06885 (pg/μm²) and therefore inventors of the invention concluded that the above-described specified amount was about 0.07 (pg/μ²) in the depth within 10 μm from the object recording medium surface. In Table 6 to 9 and Table 17 to 23, the evaluation B or A was marked in the case of the time difference with which 0.07 (pg/μm²) or more of the coloring material remained in the depth within 10 μm and C was marked in the case of the time difference with which less than 0.07 (pg/μm²) of the coloring material remained.

As described above, the recording conditions for recording high coloration images were determined by (A) the supply amount of the invention to the object recording medium; (B) the coloring material density of the ink; (C) the penetration speed of the ink in the object recording medium (or the absorption coefficient of the object recording medium to the ink); (D) the wetting time of the ink in the object recording medium; and (E) the interval from the time the ink is supplied to the object recording medium to the time the liquid composition is brought into contact with the ink.

Based on these findings, the recording conditions for obtaining high coloration images were deduced. In the case the supply amount of the ink to the object recording medium per unit surface area was defined as M (pg/μm²); the coloring material density of the ink as D (%); the absorption coefficient of the object recording medium to the ink as Ka (μm/msec$^{1/2}$); the wetting time in the object recording medium as tw (msec); and the interval from the time the ink is supplied to the object recording medium to the time the liquid composition is brought into contact with the ink as t (msec), the M, D, Ka, tw and t satisfy the following $$t(\text{m sec}) \leq \left\{M(\text{pg/μm}^2) \times \frac{10(\mu m)}{ka\left(\mu m/\text{m sec}^{\frac{1}{2}}\right)} \times \frac{D(\%)}{100} \times \frac{1}{0.07(\text{pg/μm}^2)}\right\}^2 + tw(\text{m sec}) \quad \text{[Formula 4]}$$

that is, M, D, Ka, tw and t satisfy the following $$t \leq \left(\frac{10}{7} \times \frac{MD}{Ka}\right)^2 + tw \quad \text{[Formula 5]}$$

high coloration images can be obtained.

Incidentally, this example was described while setting the fine particle amount to be 10%, even in the case of liquid compositions with the fine particle amount changed to be 3%, 6%, and 8%, high coloration images can be obtained if the above-described recording conditions defined by the expression are satisfied.

Desirable Condition

Further preferably, in the case the coloring material concentration of the ink was 2.5% or higher, the coloration was high. Also, in the case the absorption coefficient was 2.0 (μm/msec$^{1/2}$) or lower, the coloration was high.

As described above, according to the invention, images with coloration properties and color evenness as excellent as coat paper for ink jet printing while keeping the texture of the common paper can be recorded. According to the recording conditions of the invention, images with high coloration can be formed.

What is claimed is:

1. A recording method wherein, when record is performed on a recording medium by use of an anionic or cationic ink and a liquid composition, the ink containing a coloring material, the liquid composition containing fine particles in a dispersed state, the surfaces of the fine particles being charged with a polarity opposite to that of the ink, M, D, Ka, tw and t satisfy the relation of $$t \leq \left(\frac{10}{7} \times \frac{MD}{Ka}\right)^2 + tw$$

where M (pg/μm²) is the amount of the ink supplied to the recording medium per unit area, D (%) is the concentration of the coloring material of the ink, Ka (μm/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium.

2. A method of performing record on a recording medium by use of an ink containing a coloring material and a liquid composition to react with the coloring material in the ink, comprising:

a step of allowing the ink to contact the liquid composition on the recording medium in liquid form in such a way that M, D, Ka, tw and t satisfy the relation of $$t \leq \left(\frac{10}{7} \times \frac{MD}{Ka}\right)^2 + tw$$

where M ($pg/\mu^2$) is the amount of the ink supplied to the recording medium per unit area, D (%) is the concentration of the coloring material of the ink, Ka ($\mu m/msec^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein the coloring material is adsorbed on the surfaces of the fine particles in a monomolecular state by allowing the coloring material in the ink to contact fine particles in the liquid composition in the contact step, so that the fine particles having adsorbed the coloring material on the surfaces thereof aggregate to each other.

3. A method of performing record on a recording medium by use of an ink containing a coloring material and a liquid composition containing fine particles to be adsorbed on the coloring material, comprising:

a step of causing the ink to contact the liquid composition on the recording medium in liquid form in such a way that M, D, Ka, tw and t satisfy the relation of $$t \leq \left(\frac{10}{7} \times \frac{MD}{Ka}\right)^2 + tw$$

where M ($pg/\mu m^2$) is the amount of the ink supplied to the recording medium per unit area, D (%) is the concentration of the coloring material of the ink, Ka ($\mu m/msec^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein the coloring material keeping a monomolecular state is adsorbed on the surfaces of the fine particles by allowing the coloring material in the ink to contact fine particles in the liquid composition in the contact step, so that the fine particles having adsorbed the coloring material on the surfaces thereof aggregate to each other.

4. A recording method wherein, when record is performed on a recording medium by use of an anionic or cationic ink and a liquid composition, the ink containing a coloring material and the liquid composition containing fine particles in a dispersed state, the surfaces of the fine particles being charged with a polarity opposite to that of the ink, record is performed in such a way that fine particles having adsorbed the coloring material in a monomolecular state are present at least within a depth of 10 $\mu m$ from the surface of the recording medium.

5. A recording method wherein, when record is performed on a recording medium by use of an ink containing a coloring material and a liquid composition containing fine particles to be adsorbed on the coloring material, record is performed in such a way that aggregates formed by aggregation of the fine particles to each other, the fine particles being adsorbed by a coloring material in a monomolecular state, are present at least within a depth of 10 $\mu m$ from the surface of the recording medium.

6. The recording method according to any one of claims 1 to 5, wherein the concentration of the coloring material is 2.5% or more.

7. The recording method according to any one of claims 1 to 5, wherein the absorption coefficient is 2 $\mu m/ms^{1/2}$ or smaller.

8. The recording method according to any one of claims 1 to 5, wherein in a colored portion to be formed by the ink and the liquid composition, the coloring material contained in the ink is adsorbed in a monomolecular state onto the surfaces of fine particles contained in the liquid composition.

9. The recording method according to any one of claims 1 to 5, wherein the fine particles are alumina or hydrated alumina.

10. A recording apparatus wherein, when record is performed on a recording medium by use of an anionic or cationic ink and a liquid composition, the ink containing a coloring material and the liquid composition containing fine particles in a dispersed state, the surfaces of the fine particles being charged with a polarity opposite to that of the ink, M, D, Ka, tw and t satisfy the relation of $$t \leq \left(\frac{10}{7} \times \frac{MD}{Ka}\right)^2 + tw$$

where M ($pg/\mu m^2$) is the amount of the ink supplied to the recording medium per unit area, D (%) is the concentration of the coloring material of the ink, Ka ($\mu m/msec^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium.

11. An apparatus for making a record on a recording medium by use of an ink containing a coloring material and a liquid composition to react with the coloring material in the ink, comprising:

means for causing the ink to contact the liquid composition on the recording medium in liquid form in such a way that M, D, Ka, tw and t satisfy the relation of $$t \leq \left(\frac{10}{7} \times \frac{MD}{Ka}\right)^2 + tw$$

where M ($pg/\mu m^2$) is the amount of the ink supplied to the recording medium per unit area, D (%) is the concentration of the coloring material of the ink, Ka ($\mu m/msec^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein the coloring material is adsorbed on the surfaces of the fine particles in a monomolecular state by allowing the coloring material in the ink to contact fine particles in the liquid composition, so that the fine particles having adsorbed the coloring material on the surfaces thereof aggregate to each other.

12. An apparatus for making a record on a recording medium by use of an ink containing a coloring material and a liquid composition containing fine particles to be adsorbed on the coloring material, comprising:

means for causing the ink to contact the liquid composition on the recording medium in liquid form in such a way that M, D, Ka, tw and t satisfy the relation of $$t \le \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein the coloring material keeping a monomolecular state is adsorbed on the surfaces of the fine particles by allowing the coloring material in the ink to contact fine particles in the liquid composition in the contact step, so that the fine particles having adsorbed the coloring material on the surfaces thereof aggregate to each other.

13. A recording apparatus wherein, when record is performed on a recording medium by use of an anionic or cationic ink and a liquid composition, the ink containing a coloring material and the liquid composition containing fine particles in a dispersed state, the surfaces of the fine particles being charged with a polarity opposite to that of the ink, record is performed in such a way that fine particles having adsorbed a coloring material in a monomolecular state are present at least within a depth of 10 $\mu$m from the surface of the recording medium.

14. A recording apparatus wherein, when record is performed on a recording medium by use of an ink containing a coloring material and a liquid composition containing fine particles to be adsorbed on the coloring material, record is performed in such a way that aggregates formed by aggregation of the fine particles to each other, the fine particles being adsorbed by a coloring material in a monomolecular state, are present at least within a depth of 10 $\mu$m from the surface of the recording medium.

15. The recording method according to any one of claims 10 to 14, wherein the fine particles are alumina or hydrated alumina.

16. A method of manufacturing a recorded article with an image being recorded on the recording medium thereof, wherein when an image is recorded on a recording medium by use of an anionic or cationic ink and a liquid composition, the ink containing a coloring material and the liquid composition containing fine particles in a dispersed state, the surfaces of the fine particles being charged with a polarity opposite to that of the ink, M, D, Ka, tw and t satisfy the relation of $$t \le \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium.

17. A method of manufacturing a recorded article with an image being recorded on the recording medium thereof, comprising:

when an image is recorded on a recording medium by use of an ink containing a coloring material and a liquid composition to react with the coloring material in the ink, a step of causing the ink to contact the liquid composition on the recording medium in liquid form to thereby form an image in such a way that M, D, Ka, tw and t satisfy the relation of $$t \le \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein in the image forming step, the coloring material is adsorbed on the surfaces of the fine particles in a monomolecular state by allowing the coloring material in the ink to contact fine particles in the liquid composition, so that the fine particles having adsorbed the coloring material on the surfaces thereof aggregate to each other.

18. A method of manufacturing a recorded article with an image being recorded on the recording medium thereof, comprising when an image is recorded on the recording medium by use of an ink containing a coloring material and a liquid composition containing fine particles to be adsorbed on the coloring material, a step of causing the ink to contact the liquid composition on the recording medium in liquid form to thereby form an image in such a way that M, D, Ka, tw and t satisfy the relation of $$t \le \left(\frac{10}{7} \times \frac{MD}{Ka}\right)^2 + tw$$

where M (pg/$\mu$m$^2$) is the amount of the ink supplied to the recording medium per unit area, D (%) is the concentration of the coloring material of the ink, Ka ($\mu$m/msec$^{1/2}$) is the absorption coefficient of the ink in the recording medium, tw (msec) is the time required for the ink to moisten in the recording medium, and t (msec) is the time required for the liquid composition to make contact with the supplied ink after the ink is supplied to the recording medium, wherein in the image forming step, the coloring material keeping a monomolecular state is adsorbed on the surfaces of the fine particles by allowing the coloring material in the ink to contact fine particles in the liquid composition, so that the fine particles having adsorbed the coloring material on the surfaces thereof aggregate to each other.

19. A method of manufacturing a recorded article with an image being recorded on the recording medium thereof, wherein when an image is recorded on a recording medium by use of an anionic or cationic ink and a liquid composition, the ink containing a coloring material and the liquid composition containing fine particles in a dispersed state, the surfaces of the fine particles being charged with a polarity opposite to that of the ink, record is performed in such a way that fine particles having adsorbed a coloring material in a monomolecular state are present at least within a depth of 10 μm from the surface of the recording medium.

20. A method of manufacturing a recorded article with an image being recorded on the recording medium thereof, comprising when an image is recorded on a recording medium by use of an ink containing a coloring material and a liquid composition containing fine particles to be adsorbed on the coloring material, record is performed in such a way that aggregates formed by aggregation of the fine particles to each other, the fine particles being adsorbed by a coloring material in a monomolecular state, are present at least within a depth of 10 μm from the surface of the recording medium.

21. The method of manufacturing the recorded article according to any one of claims 16 to 20, wherein the fine particles are alumina or hydrated alumina.

22. A recorded article having an image on the recording medium thereof, wherein the image includes fine particles having adsorbed a coloring material in a monomolecular state, at least within a depth of 10 μm from the surface of the recording medium.

23. A recorded article having an image on the recording medium thereof, wherein the image includes aggregates formed by aggregation of the fine particles to each other, the fine particles having adsorbed a coloring material in a monomolecular state, at least within a depth of 10 μm from the surface of the recording medium.

24. The recorded article according to claim 22 or 23, wherein the fine particles are alumina or hydrated alumina.

* * * * *

UNITED STATES PATENT AND TRADEMARK OFFICE
CERTIFICATE OF CORRECTION

PATENT NO.      : 6,659,601 B2
DATED           : December 9, 2003
INVENTOR(S)     : Fumitaka Goto et al.

It is certified that error appears in the above-identified patent and that said Letters Patent is hereby corrected as shown below:

Title page,
Item [56] References Cited, OTHER PUBLICATIONS,
"Surfaces Science", reference, "Funamentals," should read -- Fundamentals --;
"U.S. patent application Ser. No. 10/138,576", reference "May 6, 2003," should read -- May 6, 2002, --.

Column 1,
Line 60, "means accelerating" should read -- a means of accelerating the --.

Column 2,
Line 62, "has" should read -- have --.
Line 64, "case" should read -- cases --.

Column 3,
Line 24, "for" should read -- to --.
Line 37, "could not" should read -- cannot --.
Line 38, "this" should read -- these --
Lines 42 and 57, "are" should read -- is --.
Line 48, "was" should read -- is --.
Line 56, "case" should read -- cases --.

Column 4,
Line 1, "become" should read -- come --.
Line 8, "adsorbing" should read -- of adsorbing --.
Line 60, "t<=" should read -- $t \leq$ --.

Column 5,
Lines 12 and 40, "t<=" should read -- $t \leq$ --.

Column 6 ,
Lines 24 and 45, "t<=" should read -- $t \leq$ --.

Column 7,
Lines 5 and 57, "t<=" should read -- $t \leq$ --.

Column 8,
Lines 15 and 46, "t<=" should read -- $t \leq$ --.

Column 9,
Line 50, "a" should be deleted.
Lines 54 and 64, "an" should read -- a --.

UNITED STATES PATENT AND TRADEMARK OFFICE
CERTIFICATE OF CORRECTION

PATENT NO.   : 6,659,601 B2
DATED        : December 9, 2003
INVENTOR(S)  : Fumitaka Goto et al.

It is certified that error appears in the above-identified patent and that said Letters Patent is hereby corrected as shown below:

Column 10,
Lines 7, 47 and 51 "an" should read -- a --.

Column 11,
Line 3, "O.D." should read -- (O.D.). --.

Column 12,
Line 24, "materials 1305" should read -- material 1305 --.
Line 26, "remained" should read -- remains --.

Column 13,
Line 59, "is" should read -- are --.

Column 14,
Line 36, "bonded" should read -- bond --.
Line 39, "is" should read -- are --.
Line 53, "penetrate" should read -- penetrates --.
Line 66, "or" should read -- on --.

Column 15,
Line 17, "reacted" should read -- react --.
Line 36, "particles," should read -- particles --.

Column 17,
Line 19, "change in dispersion" should read -- "changes in dispersion --.
Line 20, "medium" should read -- medium" --.

Column 18,
Line 15, "few" should read -- little --.
Line 21, "are" should read -- is --.
Line 23, "has become to have a recognition" should read -- have come to recognize --.
Line 24, "a" should read -- an --.
Line 62, "fine a" should read -- a fine --.

Column 19,
Line 26, "et." should read -- et --.
Line 27, "al's" should read -- al.'s -- and "am. Dhem." should read -- Am. Chem. --.

Column 20,
Line 6, "radius" should read -- radii --.
Line 30, "medium. These" should read -- medium. (New paragraph) These --.

UNITED STATES PATENT AND TRADEMARK OFFICE
CERTIFICATE OF CORRECTION

PATENT NO. : 6,659,601 B2
DATED : December 9, 2003
INVENTOR(S) : Fumitaka Goto et al.

It is certified that error appears in the above-identified patent and that said Letters Patent is hereby corrected as shown below:

Column 21,
Line 30, "researches" should read -- research --.

Column 22,
Line 22, "good." should read -- well. --.
Line 43, "a" should read -- an --.
Lines 53 and 60, "is" should read -- are --.
Line 55, "surface is" should read -- surfaces are --.
Line 56, "it" should be deleted.
Line 57, "it is" should read -- they are --.
Line 59, "a cationic fine particle" should read -- cationic fine particles --.
Line 64, "particle" should read -- particles --.

Column 23,
Line 21, "does" should read -- do --.

Column 24,
Line 8, "adjust" should read -- adjustment --.
Line 38, "no longer hardly" should read -- no longer --.
Line 49, "become" should read -- come --.

Column 26,
Line 16, "is" should read -- are --.
Line 39, "has" should read -- have --.
Line 50, "et. al." should read -- et. al., --.

Column 27,
Line 14, "A" should read -- An --.

Column 28,
Line 29, "generally," should read -- generally --.

Column 29,
Line 34, "no" should read -- not -- and "well" should read -- good --.
Line 39, "cohere" should read -- coheres --.
Lines 45 and 49, "coat" should read -- coated --.

Column 30,
Line 15, "an" should be deleted.
Line 19, "effectively prevented" should read -- effectively be prevented --.
Line 27, "those" should read -- that -- and "their" should read -- its --.

UNITED STATES PATENT AND TRADEMARK OFFICE
CERTIFICATE OF CORRECTION

PATENT NO.    : 6,659,601 B2
DATED         : December 9, 2003
INVENTOR(S)   : Fumitaka Goto et al.

It is certified that error appears in the above-identified patent and that said Letters Patent is hereby corrected as shown below:

Column 31,
Line 13, "desortion" should read -- desorption --.

Column 32,
Line 23, "compound" should read -- compound (cationic coloring material). --.
Line 25, "Cationic Coloring Material" should be deleted.
Line 63, "a" (second and third occurrences) should read -- an --.
Line 64, "(e.g." should read -- (e.g., --.

Column 34,
Line 2, "Corp.)" should read -- Corp.), --.
Line 35, "vipylnaphthalene" should read -- vinylnaphthalene --.

Column 35,
Line 4, "sulfosucciate" should read -- sulfosuccinate --.
Line 33, "ammonium.)" should read -- ammonium). --.

Column 37,
Line 45, "an" should read -- a --.
Line 63, "ink" should read -- Ink --.

Column 38,
Lines 52 and 55, "be" should read -- can be --.

Column 40,
Line 6, "are" should read -- is --.
Line 22, "medium" should read -- medium, --.
Line 40, "regions," should read -- regions --.
Line 42, "the" (first occurrence) should be deleted.

Column 42,
Line 34, "for" should read -- to --.
Line 53, "is wiping" should read -- is for wiping --.

Column 43,
Line 38, "eject" should read -- ejection --.

Column 44,
Line 25, "wiping" should read -- wipe --.

Column 45,
Line 6, "form" should read -- from --.

UNITED STATES PATENT AND TRADEMARK OFFICE
CERTIFICATE OF CORRECTION

PATENT NO. : 6,659,601 B2
DATED : December 9, 2003
INVENTOR(S) : Fumitaka Goto et al.

It is certified that error appears in the above-identified patent and that said Letters Patent is hereby corrected as shown below:

Column 45 (cont'd),
Line 21, "adsorbed" should read -- absorbed -- and "adsorbent" should read -- absorbent --.
Line 65, "denote" should read -- denotes --.

Column 46,
Line 65, "are" should read -- is --.

Column 47,
Line 12, "blade holder." should read -- blade holder 18. --.

Column 48,
Line 17, "specific remarks." should read -- otherwise specified. --.

Column 50,
Line 54, "temperature 10" should read -- temperature --.

Column 51,
Line 53, "3.0 part by weight" should read -- 3.0 parts by weight --.

Column 53,
Line 45, "ink the" should read -- ink on the --.

Column 54,
Line 54, "same" should read -- to the same --.

Column 55,
Line 56, "property" should read -- property) --.
Line 57, "Ltd.,;" should read -- Ltd.); --.
Line 58, "according to (Bristow method)" should read -- (according to Bristow method) --.
Line 60, "paper)" should read -- paper --.
Line 64, "tw (mse)" should read -- tw (msec) --.

Column 56,
Line 4, "details" should read -- detailed --.
Line 11, "were" should read -- are --.
Line 46, "Example" should read -- the Example --.
Line 47, "much" should read -- as --.

Column 59,
Line 46, "Example" should read -- Examples -- and "much" should read -- as --.

UNITED STATES PATENT AND TRADEMARK OFFICE
CERTIFICATE OF CORRECTION

PATENT NO. : 6,659,601 B2
DATED : December 9, 2003
INVENTOR(S) : Fumitaka Goto et al.

It is certified that error appears in the above-identified patent and that said Letters Patent is hereby corrected as shown below:

<u>Column 61,</u>
Line 45, "That" should be deleted and "the" should read -- The --.
Line 62, "in" should read -- in the order of --.
Line 63, "order" should be deleted.

<u>Column 63,</u>
Line 10, "term," should read -- term -- and "the specified amount" should read -- "the specified amount" --.
Line 20, "$M(pg/m^2)$" should read -- $M(pg/\mu m^2)$ --.

<u>Column 64,</u>
Line 52, "record" should read -- recording --.

<u>Column 65,</u>
Lines 6, 33, 60 and 66, "record" should read -- recording --.
Line 18, "$M(pg/\mu^2)$" should read -- $M(pg/\mu m^2)$ --.

<u>Column 66,</u>
Lines 3, 7 and 28, "record" should read -- recording --.

<u>Column 67,</u>
Lines 36, 42, 46 and 50, "record" should read -- recording --.

<u>Column 69,</u>
Line 22, "record" should read -- recording --.

<u>Column 70,</u>
Line 5, "record" should read -- recording --.

Signed and Sealed this

Third Day of August, 2004

JON W. DUDAS
*Acting Director of the United States Patent and Trademark Office*